(12) United States Patent
Ramireddy et al.

(10) Patent No.: US 11,595,089 B2
(45) Date of Patent: Feb. 28, 2023

(54) CSI REPORTING AND CODEBOOK STRUCTURE FOR DOPPLER-DELAY CODEBOOK-BASED PRECODING IN A WIRELESS COMMUNICATIONS SYSTEM

(71) Applicant: Fraunhofer-Gesellschaft zur Förderung der angewandten Forschung e.V., Munich (DE)

(72) Inventors: Venkatesh Ramireddy, Erlangen (DE); Marcus Grobmann, Erlangen (DE); Markus Landmann, Erlangen (DE)

(73) Assignee: Fraunhofer-Gesellschaft zur Förderung der angewandten Forschung e.V.

( * ) Notice: Subject to any disclaimer, the term of this patent is extended or adjusted under 35 U.S.C. 154(b) by 0 days.

(21) Appl. No.: 17/447,013

(22) Filed: Sep. 7, 2021

(65) Prior Publication Data

US 2022/0029676 A1 Jan. 27, 2022

Related U.S. Application Data

(63) Continuation of application No. PCT/EP2019/055832, filed on Mar. 8, 2019.

(51) Int. Cl.
*H04B 7/02* (2018.01)
*H04B 7/0456* (2017.01)
(Continued)

(52) U.S. Cl.
CPC ......... *H04B 7/0478* (2013.01); *H04B 7/0421* (2013.01); *H04B 7/0626* (2013.01)

(58) Field of Classification Search
CPC .. H04B 7/0478; H04B 7/0421; H04B 7/0626; H04B 7/0695; H04B 7/10
(Continued)

(56) References Cited

U.S. PATENT DOCUMENTS

2011/0250919 A1* 10/2011 Barbieri ............... H04W 24/08
455/509
2014/0177745 A1 6/2014 Krishnamurthy et al.
(Continued)

FOREIGN PATENT DOCUMENTS

IN 381782 11/2021
JP 2016-40930 A 3/2016
(Continued)

OTHER PUBLICATIONS

3GPP TS 38.214 V15.1.0, 3rd Generation Partnership Project; Technical Specification Group Radio Access Network; NR; Physical layer procedures for data (Release 15), Mar. 2018.
(Continued)

*Primary Examiner* — Helene E Tayong
(74) *Attorney, Agent, or Firm* — Haynes and Boone, LLP

(57) ABSTRACT

A communication device for providing a channel state information, CSI, feedback in a wireless communication system includes a transceiver to receive a radio signal including downlink reference signals. The processor
estimates an explicit CSI,
selects a Doppler-delay precoder matrix for a composite Doppler-delay-beam three-stage precoder,
calculates and reports to the transmitter a CSI feedback.
The communication device selects from one or more codebooks a subset of D delay components and/or a subset of F Doppler-frequency components and uses the selected subset of delay components for each polarization and each spatial beam and/or the selected subset of Doppler-frequency components for each polarization, each spatial beam and each delay, when calculating the Doppler-delay precoder matrix.

21 Claims, 13 Drawing Sheets

(51) Int. Cl.
*H04B 7/0417* (2017.01)
*H04B 7/06* (2006.01)

(58) Field of Classification Search
USPC .......................................................... 375/267
See application file for complete search history.

(56) References Cited

U.S. PATENT DOCUMENTS

| | | | | |
|---|---|---|---|---|
| 2016/0006122 | A1* | 1/2016 | Seol | H04B 7/0617 342/372 |
| 2017/0346580 | A1* | 11/2017 | Astrom | H04L 5/006 |
| 2018/0076871 | A1* | 3/2018 | Rahman | H04B 7/0456 |

FOREIGN PATENT DOCUMENTS

| | | |
|---|---|---|
| JP | 2016-63497 A | 4/2016 |
| JP | 2017-163551 A | 9/2017 |
| JP | 2018-507572 A | 3/2018 |
| WO | 2014182002 A | 11/2014 |
| WO | WO 2016/068628 A1 | 5/2016 |
| WO | WO 2017/135295 A1 | 8/2017 |
| WO | WO 2017/152789 A1 | 9/2017 |
| WO | WO 2017/156732 A1 | 9/2017 |
| WO | WO 2017/166281 A1 | 10/2017 |
| WO | WO 2018/052255 A1 | 3/2018 |

OTHER PUBLICATIONS

Manolakis Konstantinos et al., "Channel Prediction by Doppler-Delay Analysis and Benefits for Base Station Cooperation", 2013 IEEE 77th Vehicular Technology Conference (VTC Spring), IEEE, doi:10.1109/VTCSPRING.2013.6692473, ISSN 1550-2252, (Jun. 2, 2013), pp. 1-6, (Dec. 22, 2013), XP032548009.
R. S. Thomä, M. Landmann, and A. Richter, "RIMAX-A maximum likelihood framework for parameter estimation in multidimensional channel sounding." Proceedings of the International Symposium on Antennas and Propagation (ISAP'04). 2004.
3GPP TS 38.211 V15.1.0, 3rd Generation Partnership Project; Technical Specification Group Radio Access Network; NR; Physical channels and modulation (Release 15), Mar. 2018.
Barhumi, G. Leus, and M. Moonen, "Optimal training design for MIMO OFDM systems in mobile wireless channels," IEEE Trans. Signal Process, vol. 51, No. 6, pp. 1615-1624, Jun. 2003.
P. Hoeher, S. Kaiser, P. Robertson, "Two-dimensional pilot-symbol-aided channel estimation by Wiener filtering", Proc. IEEE ICASSP—97, (Apr. 1997), doi:doi:10.1109/ICASSP.1997.598897, pp. 1845-1848, XP010226500.
Jungnickel, Volker et al., "Backhaul requirements for inter-site cooperation in heterogeneous LTE-Advanced networks", 2013 IEEE International Conference on Communications Workshops (ICC), IEEE, (Jun. 9, 2013), doi:10.1109/ICCW.2013.6649363, pp. 905-910, XP032518656.
3GPP TS 38.331 V15.1.0, 3rd Generation Partnership Project; Technical Specification Group Radio Access Network; NR; Radio Resource Control (RRC); Protocol specification (Release 15), Mar. 2018.
Huawei et al.: Enhancements on CSI reporting and codebook design, 3GPP Draft; R1-1808949, 3rd Generation Partnership Project (3GPPP), Mobile Competence Centre; 650, Route des Lucioles, F-06921 Sophia—Antipolis CEDEX; France; vol. RAN WG1, No. Gotheburg, Sweden; Aug. 20, 2018-Aug. 24, 2018; Aug. 11, 2018 (Aug. 11, 2018), XP051516324.
Interdigital Communications et al, "CSI Feedback for Non-uniform Networks", 3GPP Draft; R1-112240 IDCC CSI Feedback for Non-Uniform Networks, 3rd Generation Partnership Project (3GPP), Mobile Competence Centre ; 650, Route Des Lucioles ; F-06921 Sophia—Antipolis Cedex ; FRANCE, (Aug. 16, 2011), vol. RAN WG1, No. Athens, Greece; Aug. 22, 2011, XP050537401.
Fraunhofer Iis et al, "Enhancements on Type-II CSI reporting", vol. RAN WG1, No. Spokane, USA; Nov. 12, 2018-Nov. 16, 2018, (Nov. 11, 2018), 3GPP Draft; R1-1813130, 3rd Generation Partnership Project (3GPP), Mobile Competence Centre ; 650, Route Des Lucioles ; F-06921 Sophia—Antipolis Cedex ; France, URL: http://www.3gpp.org/ftp/Meetings%5F3GPP%5FSYNC/RAN1/Docs/R1%2D1813130%2Ezip, (Nov. 11, 2018), XP051555112.
Fraunhofer Iis et al, "Enhancements on Type-II CSI: Doppler Approach", vol. RAN WG1, No. Athens, GR; Feb. 25, 2019-Mar. 1, 2019, (Feb. 15, 2019), 3GPP Draft; R1-1902124, 3rd Generation Partnership Project (3GPP), Mobile Competence Centre ; 650, Route Des Lucioles ; F-06921 Sophia—Antipolis Cedex ; France, URL: http://www.3gpp.org/ftp/tsg%5Fran/WG1%5FRL1/TSGR1%5F96/Docs/R1%2D1902124%2Ezip, (Feb. 15, 2019), XP051599819.
Samsung, "Summary of CSI enhancement for MU-MIMO", vol. RAN WG1, No. Athens, Greece; Feb. 25, 2019-Mar. 1, 2019, (Feb. 26, 2019), 3GPP Draft; R1-1902304 R16 Summary Mucsi Final, 3rd Generation Partnership Project (3GPP), Mobile Competence Centre ; 650, Route Des Lucioles ; F-06921 Sophia—Antipolis Cedex ; France, URL: http://www.3gpp.org/ftp/tsg%5Fran/WG1%5FRL1/TSGR1%5F96/Docs/R1%2D1902304%2Ezip, (Feb. 26, 2019), XP051599998.
Office Action dated Dec. 31, 2021 issued in the parallel Indian patent application No. 202037050535 (5 pages).
Office Action dated Feb. 8, 2022 issued in the parallel Japanese patent application No. 2020-567013.
Office Action dated Dec. 27, 2022 issued in the parallel CN patent application No. 201980050859.4 (8 pages).
NTT Docomo, Inc. (Rapporteur), RAN WG's progress on NR technology SI in the January adhoc meeting [online], 3GPP TSG-RAN WG2 #97 R2-1701059, Feb. 17, 2017.
Office Action dated Nov. 8, 2022 issued in the parallel Japanese patent application No. JP2020-567013 (5 pages).

* cited by examiner

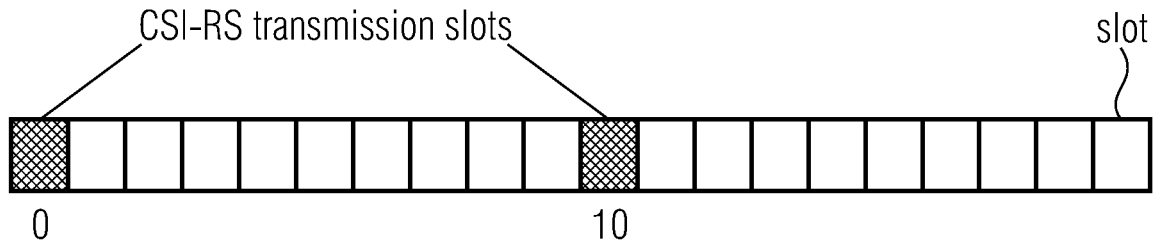
Fig. 5A
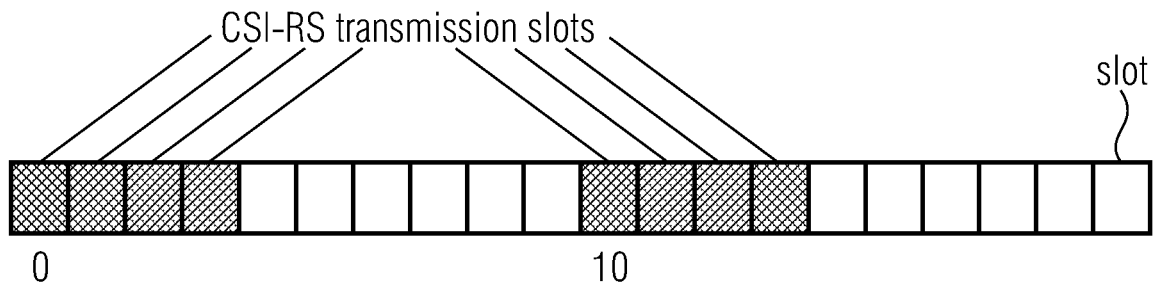
Fig. 5B
```
-- ASN1START
-- TAG-CSI-RS-BURSTDURATION-START
CSI-RS-BURSTDURATION : : = ENUMERATED {
    burstSlots0, burstSlots1, burstSlots2, burstSlots3,
burstSlots4, burstSlots5
}
-- TAG-CSI-RS-BURSTDURATION-STOP
-- ASN1STOP
```
Fig. 6

Fig. 13A

| | $f_0^{(l)}$ | $f_1^{(l)}$ | $f_0^{(l)}$ | $f_1^{(l)}$ | $f_0^{(l)}$ | $f_1^{(l)}$ | $f_0^{(l)}$ | $f_1^{(l)}$ |
|---|---|---|---|---|---|---|---|---|
| 1 | 0 | 1 | 1 | 1 | 0 | 1 | 0 | 0 |
| 0 | 1 | 1 | 0 | 1 | 0 | 0 | 0 | 1 |
| 1 | 0 | 1 | 1 | 1 | 1 | 0 | 0 | 0 |
| 0 | 1 | 1 | 1 | 1 | 0 | 0 | 0 | 1 |

Doppler index/vector beam index for two polarizations (P2, P1)

delay index/vector: $d_0^{(l)}$ 0, $d_1^{(l)}$ 1, $d_2^{(l)}$ 2, $d_3^{(l)}$ 3

Fig. 13B associated feedback information (represented by the bitmap) of selected delay vectors per beam and the selected Doppler vectors per beam and per delay $(d_1^{(l)}, f_0^{(l)}, f_1^{(l)}), (d_2^{(l)}, f_0^{(l)})$
$(d_0^{(l)}, f_0^{(l)}, f_1^{(l)}), (d_2^{(l)}, f_0^{(l)}), (d_3^{(l)}, f_1^{(l)})$
$(d_1^{(l)}, f_0^{(l)}, f_1^{(l)}), (d_2^{(l)}, f_0^{(l)})$
$(d_0^{(l)}, f_0^{(l)}, f_1^{(l)}), (d_2^{(l)}, f_0^{(l)}), (d_3^{(l)}, f_1^{(l)})$

… (1)

CSI REPORTING AND CODEBOOK STRUCTURE FOR DOPPLER-DELAY CODEBOOK-BASED PRECODING IN A WIRELESS COMMUNICATIONS SYSTEM

CROSS-REFERENCES TO RELATED APPLICATIONS

This application is a continuation of copending International Application No. PCT/EP2019/055832, filed Mar. 8, 2019, which is incorporated herein by reference in its entirety.

The present application concerns the field of wireless communications, more specifically to CSI reporting and a codebook structure for Doppler-delay codebook-based precoding in a wireless communication system.

BACKGROUND OF THE INVENTION

FIG. 1 is a schematic representation of an example of a terrestrial wireless network 100 including a core network 102 and a radio access network 104. The radio access network 104 may include a plurality of base stations $gNB_1$ to $gNB_5$, each serving a specific area surrounding the base station schematically represented by respective cells $106_1$ to $106_5$. The base stations are provided to serve users within a cell. The term base station, BS, refers to as gNB in 5G networks, eNB in UMTS/LTE/LTE-A/LTE-A Pro, or just BS in other mobile communication standards. A user may be a stationary device or a mobile device. Further, the wireless communication system may be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Further, FIG. 1 shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1 by the arrows pointing to "core". The core network 102 may be connected to one or more external networks. Further, some or all of the respective base station $gNB_1$ to $gNB_5$ may connected, e.g. via the S1 or X2 interface or XN interface in NR, with each other via respective backhaul links $116_1$ to $116_5$, which are schematically represented in FIG. 1 by the arrows pointing to "gNBs". The wireless network or communication system depicted in FIG. 1 may by an heterogeneous network having two distinct overlaid networks, a network of macro cells with each macro cell including a macro base station, like base station $gNB_1$ to $gNB_5$, and a network of small cell base stations (not shown in FIG. 1), like femto or pico base stations.

For data transmission a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink and uplink control channels (PDCCH, PUCCH) carrying for example the downlink control information (DCI), etc. For the uplink, the physical channels may further include the physical random access channel (PRACH or RACH) used by UEs for accessing the network once a UE synchronized and obtained the MIB and SIB. The physical signals may comprise reference signals or symbols (RS), synchronization signals and the like. The resource grid may comprise a frame or radio frame having a certain duration, like 10 milliseconds, in the time domain and having a given bandwidth in the frequency domain. The frame may have a certain number of subframes of a predefined length, e.g., 2 subframes with a length of 1 millisecond. Each subframe may include two slots of 6 or 7 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR, New Radio, standard.

In the wireless communication network as shown in FIG. 1 the radio access network 104 may be a heterogeneous network including a network of primary cells, each including a primary base station, also referred to as a macro base station. Further, a plurality of secondary base stations, also referred to as small cell base stations, may be provided for each of the macro cells. In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-advanced pro standard or the 5G or NR, new radio, standard.

In a wireless communication system like to one depicted schematically in FIG. 1, multi-antenna techniques may be used, e.g., in accordance with LTE or NR, to improve user data rates, link reliability, cell coverage and network capacity. To support multi-stream or multi-layer transmissions, linear precoding is used in the physical layer of the communication system. Linear precoding is performed by a precoder matrix which maps layers of data to antenna ports. The precoding may be seen as a generalization of beamforming, which is a technique to spatially direct/focus data transmission towards an intended receiver. The precoder matrix to be used at the gNB to map the data to the transmit antenna ports is decided using channel state information, CSI.

In a communication system as described above, such as LTE or New Radio (5G), downlink signals convey data signals, control signals containing down link, DL, control information (DCI), and a number of reference signals or symbols (RS) used for different purposes. A gNodeB (or gNB or base station) transmits data and control information (DCI) through the so-called physical downlink shared channel (PDSCH) and physical downlink control channel (PDCCH) or enhanced PDCCH (ePDCCH), respectively. Moreover, the downlink signal(s) of the gNB may contain one or multiple types of RSs including a common RS (CRS) in LTE, a channel state information RS (CSI-RS), a demodulation RS (DM-RS), and a phase tracking RS (PT-RS). The CRS is transmitted over a DL system bandwidth part, and used at the user equipment (UE) to obtain a channel estimate to demodulate the data or control information. The CSI-RS is transmitted with a reduced density in the time and frequency domain compared to CRS, and used at the UE for channel estimation/channel state information (CSI) acquisition. The DM-RS is transmitted only in a bandwidth part of the respective PDSCH and used by the UE for data demodulation. For signal precoding at the gNB, several CSI-RS reporting mechanism were introduced such as non-precoded CSI-RS and beamformed CSI-RS reporting (see reference [1]). For a non-precoded CSI-RS, a one-to-one mapping between a CSI-RS port and a transceiver unit, TXRU, of the antenna array at the gNB is utilized. Therefore, non-precoded CSI-RS provides a cell-wide coverage where the different CSI-RS ports have the same beam-direction and beam-width. For beamformed/precoded UE-specific or non-UE-specific CSI-RS, a beam-forming operation is applied over a single- or multiple antenna ports to have several narrow beams with high gain in different directions and therefore, no cell-wide coverage.

In a wireless communication system employing time division duplexing, TDD, due to channel reciprocity, the channel state information (CSI) is available at the base station (gNB). However, when employing frequency division duplexing, FDD, due to the absence of channel reciprocity, the channel has to be estimated at the UE and feed back to the gNB. FIG. 2 shows a block-based model of a MIMO DL transmission using codebook-based-precoding in accordance with LTE release 8. FIG. 2 shows schematically the base station 200, gNB, the user equipment, UE, 202 and the channel 204, like a radio channel for a wireless data communication between the base station 200 and the user equipment 202. The base station includes an antenna array $ANT_T$ having a plurality of antennas or antenna elements, and a precoder 206 receiving a data vector 208 and a precoder matrix F from a codebook 210. The channel 204 may be described by the channel tensor/matrix 212. The user equipment 202 receives the data vector 214 via an antenna or an antenna array $ANT_R$ having a plurality of antennas or antenna elements. A feedback channel 216 between the user equipment 202 and the base station 200 is provided for transmitting feedback information. The previous releases of 3GPP up to Rel.15 support the use of several downlink reference symbols (such as CSI-RS) for CSI estimation at the UE. In FDD systems (up to Rel. 15), the estimated channel at the UE is reported to the gNB implicitly where the CSI transmitted by the UE over the feedback channel includes the rank index (RI), the precoding matrix index (PMI) and the channel quality index (CQI) (and the CRI from Rel. 13) allowing, at the gNB, deciding the precoding matrix, and the modulation order and coding scheme (MCS) of the symbols to be transmitted. The PMI and the RI are used to determine the precoding matrix from a predefined set of matrices a called 'codebook'. The codebook, e.g., in accordance with LTE, may be a look-up table with matrices in each entry of the table, and the PMI and RI from the UE decide from which row and column of the table the precoder matrix to be used is obtained. The precoders and codebooks are designed up to Rel. 15 for gNBs equipped with one-dimensional Uniform Linear Arrays (ULAs) having $N_1$ dual-polarized antennas (in total $N_t=2N_1$ antennas), or with two-dimensional Uniform Planar Arrays (UPAs) having dual-polarized antennas at $N_1 N_2$ positions (in total $N_t=2N_1 N_2$ antennas). The ULA allows controlling the radio wave in the horizontal (azimuth) direction only, so that azimuth-only beamforming at the gNB is possible, whereas the UPA supports transmit beamforming on both vertical (elevation) and horizontal (azimuth) directions, which is also referred to as full-dimension (FD) MIMO. The codebook, e.g., in the case of massive antenna arrays such as FD-MIMO, may be a set of beamforming weights that forms spatially separated electromagnetic transmit/receive beams using the array response vectors of the array. The beamforming weights (also referred to as the 'array steering vectors') of the array are amplitude gains and phase adjustments that are applied to the signal fed to the antennas (or the signal received from the antennas) to transmit (or obtain) a radiation towards (or from) a particular direction. The components of the precoder matrix are obtained from the codebook, and the PMI and the RI are used to 'read' the codebook and obtain the precoder. The array steering vectors may be described by the columns of a 2D Discrete Fourier Transform (DFT) matrix when ULAs or UPAs are used for signal transmission.

The precoder matrices used in the Type-I and Type-II CSI reporting schemes in 3GPP New Radio Rel. 15 are defined in frequency-domain and have a dual-stage structure: $F(s)=F_1 F_2(s)$, $s=0 \ldots, S-1$ (see reference [2]), where S denotes the number of subbands. The matrix $F_1$ is a wideband matrix, independent on index s, and contains U spatial beamforming vectors (the so-called spatial beams) $b_u \in \mathbb{C}^{N_1 N_2 \times 1}$, $u=1, \ldots, U$ selected out of a DFT-codebook matrix, $$F_1 = \begin{bmatrix} b_1, \ldots, b_U & 0 \ldots 0 \\ 0 \ldots 0 & b_1, \ldots, b_U \end{bmatrix} \in \mathbb{C}^{2N_1 N_2 \times 2U}.$$

The matrix $F_2(s)$, is a selection/combining/co-phasing matrix that selects/combines/co-phases the beams defined in $F_1$ for the s-th configured sub-band.

For example, for a rank-1 transmission and Type-I CSI reporting, $F_2(s)$ is given for a dual-polarized antenna array by [2]

$$F_2(s) = \begin{bmatrix} e_u \\ e^{j\delta_1} e_u \end{bmatrix} \in \mathbb{C}^{2U \times 1},$$

where $e_u \in \mathbb{C}^{U \times 1}$, u=1, 2, ..., U contains zeros at all positions, except the u-th position which is one. Such a definition of $e_u$ selects the u-th vector for each polarization of the antenna array, and combines them across both polarizations. Furthermore, $\delta_1$ is a quantized phase adjustment for the second polarization of the antenna array.

For example, for a rank-1 transmission and Type-II CSI reporting, $F_2(s)$ is given for dual-polarized antenna arrays by [2]

$$F_2(s) = \begin{bmatrix} e^{j\delta_1} p_1 \\ \vdots \\ e^{j\delta_{2U}} p_{2U} \end{bmatrix} \in \mathbb{C}^{U \cdot 2 \times 1}$$

where $p_u$ and $\delta_u$, u=1, 2, ..., 2U are quantized amplitude and phase beam-combining coefficients, respectively.

For rank-R transmission, $F_2(s)$ contains R vectors, where the entries of each vector are chosen to combine single or multiple beams within each polarization and/or combining them across both polarizations.

The selection of the matrices $F_1$ and $F_2(s)$ is performed by the UE based on the knowledge of the current channel conditions. The selected matrices are contained in the CSI report in the form of a RI and a PMI and used at the gNB to update the multi-user precoder for the next transmission time interval.

An inherent drawback of the current CSI reporting formats described in [2] for the implicit feedback scheme is that the RI and PMI only contain information of the current channel conditions. Consequently, the CSI reporting rate is related to the channel coherence time which defines the time duration over which the channel is considered to be not varying. This means, in quasi-static channel scenarios, where the UE does not move or moves slowly, the channel coherence time is large and the CSI needs to be less frequently updated. However, if the channel conditions change fast, for example due to a high movement of the UE in a multi-path channel environment, the channel coherence time is short and the transmit signals experience severe fading caused by a Doppler-frequency spread. For such channel conditions, the CSI needs to be updated frequently which causes a high feedback overhead. Especially, for future NR systems (Rel. 16) that are likely to be more multi-user centric, the multiple CSI reports from users in highly-dynamic channel scenarios will drastically reduce the overall efficiency of the communication system.

To overcome this problem, several explicit CSI feedback schemes have been proposed that take into account the channel-evolution over time (see reference [3]). Here, explicit CSI refers to reporting of explicit channel coefficients from the UE to the gNB without a codebook for the precoder selection at the UE. Those schemes have in common estimating the parameters of the dominant channel taps of the multipath propagation channel as well as their time-evolution at the UE. For example, in [3] each channel tap is modelled as a sum of sub-channel taps where each sub-tap is parameterized with a Doppler-frequency shift and path gain. The estimated parameters for each channel tap are fed back to the base station, where they are used with a channel model for time-domain based channel prediction before downlink precoding. The availability of explicit CSI comes at an increased overhead for the feedback channel compared to implicit-based channel feedback, especially for slow-varying channels, which is not desired.

For example, WO 2018/052255 A1 relates to explicit CSI acquisition to represent the channel in wireless communication systems using the principle component analysis (PCA), which is applied on the frequency-domain channel matrix, covariance matrix, or eigenvector of the channel matrix. Thus, a codebook approach for downlink signal precoding at the base station equipped with a two-dimensional array and CSI reporting configuration is proposed. However, an inherent drawback of the proposed CSI reporting scheme is that the CSI report from a user contains only information about the selected CQI, PMI and RI with respect to the current MIMO channel state/realization and does not take into account channel variations over time caused by small-scale channel fading. Therefore, when users experience fast-fading channel conditions, a frequent CSI update is needed which causes a high feedback overhead over time. Moreover, the proposed CSI reporting scheme is restricted to one beam per layer PMI feedback which leads to a limited CSI accuracy and turns out to be insufficient for CSI acquisition in multi-user MIMO.

Moreover, to track channel-evolution over time, the reference signal need be spread over time. In the current 3GPP NR specification [1], a single shot CSI-RS is configured at a particular time slot. Such slots of CSI-RS are periodically transmitted, or triggered on demand. The configuration of a CSI-RS resource set(s) which may refer to NZP-CSI-RS, CSI-IM or CSI-SSB resource set(s) [2] is performed using the following higher layer parameters (see reference [4]):

CSI-ResourceConfig—The resource set(s) configuration consists of the IDs of the resources configured in the resource set(s), the type of each CSI-RS resource in terms of its periodicity, and the bandwidth part they are configured in.

CSI-ResourcePeriodicityAndOffset—Mentions the periodicity of a CSI-RS resource in terms of number of slots and offset of CSI-RS.

CSI-RS-ResourceMapping—Mentions the resource elements in the time-frequency map the CSI-RS resource is mapped to, number of CSI-RS ports, the CDM type used for the mapped reference symbols, and the density and bandwidth of occupancy of the reference symbols in the frequency domain.

frequencyDomainAllocation
nrofPorts
firstOFDMSymbolInTimeDomain
firstOFDMSymbolInTimeDomain2
cdm-Type
density
freqBand While the CSI-RS design may be used to acquire CSI for a link adaptation (modulation and coding scheme—MCS), and for selecting a precoding matrix from a specific channel realization/snapshot, it cannot track channel evolution in time to estimate Doppler-frequency components of a MIMO channel.

It is noted that the information in the above section is only for enhancing the understanding of the background of the invention and therefore it may contain information does not form known technology that is already known to a person of ordinary skill in the art.

SUMMARY

According to an embodiment, a communication device for providing a channel state information, CSI, feedback in a wireless communication system may have: a transceiver configured to receive, from a transmitter a radio signal via a MIMO channel, the radio signal including downlink reference signals according to a reference signal configuration including a number of antenna ports, and downlink signals including the reference signal configuration; and a processor configured to: estimate a CSI using measurements on the downlink reference signals on the radio channel, the downlink reference signals provided over a certain observation time, select a Doppler-delay precoder matrix for a composite Doppler-delay-beam three-stage precoder, the Doppler-delay-beam three-stage precoder being based on one or more codebooks, the one or more codebooks including: one or more transmit-side spatial beam components of the composite Doppler-delay-beam three-stage precoder, one or more delay components of the composite Doppler-delay-beam three-stage precoder, and one or more Doppler-frequency components of the composite Doppler-delay-beam three-stage precoder, calculate either one or more of a channel quality indicator, CQI, and/or a precoder matrix indicator, PMI, and/or a rank indicator, RI, using the CSI and the composite Doppler-delay-beam three-stage precoder with the selected Doppler-delay-beam precoder matrix, and report to the transmitter the CSI feedback including either one or more of the CQI, and/or the PMI and/or the RI, wherein the PMI and RI are used to indicate the Doppler-delay-beam three-stage composite precoder matrix for the configured antenna ports, wherein the communication device is configured by a base station or another network entity with one or more parameters, the parameter indicating a number of delay components, like delay DFT vectors, and/or a number of Doppler-frequency components, like Doppler DFT vectors, to be used by the communication device when calculating the Doppler-delay precoder matrix, and wherein the communication device is configured to select from the one or more codebooks a subset of D delay components and/or a subset of F Doppler-frequency components and to use the selected subset of delay components for each polarization and each spatial beam performed by a transmitter, or by a base station or by a network node for transmitting and receiving in a wireless communication system, the method including: transmitting, to a communication device, downlink reference signals according to a CSI-RS configuration including a number of CSI-RS antenna ports and indicating a time-domain-repetition of the downlink reference signals and downlink signals including the CSI-RS configuration; receiving, at the transmitter, uplink signals including one or more CSI reports from the communication device, each CSI report indicating D delay components and/or F Doppler-frequency components selected by the communication device from one or more codebooks and used by the communication device when calculating the precoder matrix; extracting, at the transmitter, at least the two component precoder matrix identifier and the rank indicator from the plurality of CSI reports; constructing, at the transmitter, a precoder matrix applied on the antenna ports using a first component and a second component of the PMI, and determining, responsive to the constructed precoder matrix, beamforming weights for a precoder connected to an antenna array of the transmitter and/or the selected subset of Doppler-frequency components for each polarization, each spatial beam and each delay, when calculating the Doppler-delay precoder matrix.

According to another embodiment, a transmitter in a wireless communication system including a communication device may have: an antenna array including a plurality of antennas for a wireless communication with one or more communication devices for providing a channel state information, CSI, feedback to the transmitter; and a precoder connected to the antenna array, the precoder to apply a set of beamforming weights to one or more antennas of the antenna array to form, by the antenna array, one or more transmit beams or one or more receive beams, a transceiver configured to: transmit, to the communication device, downlink reference signals according to a CSI-RS configuration including a number of CSI-RS antenna ports and indicating a time-domain-repetition of the downlink reference signals, e.g., in terms of a number of consecutive slots the downlink reference signals are repeated in, and downlink signals including the CSI-RS configuration; and receive uplink signals including a plurality of CSI reports from the communication device; and a processor configured to: extract at least the precoder matrix identifier and the rank indicator from the plurality of CSI reports; and construct a precoder matrix applied on the antenna ports using a first component and a second component of the PMI, and determine the beamforming weights responsive to the constructed precoder matrix.

According to another embodiment, a method for providing a channel state information, CSI, feedback in a wireless communication system may have the steps of: receiving, from a transmitter, a radio signal via a MIMO channel, the radio signal including downlink reference signals according to a reference signal configuration including a number of antenna ports, and downlink signals including the reference signal configuration; estimating, at the communication device, a CSI using measurements on the downlink reference signals on the radio channel, the downlink reference signals provided over a certain observation time, selecting, at the communication device, a Doppler-delay precoder matrix for a composite Doppler-delay-beam three-stage precoder, the Doppler-delay-beam three-stage precoder being based on one or more codebooks, the one or more codebooks including: one or more transmit-side spatial beam components of the composite Doppler-delay-beam three-stage precoder, one or more delay components of the composite Doppler-delay-beam three-stage precoder, and one or more Doppler-frequency components of the composite Doppler-delay-beam three-stage precoder, calculating, at the communication device, one or more of a channel quality indicator, CQI, a precoder matrix indicator, PMI, and a rank indicator, RI, using the explicit CSI and the composite Doppler-delay-beam three-stage precoder with the selected Doppler-delay-beam precoder matrix, and reporting from the communication device to the transmitter the CSI feedback including one or more of the CQI, the PMI and the RI, wherein the PMI and RI are used to indicate the Doppler-delay-beam three-stage composite precoder matrix for the configured antenna ports, wherein the communication device is configured by a base station or another network entity with one or more parameters, the parameter indicating a number of delay components, like delay DFT vectors), and/or a number of Doppler-frequency components, like Doppler DFT vectors), to be used by the communication device when calculating the Doppler-delay precoder matrix, and wherein the method further includes: selecting from the one or more codebooks a subset of D delay components and/or a subset of F Doppler-frequency components, and using the selected subset of delay components for each polarization and each spatial beam and/or the selected subset of Doppler-frequency components for each polarization, each spatial beam and each delay, when calculating the Doppler-delay precoder matrix.

According to another embodiment, a method performed by a transmitter, or by a base station or by a network node for transmitting and receiving in a wireless communication system may have the steps of: transmitting, to a communication device, downlink reference signals according to a CSI-RS configuration including a number of CSI-RS antenna ports and indicating a time-domain-repetition of the downlink reference signals and downlink signals including the CSI-RS configuration; receiving, at the transmitter, uplink signals including one or more CSI reports from the communication device, each CSI report indicating D delay components and/or F Doppler-frequency components selected by the communication device from one or more codebooks and used by the communication device when calculating the precoder matrix; extracting, at the transmitter, at least the two component precoder matrix identifier and the rank indicator from the plurality of CSI reports; constructing, at the transmitter, a precoder matrix applied on the antenna ports using a first component and a second component of the PMI, and determining, responsive to the constructed precoder matrix, beamforming weights for a precoder connected to an antenna array of the transmitter.

Another embodiment may have a non-transitory digital storage medium having a computer program stored thereon to perform the method for providing a channel state information, CSI, feedback in a wireless communication system, the method having the steps of: receiving, from a transmitter, a radio signal via a MIMO channel, the radio signal including downlink reference signals according to a reference signal configuration including a number of antenna ports, and downlink signals including the reference signal configuration; estimating, at the communication device, a CSI using measurements on the downlink reference signals on the radio channel, the downlink reference signals provided over a certain observation time, selecting, at the communication device, a Doppler-delay precoder matrix for a composite Doppler-delay-beam three-stage precoder, the Doppler-delay-beam three-stage precoder being based on one or more codebooks, the one or more codebooks including: one or more transmit-side spatial beam components of the composite Doppler-delay-beam three-stage precoder, one or more delay components of the composite Doppler-delay-beam three-stage precoder, and one or more Doppler-frequency components of the composite Doppler-delay-beam three-stage precoder, calculating, at the communication device, one or more of a channel quality indicator, CQI, a precoder matrix indicator, PMI, and a rank indicator, RI, using the explicit CSI and the composite Doppler-delay-beam three-stage precoder with the selected Doppler-delay-beam precoder matrix, and reporting from the communication device to the transmitter the CSI feedback including one or more of the CQI, the PMI and the RI, wherein the PMI and RI are used to indicate the Doppler-delay-beam three-stage composite precoder matrix for the configured antenna ports, wherein the communication device is configured by a base station or another network entity with one or more parameters, the parameter indicating a number of delay components, like delay DFT vectors), and/or a number of Doppler-frequency components, like Doppler DFT vectors), to be used by the communication device when calculating the Doppler-delay precoder matrix, and wherein the method further includes: selecting from the one or more codebooks a subset of D delay components and/or a subset of F Doppler-frequency components, and using the selected subset of delay components for each polarization and each spatial beam and/or the selected subset of Doppler-frequency components for each polarization, each spatial beam and each delay, when calculating the Doppler-delay precoder matrix, when said computer program is run by a computer.

Another embodiment may have a non-transitory digital storage medium having a computer program stored thereon to perform the method performed by a transmitter, or by a base station or by a network node for transmitting and receiving in a wireless communication system, the method including: transmitting, to a communication device, downlink reference signals according to a CSI-RS configuration including a number of CSI-RS antenna ports and indicating a time-domain-repetition of the downlink reference signals and downlink signals including the CSI-RS configuration; receiving, at the transmitter, uplink signals including one or more CSI reports from the communication device, each CSI report indicating D delay components and/or F Doppler-frequency components selected by the communication device from one or more codebooks and used by the communication device when calculating the precoder matrix; extracting, at the transmitter, at least the two component precoder matrix identifier and the rank indicator from the plurality of CSI reports; constructing, at the transmitter, a precoder matrix applied on the antenna ports using a first component and a second component of the PMI, and determining, responsive to the constructed precoder matrix, beamforming weights for a precoder connected to an antenna array of the transmitter, when said computer program is run by a computer.

Another embodiment may have a network node including a processor and a memory, said memory including instructions executable by said processor wherein said network node is operative to perform the inventive method.

BRIEF DESCRIPTION OF THE DRAWINGS

Embodiments of the present invention will be detailed subsequently referring to the appended drawings, in which:

FIG. 5A illustrates a CSI-RS with a periodicity of 10 slots and no repetition (CSI-RS-BurstDuration not configured or CSI-RS-BurstDuration=0);

FIG. 5B illustrates a CSI-RS with a periodicity of 10 slots and repetition of 4 slots (CSI-RS-BurstDuration=4);

FIG. 6 illustrates a CSI-RS-BurstDuration information element;

FIGS. 13A and 13B illustrates an example of two identical sub-bitmaps for each polarization (see FIG. 13A) and corresponding feedback information (see FIG. 13B)

DETAILED DESCRIPTION OF THE INVENTION

In the following, advantageous embodiments of the present invention are described in further detail with reference to the enclosed drawings in which elements having the same or similar function are referenced by the same reference signs.

Figure 1:
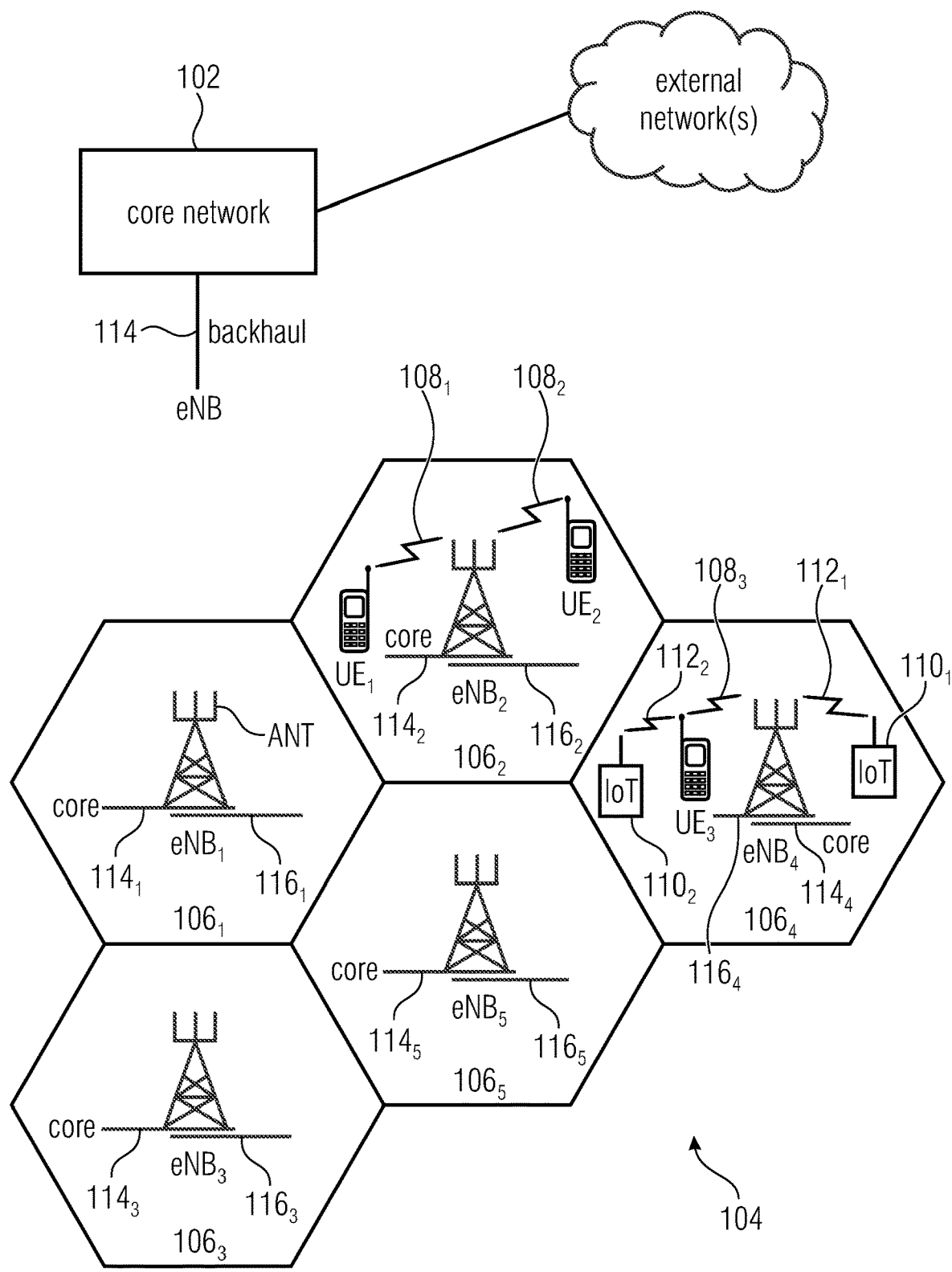
FIG. 1 shows a schematic representation of an example of a wireless communication system.
Figure 2:
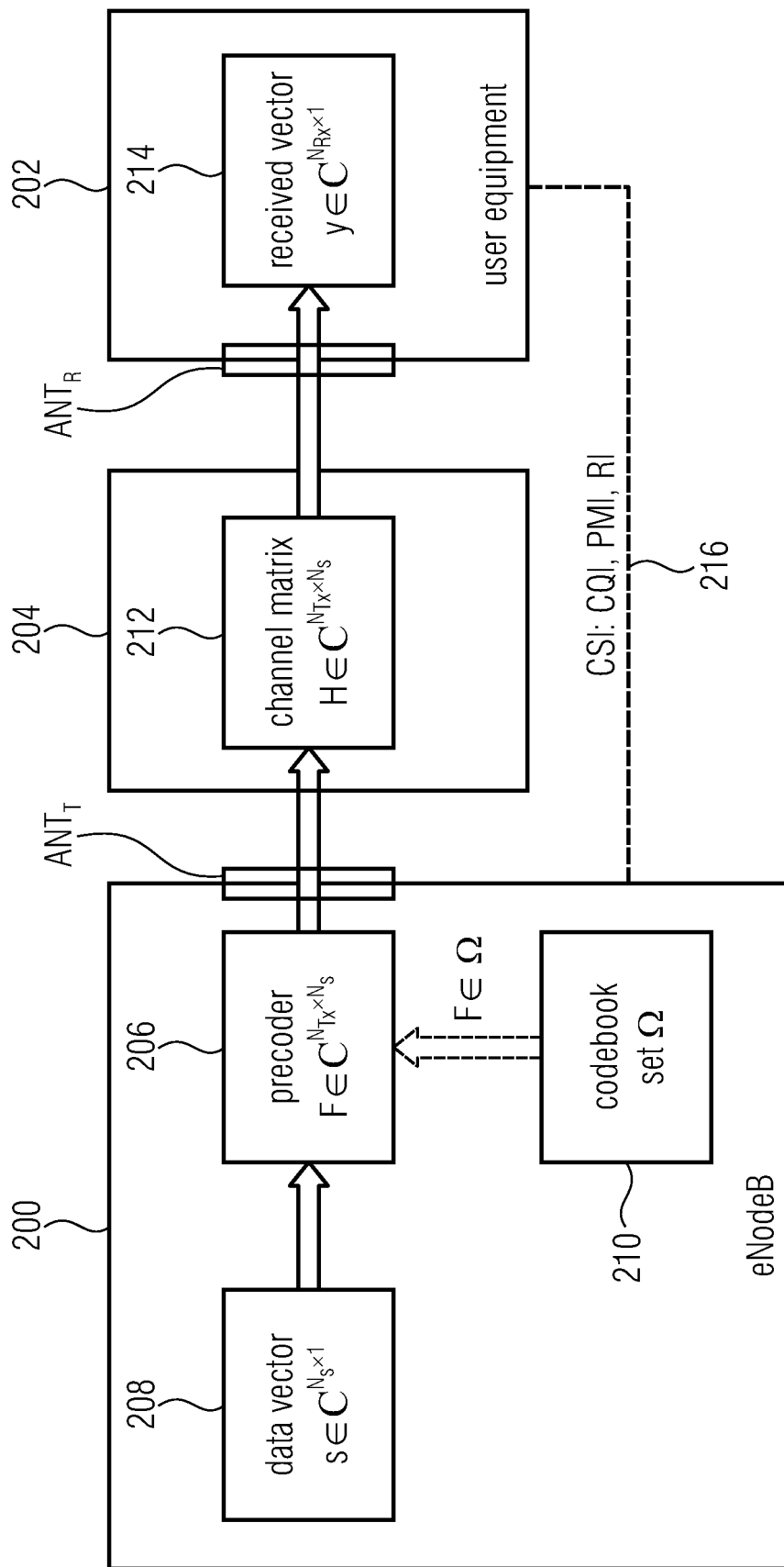
FIG. 2 shows a block-based model of a MIMO DL transmission using codebook-based-precoding in accordance with LTE release 8.
Figure 3:
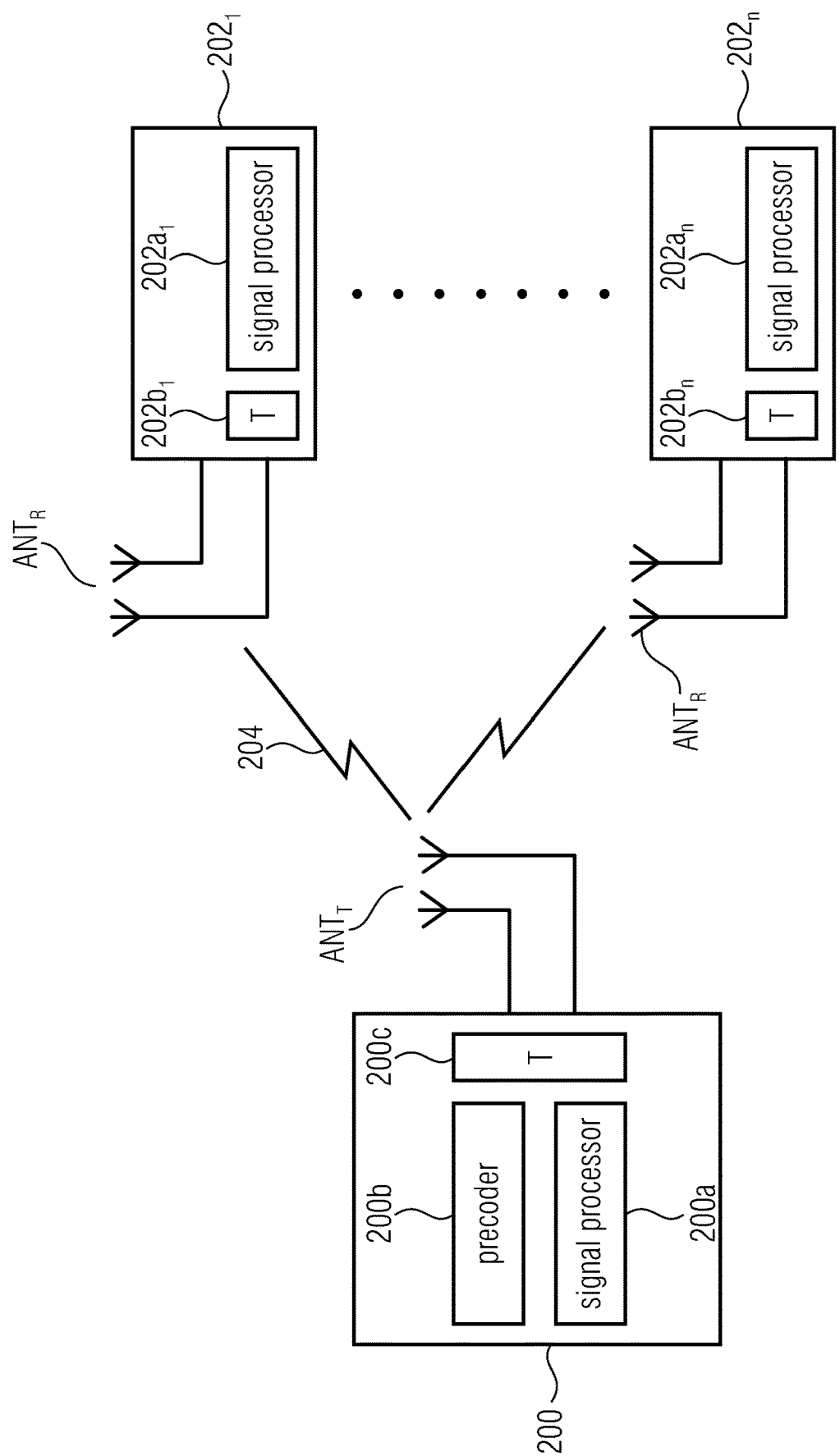
FIG. 3 is a schematic representation of a wireless communication system for communicating information between a transmitter, which may operate in accordance with the inventive teachings described herein, and a plurality of receivers, which may operate in accordance with the inventive teachings described herein.

Embodiments of the present invention may be implemented in a wireless communication system or network as depicted in FIG. 1 or FIG. 2 including transmitters or transceivers, like base stations, and communication devices (receivers) or users, like mobile or stationary terminals or IoT devices, as mentioned above. FIG. 3 is a schematic representation of a wireless communication system for communicating information between a transmitter 200, like a base station, and a plurality of communication devices $202_1$ to $202_n$, like UEs, which are served by the base station 200. The base station 200 and the UEs 202 may communicate via a wireless communication link or channel 204, like a radio link. The base station 200 includes one or more antennas $ANT_T$ or an antenna array having a plurality of antenna elements, and a signal processor 200a. The UEs 202 include one or more antennas $ANT_R$ or an antenna array having a plurality of antennas, a signal processor $202a_1$, $202a_n$, and a transceiver $202b_1$, $202b_n$. The base station 200 and the respective UEs 202 may operate in accordance with the inventive teachings described herein.

Communication Device

The present invention provides (see for example claim 1) a communication device for providing a channel state information, CSI, feedback in a wireless communication system, the communication device comprising:

a transceiver configured to receive, from a transmitter a radio signal via a time-variant, frequency-selective MIMO channel, the radio signal including downlink reference signals according to a reference signal configuration comprising a number of antenna ports, and downlink signals comprising the reference signal configuration; and a processor configured to estimate an explicit CSI in the frequency domain using measurements on the downlink reference signals on the radio channel, the downlink reference signals provided over a certain observation time, select a Doppler-delay precoder matrix (W) for a composite precoder, the Doppler-delay-beam three-stage precoder, the Doppler-delay-beam three-stage precoder being based on one or more codebooks, the one or more codebooks including one or more transmit-side spatial beam components of the composite Doppler-delay-beam three-stage precoder, one or more delay components of the composite Doppler-delay-beam three-stage precoder, and one or more Doppler-frequency components of the composite Doppler-delay-beam three-stage precoder, calculate either one or more of a channel quality indicator, CQI, and/or a precoder matrix indicator, PMI, and/or a rank indicator, RI, using the explicit CSI and the composite Doppler-delay-beam three-stage precoder with the selected Doppler-delay-beam precoder matrix (W), and report to the transmitter the CSI feedback including either one or more of the CQI, and/or the PMI and/or the RI, wherein the PMI and RI are used to indicate the Doppler-delay-beam three-stage composite precoder matrix for the configured antenna ports, wherein the communication device comprises one or more parameters (D, F), the parameter indicating a number of delay components, like delay DFT vectors ($D_u^{(l)}$), and/or a number of Doppler-frequency components, like Doppler DFT vectors ($F_u^{(l)}$), to be used by the communication device when calculating the Doppler-delay precoder matrix (W), and wherein the communication device is configured to select from the one or more codebooks a subset of D delay components and/or a subset of F Doppler-frequency components and to use the selected subset of delay components for each polarization (p) and each spatial beam (u) and/or the selected subset of Doppler-frequency components for each polarization (p), each spatial beam (u) and each delay (d), when calculating the Doppler-delay precoder matrix (W).

The present invention provides (see for example claim 2) a communication device for providing a channel state information, CSI, feedback in a wireless communication system, the communication device comprising:

a transceiver configured to receive, from a transmitter a radio signal via a time-variant, frequency-selective MIMO channel, the radio signal including downlink reference signals according to a reference signal configuration comprising a number of antenna ports, and downlink signals comprising the reference signal configuration; and a processor configured to estimate an explicit CSI in the frequency domain using measurements on the downlink reference signals on the radio channel, the downlink reference signals provided over a certain observation time, select a delay precoder matrix (W) for a composite precoder, the composite precoder being based on one or more codebooks, the one or more codebooks including one or more transmit-side spatial beam components of the composite precoder, and one or more delay components of the composite precoder, calculate either one or more of a channel quality indicator, CQI, and/or a precoder matrix indicator, PMI, and/or a rank indicator, RI, using the explicit CSI and the composite precoder with the selected delay precoder matrix (W), and report to the transmitter the CSI feedback including either one or more of the CQI, and/or the PMI and/or the RI, wherein the PMI and RI are used to indicate the composite precoder matrix for the configured antenna ports, wherein the communication device comprises one or more parameters (D, F), the parameter indicating a number of delay components, like delay DFT vectors ($D_u^{(l)}$), to be used by the communication device when calculating the delay precoder matrix (W), and wherein the communication device is configured to select from the one or more codebooks a subset of D delay components and to use the selected subset of delay components for each polarization (p) and each spatial beam (u) when calculating the delay precoder matrix (W).

In accordance with embodiments (see for example claim 3) the one or more parameters comprise the parameter D, the delay components comprise delay DFT or DCT vectors, and the communication device is configured to select from the one or more codebooks a subset of $D_u^{(l)}=D$ delay vectors, which are common to all beam indices of the precoder, so that $d_{p,u,d}^{(l)}=d_d^{(l)}$, and to use only the selected subset of D delay vectors when calculating the precoder matrix (W), wherein d indicates the delay vector of the precoder, and l, p, u and d indicate the layer index, the polarization index, the spatial beam index, and the delay index of the delay vector, respectively.

In accordance with embodiments (see for example claim 4) the parameter D depends on a codebook size S of a codebook from which the delay vectors are selected, and wherein the communication device comprises a parameter p so that D=pS, wherein p≤1 so as to control the feedback overhead.

In accordance with embodiments (see for example claim 5) the communication device is configured to report an information or indication of the selected subset of D delay vectors as a part of a CSI report, e.g., by indicating the selected D delay vectors using $$\left\lceil \log 2 \binom{S}{D} \right\rceil \text{bits.}$$

In accordance with embodiments (see for example claim 6) the communication device is configured to report an information or an indication of the selected $D'_{p,u}\leq D$ delay vectors per beam index (u) and/or per polarization index (p), out of the selected subset of D common delay vectors.

In accordance with embodiments (see for example claim 7) the delay vectors in the one or more codebooks are grouped into $O_2$ subgroups, wherein each subgroup, $1\leq q_2 \leq O_2$, contains S orthogonal DFT or DCT vectors, wherein $q_2$ denotes the oversampling factor of the codebook, and wherein the communication device is configured to select the subset of D delay vectors for the l-th layer from a single subgroup.

In accordance with embodiments (see for example claim 8) the one or more parameters comprise the parameter F, the Doppler-frequency components comprise Doppler DFT or DCT vectors, and the communication device is configured to select from the one or more codebooks a subset of $F_u^{(l)}=F$ Doppler-frequency vectors, common to all beam indices and common to all delay indices for the precoder, so that $f_{p,u,d,v}^{(l)}=f_v^{(l)}$, and to use the selected F Doppler-frequency vectors when calculating the precoder matrix (W), wherein f indicates the Doppler-frequency vector, and l indicates the layer index, p indicates the polarization index, u indicates the spatial beam index, d indicates the delay index and v indicates the Doppler-frequency index of the vector.

In accordance with embodiments (see for example claim 9) the parameter F depends on a codebook size T of a codebook from which the Doppler-frequency vectors are selected, and wherein the communication device comprises a parameter p so that F=pT, wherein p≤1 so as to control the feedback overhead.

In accordance with embodiments (see for example claim 10) the communication device is configured to report an information or indication of the selected subset of F Doppler-frequency vectors as a part of a CSI report, e.g., by indicating the selected F Doppler-frequency vectors using $$\left\lceil \log 2 \binom{T}{F} \right\rceil \text{bits.}$$

In accordance with embodiments (see for example claim 11) the communication device is configured to report an information or indication of the selected $F'_{p,u,d}\leq F$ Doppler-frequency vectors per beam index (u), and/or delay index (d) and/or polarization index (p), out of the selected subset of F common Doppler-frequency vectors.

In accordance with embodiments (see for example claim 12) the Doppler-frequency vectors in the one or more codebooks are grouped into $O_3$ subgroups, wherein each subgroup, $1\leq q_3 \leq O_3$, contains T orthogonal DFT or DCT vectors, wherein $q_3$ denotes the oversampling factor of the codebook, and wherein the communication device is configured to select the F DFT or DCT vectors for the l-th layer from a single subgroup.

In accordance with embodiments (see for example claim 13) the communication device comprises a further parameter (U), the further parameter indicating a number of spatial beam components, like beam DFT vectors ($U^{(l)}$), to be used by the communication device when calculating the Doppler-delay precoder matrix (W), and the communication device is configured to select from the one or more codebooks U spatial beam components and to use them when calculating the Doppler-delay precoder matrix (W), the selected spatial beam components used for each polarization (p).

In accordance with embodiments (see for example claim 14) the further parameters comprise the parameter U, the spatial beam components comprise beam DFT vectors, and the communication device is configured to select from the one or more codebooks a subset of $U^{(l)}=U$ beam DFT vectors, which are common to all polarizations, and to use the selected U beam DFT vectors when calculating the precoder matrix (W), wherein l indicates the layer of the precoder.

In accordance with embodiments (see for example claim 15) the communication device is configured to report an information or indication of $U^{(l)}$ selected beam DFT vectors as a part of a CSI report, e.g., by indicating the selected $U^{(l)}$ beam DFT vectors using $$\left\lceil \log 2 \binom{N_1 N_2}{U^{(l)}} \right\rceil$$

bits.

In accordance with embodiments (see for example claim 16) the communication device is configured to report information or the value of the selected $\tilde{U}^{(l)} \leq U^{(l)}$ beam DFT vectors.

In accordance with embodiments (see for example claim 17) the beam vectors in the one or more codebooks are grouped into $O_{1,1} \times O_{1,2}$ subgroups, wherein each subgroup, $1 \leq q_{1,1} \leq O_{1,1}$, $1 \leq q_{1,2} \leq O_{1,2}$, contains $N_1 N_2$ orthogonal DFT vectors, and wherein the communication device is configured to select the $U^{(l)}$ DFT beam vectors for the l-th layer from a single subgroup and to report the selected subgroup indices $q_{1,1}$, $g_{1,2}$.

In accordance with embodiments (see for example claim 18) the information of the selected delay components, like the selected delay vectors per beam, and/or the information of the selected Doppler-frequency components, like the selected Doppler-frequency vectors per beam and per delay, is represented by a bitmap, where each bit in the bitmap is associated with a spatial beam component, a delay component, and/or a Doppler-frequency component and a combining coefficient.

In accordance with embodiments (see for example claim 19) the communication device is configured to select $\overline{D} \leq D$ delay vectors, wherein the value of $\overline{D}$ is chosen by the communication device, the $\overline{D} \leq D$ delay vectors being common to all beam indices, and wherein the communication device is configured to use the selected $\overline{D}$ delay vectors when calculating the precoder matrix (W), and/or the communication device is configured to select $\overline{F} \leq F$ Doppler-frequency vectors, wherein the value of $\overline{F}$ is chosen by the communication device, the $\overline{F} \leq F$ Doppler-frequency vectors being common to all beam and delay indices, and wherein the communication device is configured to use the selected $\overline{F}$ Doppler-frequency vectors when calculating the precoder matrix (W).

In accordance with embodiments (see for example claim 20) the selected delay DFT vectors per beam from the common subset of D delay DFT vectors and the selected Doppler DFT vectors per beam and per delay from the common subset of F Doppler DFT vectors are identical for both polarizations, and the bitmap of size $2U^{(l)}D \times F$ comprises two identical sub-bitmaps of identical size of size $U^{(l)}D \times F$.

In accordance with embodiments (see for example claim 21) the communication device is configured to report only the non-zero combining coefficients $\gamma_{p,u,d,v}^{(l)}$.

In accordance with embodiments (see for example claim 22) the communication device is configured to select not more than $K_0$ non-zero combining coefficients $\gamma_{p,u,d,v}^{(l)}$ to calculate the precoder matrix (W), the parameter $K_0$ depending on the number of configured delay DFT vectors D, the number of configured Doppler DFT vectors F, and the number of configured DFT beams $U^{(l)}$.

In accordance with embodiments (see for example claim 23) the parameter $K_0$ is given by $K_0 = \beta 2DFU^{(l)}$ or $K_0 = \beta DFU^{(l)}$, wherein the parameter $\beta \leq 1$ controls the feedback overhead.

In accordance with embodiments (see for example claim 24) the communication device is configured to select
not more than $K_0$ non-zero combining coefficients $\gamma_{p,u,d,v}^{(l)}$ per layer, e.g., layer 1, to calculate the precoder matrix (W), or
not more than $K_0$ non-zero combining coefficients $\gamma_{p,u,d,v}^{(l)}$ for a subset of layers, e.g., layer 1 and layer 2, to calculate the precoder matrix (W), or
not more than $K_0$ non-zero combining coefficients $\gamma_{p,u,d,v}^{(l)}$ for all layers to calculate the precoder matrix (W).

In accordance with embodiments (see for example claim 25) the communication device is configured to report $K_1$ non-zero combining coefficients $\gamma_{p,u,d,v}^{(l)}$, where $K_1 \leq K_0$, and to indicate the selected non-zero combining coefficients in the bitmap.

In accordance with embodiments (see for example claim 26) the communication device is configured to provide a CSI report comprising two parts, wherein the first part has a fixed payload size and contains at least the number $K_1$ of selected non-zero combining coefficients, and the second part contains information about the bitmap for indicating the selected delay vectors and selected Doppler-frequency vectors and non-zero combining coefficients, an indication of the common D delay vectors and/or F Doppler vectors, an indication of $U^{(l)}$ or $2U^{(l)}$ selected beam indices, and the $K_1$ non-zero combining coefficients.

In accordance with embodiments (see for example claim 27) the communication device is configured to normalize the combining coefficients with respect to the strongest combining coefficient, e.g., the one having the largest amplitude or power, such that the strongest combining coefficient after the normalization is given by the value 1.

In accordance with embodiments (see for example claim 28) the communication device is configured to not report the strongest combining coefficient, e.g., the strongest normalized combining coefficient.

In accordance with embodiments (see for example claim 29) the communication device is configured to report a strongest coefficient indicator, e.g., using $\lceil \log_2 K_1 \rceil$ bits indicating the strongest coefficient out of the $K_1$ reported combining coefficients.

In accordance with embodiments (see for example claim 30) the communication device is configured to quantize the non-zero combining coefficients using a codebook approach, where each coefficient is represented by $\gamma_{p,u,d,v}^{(l)} = \hat{\gamma}_{p,u,d,v}^{(l)} \phi_{p,u,d,v}^{(l)}$, where
$\hat{\gamma}_{p,u,d,v}^{(l)}$ is a polarization-, beam-, delay- and Doppler-frequency-dependent amplitude coefficient which is quantized with N bits; and
$\phi_{p,u,d,v}^{(l)}$ represents a phase which is represented by a BPSK, or QPSK, or 8PSK, or any other higher-order PSK constellation.

In accordance with embodiments (see for example claim 31) the communication device is configured to group the combining coefficients into Q sub-groups and quantize the amplitude and phase of each coefficient of the q-th subgroup with $A^{(Q)}$ and $P^{(Q)}$ bits, respectively.

In accordance with embodiments (see for example claim 32) the selected D delay vectors, common to all beam indices, are identical for a subset of layers or for all layers, e.g., the first layer and the second layer, and/or the selected F Doppler-frequency vectors, common to all delay and beam indices, are identical for a subset of layers or for all layers, e.g., the first layer and the second layer.

In accordance with embodiments (see for example claim 33) the selected D delay vectors, common to all beam indices, and/or the selected F Doppler-frequency vectors, common to all delay and beam indices, are different for a subset of layers or for all layers, e.g., the first layer and the second layer.

In accordance with embodiments (see for example claim 34) the information of the selected delay vectors per beam, and the information of the selected Doppler-frequency vectors per beam and per delay, is represented by a bitmap, where each bit in the bitmap is associated with a delay vector, a Doppler-frequency vector and a combining coefficient, and the bitmaps for the layers, e.g., for the first layer and for the second layer, are identical or different.

In accordance with embodiments (see for example claim 35) the communication device is configured to select
$U^{(l,l')}$ spatial DFT beams for the l-th and the l' layer, where $U^{(l,l')} = U^{(l)} + U^{(l')}$, the values of $U^{(l)}$ and $U^{(l')}$ being freely selected by the communication device, or $U^{(l)}$ DFT beams for the l-th layer and $U^{(l')}$ DFT beams for the l'-th layer, where $U^{(l')} \leq U^{(l)}$ for l'≥l, and/or $D^{(l)}$ delay DFT vectors common to all beam indices of the l-th layer and $D^{(l')}$ delay DFT vectors for the l'-th layer, where $D^{(l')} \leq D^{(l)}$ for l'≥l, and/or $F^{(l)}$ Doppler DFT vectors common to all beam indices of the l-th layer and $F^{(l')}$ Doppler DFT vectors for the l'-th layer, where $F^{(l')} \leq F^{(l)}$ for l'≥l.

In accordance with embodiments (see for example claim 36) the communication device is configured to receive from the wireless communication system, e.g., from a gNB, by higher layer signaling, e.g., as a MAC or RRC parameter, or by physical layer signaling, e.g., as a L1 parameter, one or more of the following:

the parameter D,
the parameter F
the parameter U,
the parameter $U^{(l)}$,
the parameter p,
the parameter $K_0$,
the parameter β,
the parameter $A^{(q)}$,
the parameter $P^{(q)}$,
a value of S for the configuration of the delay component codebook ($\Omega_2$),
a value of T for the configuration of the Doppler-frequency component codebook ($\Omega_3$),
parameters $N_1$, $N_2$.

In accordance with embodiments (see for example claim 37) the communication device is configured to report to the wireless communication system, e.g., to a gNB, by higher layer signaling, e.g., as a MAC or RRC parameter, or by physical layer signaling, e.g., as a L1 parameter, one or more of the following:

an information or indication of the selected D delay DFT vectors,
an information or indication of the selected F Doppler-frequency vectors,
an information or an indication of the selected $D'_{p,u} \leq D$ delay vectors per beam index (u) and/or per polarization index (p),
an information or indication of the selected $F'_{p,u,d} \leq F$ Doppler-frequency vectors per beam index (u), and/or delay index (d) and/or polarization index (p),
an information or indication of the selected $U^{(l)}$ spatial beam DFT vectors,
an information or indication of the selected $U^{(l,l')}$ spatial beam DFT vectors,
an information or indication of the selected $\overline{D}$ delay vectors,
an information or indication of the selected $\overline{F}$ Doppler-frequency vectors,
the subgroup index $q_2$,
the subgroup index $q_3$,
the selected subgroup indices $q_{1,1}$, $q_{1,2}$,
the bitmap representing the selected spatial beam components, delay components and the selected Doppler-frequency components,
one of the two identical sub-bitmaps of size $U^{(l)}D \times F$,
the selected D delay DFT vectors common for one layer, or a subset of layers or for all layers,
the selected F Doppler DFT vectors common for one layer, or a subset of layers or for all layers the selected values $U^{(l)}$ and $U^{(l')}$,
the selected value $U^{(l,l')}$,
the selected values $D^{(l)}$ and $D^{(l')}$,
the selected values $F^{(l)}$ and $F^{(l')}$.

In accordance with embodiments (see for example claim 38) the communication device comprises an oversampling factor $O_2$ for the configuration of the delay codebook and/or an oversampling factor $O_3$ for the configuration of the Doppler codebook, wherein the communication device is configured to receive from the wireless communication system, e.g., from a gNB, by higher layer signaling, e.g., as a MAC or RRC parameter, or by physical layer signaling, e.g., as a L1 parameter, the oversampling factor $O_2$ and/or the oversampling factor $O_3$, or wherein the communication device is configured to use an a priori known value for the oversampling factor $O_2$ and/or an a priori known value for the oversampling factor $O_3$, In accordance with embodiments (see for example claim 39) the communication device is configured to select an oversampling factor $O_2$ for the configuration of the delay codebook and/or an oversampling factor $O_3$ for the configuration of the Doppler codebook, and report to the wireless communication system, e.g., to a gNB, by higher layer signaling, e.g., as a MAC or RRC parameter, or by physical layer signaling, e.g., as a L1 parameter, the selected oversampling factor $O_2$ via and/or the selected oversampling factor $O_3$.

In accordance with embodiments (see for example claim 40) the communication device is configured to receive from the wireless communication system, e.g., from a gNB, by higher layer signaling, e.g., as a MAC or RRC parameter, or by physical layer signaling, e.g., as a L1 parameter, a codebook parameter S used for the configuration of the delay codebook and/or a codebook parameter T used for the configuration of the Doppler codebook.

In accordance with embodiments (see for example claim 41) the communication device is configured to report to the wireless communication system, e.g., to a gNB, by higher layer signaling, e.g., as a MAC or RRC parameter, or by physical layer signaling, e.g., as a L1 parameter, a codebook parameter S that may be used for the configuration of the delay codebook and/or a codebook parameter T that may be used for the configuration of the Doppler codebook.

In accordance with embodiments (see for example claim 42) the parameter S depends on a configured number of subbands $N_{SB}$ for CQI reporting, e.g., the parameter S may be given by $S=RN_{SB}$, where the parameter R controls the communication device calculation complexity and the parameter R may be configured by the wireless communication system, e.g., from a gNB, by higher layer signaling, e.g., as a MAC or RRC parameter, or by physical layer signaling, e.g., as a L1 parameter.

In accordance with embodiments (see for example claim 43), in case the CSI feedback uses the PMI, the communication device is configured to report at least a two-component PMI, where the first PMI corresponds to the selected vectors $b_u^{(l)}$ and/or $d_{p,u,d}^{(l)}$ and/or $f_{p,u,d,v}^{(l)}$, and
where the second PMI corresponds to a subset or all Doppler-delay-beam combining coefficients $\gamma_{p,u,d,v}^{(l)}$ from the communication device to the transmitter.

In accordance with embodiments (see for example claim 44), in order to control the feedback overhead for reporting the bitmap and the UE calculation complexity, the communication device is configured to select the delay DFT vectors and/or the Doppler DFT vectors such that the selected delay DFT vectors are
  identical with respect to both polarizations, or
  partially identical for a subset of beams, or
  fully identical with respect to all beams per polarization, or
  fully identical with respect to all beams and both polarizations, and/or
the selected Doppler DFT vectors are
  partially identical for a subset of delays and a subset of beams, or
  fully identical with respect to all delays per beam and polarization, or
  fully identical with respect to all delays per beam and both polarizations, or
  fully identical with respect to all delays and all beams per polarization, or
  fully identical with respect to all delays and all beams and both polarizations, or
  fully identical with respect to all beams per delay and per polarization, or
  fully identical with respect to all beams per delay and both polarizations.

In accordance with embodiments (see for example claim 45) the selected delay DFT vectors per beam and polarization and/or the selected Doppler DFT vectors per beam, per delay and polarization are represented by a bit sequence of size $$\left\lceil \log_2 \binom{2UDF}{K_1} \right\rceil,$$

the bit sequence representing a combinatorial index $$\binom{2UDF}{K_1},$$

and indicating the indices of the selected $K_1$ non-zero combining coefficients out of 2UDF combining coefficients.

In accordance with embodiments (see for example claim 46) the number of selected delay DFT vectors per beam and polarization from the common subset of D delay DFT vectors and/or the number of selected Doppler DFT vectors per beam and per delay and polarization from the common subset of F Doppler DFT vectors is identical for both polarizations, thereby reducing the size of the bit sequence to $$\left\lceil \log_2 \binom{UDF}{K_1} \right\rceil,$$

the bit sequence representing the combinatorial index $$\binom{UDF}{K_1},$$

and indicating the indices of the selected $K_1$ non-zero combining coefficients out of the UDF combining coefficients.

In accordance with embodiments (see for example claim 47) the communication device is configured to report to a network entity, like a gNB, via a higher layer, like the Radio Resource Control (RRC) layer or a medium access control-control element (MAC-CE), or via a physical layer, like Layer 1 or L1,
  the codebook parameter S that may be used to achieve a specific resolution of the channel delay components, and/or
  the codebook parameter T that may be used to achieve a specific resolution of the channel Doppler components.

In accordance with embodiments (see for example claim 48) the communication device is configured to select D'=1 delay DFT vectors and/or F'=1 Doppler DFT vectors.

In accordance with embodiments (see for example claim 49) the communication device is configured to not report to the network an information/indication of the one selected delay DFT vector and/or the one selected Doppler DFT vector.

In accordance with embodiments (see for example claim 50), in case a number of non-zero coefficients $K_1=2$, the communication device is configured to
  select only a single beam vector out of the $U^{(l)}$ configured beam vectors and to determine for the selected single beam for both polarizations the two combining coefficients of the precoder matrix, and/or
  indicate a transmission rank of one (RI=1) in the CSI report; and/or
  not report the bitmap or bit sequence for indicating the selected non-zero coefficients, delay DFT vectors and/or Doppler DFT vectors, and/or
  not report an information/indication of the selected D or D' delay DFT vectors, common to all beam indices and/or to not report an information/indication of the selected F or F' Doppler DFT vectors, common to all beam and delay indices, and/or
  reports a beam indicator indicating the selected beam out of the $U^{(l)}$ configured beam vectors.

In accordance with embodiments (see for example claim 51), when all non-zero coefficients associated with the DFT beam vectors for one polarization are zero, the communication device is configured to not report the corresponding bitmap or bit sequence associated with those beams.

In accordance with embodiments (see for example claim 52) the Doppler-delay-beam three-stage precoder is based on three separate codebooks, and wherein the three separate codebooks include
  a first codebook ($\Omega_1$) for the one or more transmit-side spatial beam components of the composite Doppler-delay-beam three-stage precoder,
  a second codebook ($\Omega_2$) for the one or more delay components of the composite Doppler-delay-beam three-stage precoder, and
  a third codebook ($\Omega_3$) for the one or more Doppler-frequency components of the composite Doppler-delay-beam three-stage precoder.

In accordance with embodiments (see for example claim 53) the precoder is based on two separate codebooks, and wherein the two separate codebooks include
  a first codebook ($\Omega_1$) for the one or more transmit-side spatial beam components of the composite precoder, and
  a second codebook ($\Omega_2$) for the one or more delay components of the composite precoder.

In accordance with embodiments (see for example claim 54) the Doppler-delay precoder matrix (W) is represented by $$W^{(l)} = P^{(l)} \begin{bmatrix} \sum_{u=0}^{U^{(l)}-1} \sum_{d=0}^{D^{(l)}_u-1} \sum_{v=0}^{F^{(l)}_{d,u}-1} \gamma^{(l)}_{1,u,d,v} f^{(l)}_{1,u,d,v} \otimes d^{(l)T}_{1,u,d} \otimes b^{(l)}_u \\ \sum_{u=0}^{U^{(l)}-1} \sum_{d=0}^{D^{(l)}_u-1} \sum_{v=0}^{F^{(l)}_{d,u}-1} \gamma^{(l)}_{2,u,d,v} f^{(l)}_{2,u,d,v} \otimes d^{(l)T}_{2,u,d} \otimes b^{(l)}_u \end{bmatrix},$$

where $U^{(l)}$ is the number of beams per polarization for the l-th layer, $D_u^{(l)}$ is the number of delays for the l-th layer and u-th beam, $F_{d,u}^{(l)}$ is the number of Doppler-frequency components for the l-th layer, u-th beam and d-th delay, $f_{p,u,d,v}^{(l)}$ is the v-th Doppler-frequency vector of size T×1 associated with the l-th layer, d-th delay, u-th spatial beam, and the p-th (p=1, 2) polarization of the precoder;

$d_{p,u,d}^{(l)}$ is the d-th delay vector of size S×1 associated with the l-th layer, u-th spatial beam and the p-th polarization of the precoder;

$b_u^{(l)}$ is the u-th spatial beam associated with the l-th layer;

$\gamma_{p,u,d,v}^{(l)}$ is the Doppler-delay coefficient associated with the l-th layer, u-th spatial beam, d-th delay, v-th Doppler-frequency and the p-th polarization of the precoder, and $P^{(l)}$ is a scalar normalization factor to ensure that the average total transmission power over all precoder layers is 1.

In accordance with embodiments (see for example claim 55) the Doppler-delay-beam precoder matrix (W) is represented by a dual-stage precoder:

$$W^{(l)} = W^{(1,l)} w^{(2,l)} \in \mathbb{N}_t \cdot T \cdot S \times 1,$$

where $$W^{(1,l)} = \begin{bmatrix} X_1 & 0 \\ 0 & X_2 \end{bmatrix}$$

with $$X_1 = \begin{bmatrix} f^{(l)}_{1,0,0,0} \otimes d^{(l)}_{1,0,0} \otimes b^{(l)}_0 & \cdots & f^{(l)}_{1,u,d,v} \otimes d^{(l)}_{1,u,d} \otimes b^{(l)}_u & \cdots & f^{(l)}_{1,U^{(l)}-1,D^{(l)}_u-1,F^{(l)}_{d,u}-1} \otimes d^{(l)}_{1,U^{(l)}-1,D^{(l)}_u-1} \otimes b^{(l)}_{U^{(l)}-1} \end{bmatrix},$$

$$X_2 = \begin{bmatrix} f^{(l)}_{2,0,0,0} \otimes d^{(l)}_{2,0,0} \otimes b^{(l)}_0 & \cdots & f^{(l)}_{2,u,d,v} \otimes d^{(l)}_{2,u,d} \otimes b^{(l)}_u & \cdots & f^{(l)}_{2,U^{(l)}-1,D^{(l)}_u-1,F^{(l)}_{d,u}-1} \otimes d^{(l)}_{2,U^{(l)}-1,D^{(l)}_u-1} \otimes b^{(l)}_{U^{(l)}-1} \end{bmatrix},$$

and $w^{(2,l)}$ contains the complex Doppler-delay-beam combining coefficients, $$w^{(2,l)} = [\gamma^{(l)}_{1,0,0,0} \quad \cdots \quad \gamma^{(l)}_{1,u,d,v} \quad \cdots \\ \gamma^{(l)}_{1,U^{(l)}-1,D^{(l)}_u-1,F^{(l)}_{d,u}-1} \gamma^{(l)}_{2,0,0,0} \cdots \gamma^{(l)}_{2,u,d,v} \cdots \\ \gamma^{(l)}_{2,U^{(l)}-1,D^{(l)}_u-1,F^{(l)}_{d,u}-1}]^T,$$

where $f_{p,u,d,v}^{(l)}$ is the v-th Doppler-frequency vector of size T×1 associated with the l-th layer, d-th delay, u-th spatial beam, and the p-th (p=1, 2) polarization of the precoder;

$d_{p,u,d}^{(l)}$ is the d-th delay vector of size S×1 associated with the l-th layer, u-th spatial beam and the p-th polarization of the precoder;

$b_u^{(l)}$ is the u-th spatial beam associated with the l-th layer;

$\gamma_{p,u,d,v}^{(l)}$ is the Doppler-delay coefficient associated with the l-th layer, u-th spatial beam, d-th delay, v-th Doppler-frequency and the p-th polarization of the precoder, and $P^{(l)}$ is a scalar normalization factor to ensure that the average total transmission power over all precoder layers is 1.

In accordance with embodiments (see for example claim 56) the first codebook ($\Omega_1$) comprises a first oversampled DFT-codebook matrix of size $N_1 N_2 \times O_{1,1} N_1 O_{1,2} N_2$ from which the vectors $b_u^{(l)}$ are selected, where $N_1$ and $N_2$ refer to the first and second numbers of antenna ports, respectively, and $O_{1,1}$ and $O_{1,2}$ refer to the oversampling factors with $O_{1,1} \in \{1, 2, 3, \ldots\}$ and $O_{1,2} \in \{1, 2, 3, \ldots\}$, wherein the second codebook ($\Omega_2$) comprises a second oversampled DFT-codebook matrix of size $S \times SO_2$ from which the delay vectors $d_{u,d}^{(l)}$ are selected, where S refers to the number of configured sub-bands/PRBs, or subcarriers, and $O_2$ refers to the oversampling factor $O_2 = 1, 2, \ldots$, and wherein the third codebook ($\Omega_2$) comprises a third oversampled DFT-codebook matrix of size $T \times TO_3$ from which the Doppler-frequency vectors $f_{p,u,d,v}^{(l)}$ are selected, where T refers to the number of time instances during the observation time, and $O_3$ refers to the oversampling factor with $O_3 = 1, 2, \ldots$.

Transmitter

The present invention provides (see for example claim 57) a transmitter in a wireless communication system including a communication device, the transmitter comprising:

an antenna array having a plurality of antennas for a wireless communication with one or more of the inventive communication devices for providing a channel state information, CSI, feedback to the transmitter; and a precoder connected to the antenna array, the precoder to apply a set of beamforming weights to one or more antennas of the antenna array to form, by the antenna array, one or more transmit beams or one or more receive beams, a transceiver configured to transmit, to the communication device, downlink reference signals (CSI-RS) according to a CSI-RS configuration comprising a number of CSI-RS antenna ports and a parameter, e.g., referred to as CSI-RS BurstDuration, indicating a time-domain-repetition of the downlink reference signals, e.g., in terms of a number of consecutive slots the downlink reference signals are repeated in, and downlink signals comprising the CSI-RS configuration; and receive uplink signals comprising a plurality of CSI reports from the communication device; and a processor configured to:
  extract at least the precoder matrix identifier and the rank indicator from the plurality of CSI reports; and
  construct a precoder matrix applied on the antenna ports using a first component and a second component of the PMI, and determine the beamforming weights responsive to the constructed precoder matrix.

System

The present invention provides (see for example claim 58) a wireless communication network, comprising at least one inventive communication device, and/or at least one inventive transmitter.

In accordance with embodiments (see for example claim 59) the communication device and/or the transmitter comprises one or more of a mobile terminal, or stationary terminal, or cellular IoT-UE, or an IoT device, or a ground based vehicle, or an aerial vehicle, or a drone, or a moving base station, or road side unit, or a building, or a macro cell base station, or a small cell base station, or a road side unit, or a UE, or a remote radio head, or an AMF, or an SMF, or a core network entity, or a network slice as in the NR or 5G core context, or any transmission/reception point (TRP) enabling an item or a device to communicate using the wireless communication network, the item or device being provided with network connectivity to communicate using the wireless communication network.

Methods

The present invention provides (see for example claim 60) a method for providing a channel state information, CSI, feedback in a wireless communication system, the method comprising:
  receiving, from a transmitter, a radio signal via a time-variant, frequency-selective MIMO channel, the radio signal including downlink reference signals according to a reference signal configuration comprising a number of antenna ports, and downlink signals comprising the reference signal configuration;
  estimating, at the communication device, an explicit CSI in the frequency domain using measurements on the downlink reference signals on the radio channel, the downlink reference signals provided over a certain observation time,
  selecting, at the communication device, a Doppler-delay precoder matrix (W) for a composite Doppler-delay-beam three-stage precoder, the Doppler-delay-beam three-stage precoder being based on one or more codebooks, the one or more codebooks including
    one or more transmit-side spatial beam components of the composite Doppler-delay-beam three-stage precoder,
    one or more delay components of the composite Doppler-delay-beam three-stage precoder, and
    one or more Doppler-frequency components of the composite Doppler-delay-beam three-stage precoder,
  calculating, at the communication device, one or more of a channel quality indicator, CQI, a precoder matrix indicator, PMI, and a rank indicator, RI, using the explicit CSI and the composite Doppler-delay-beam three-stage precoder with the selected Doppler-delay-beam precoder matrix (W), and
  reporting from the communication device to the transmitter the CSI feedback including one or more of the CQI, the PMI and the RI, wherein the PMI and RI are used to indicate the Doppler-delay-beam three-stage composite precoder matrix for the configured antenna ports,
  wherein the communication device comprises one or more parameters (D, F), the parameter indicating a number of delay components, like delay DFT vectors ($D_u^{(l)}$), and/or a number of Doppler-frequency components, like Doppler DFT vectors ($F_u^{(l)}$), to be used by the communication device when calculating the Doppler-delay precoder matrix (W), and
  wherein the method further comprises:
    selecting from the one or more codebooks a subset of D delay components and/or a subset of F Doppler-frequency components, and
    using the selected subset of delay components for each polarization (p) and each spatial beam (u) and/or the selected subset of Doppler-frequency components for each polarization (p), each spatial beam (u) and each delay (d), when calculating the Doppler-delay precoder matrix (W).

The present invention provides (see for example claim 61) a method for providing a channel state information, CSI, feedback in a wireless communication system, the method comprising:
  receiving, from a transmitter, a radio signal via a time-variant, frequency-selective MIMO channel, the radio signal including downlink reference signals according to a reference signal configuration comprising a number of antenna ports, and downlink signals comprising the reference signal configuration;
  estimating, at the communication device, an explicit CSI in the frequency domain using measurements on the downlink reference signals on the radio channel, the downlink reference signals provided over a certain observation time,
  selecting, at the communication device, a-delay precoder matrix (W) for a composite precoder, the precoder being based on one or more codebooks, the one or more codebooks including
    one or more transmit-side spatial beam components of the composite precoder, and
    one or more delay components of the composite precoder,
  calculating, at the communication device, one or more of a channel quality indicator, CQI, a precoder matrix indicator, PMI, and a rank indicator, RI, using the explicit CSI and the composite precoder with the selected precoder matrix (W), and
  reporting from the communication device to the transmitter the CSI feedback including one or more of the CQI, the PMI and the RI, wherein the PMI and RI are used to indicate the composite precoder matrix for the configured antenna ports,
  wherein the communication device comprises one or more parameters (D, F), the parameter indicating a number of delay components, like delay DFT vectors ($D_u^{(l)}$), to be used by the communication device when calculating the precoder matrix (W), and
  wherein the method further comprises:
    selecting from the one or more codebooks a subset of D delay components, and
    using the selected subset of delay components for each polarization (p) and each spatial beam (u), when calculating the precoder matrix (W).

The present invention provides (see for example claim 62) a method for transmitting in a wireless communication system including a communication device and a transmitter, the method comprising:
  transmitting, to a communication device, downlink reference signals (CSI-RS) according to a CSI-RS configuration comprising a number of CSI-RS antenna ports and a parameter, e.g., referred to as CSI-RS BurstDuration, indicating a time-domain-repetition of the downlink reference signals, e.g., in terms of a number of consecutive slots the downlink reference signals are repeated in, and downlink signals comprising the CSI-RS configuration;

receiving, at the transmitter, uplink signals comprising a plurality of CSI reports from the communication device, the CSI reports indicating D delay components and/or F Doppler-frequency components selected by the communication device from one or more codebooks and used by the communication device when calculating the precoder matrix (W);

extracting, at the transmitter, at least the two component precoder matrix identifier and the rank indicator from the plurality of CSI reports;

constructing, at the transmitter, a precoder matrix applied on the antenna ports using a first component and a second component of the PMI, and determining, responsive to the constructed precoder matrix, beamforming weights for a precoder connected to an antenna array of the transmitter.

The present invention provides (see for example claim 64) a network node comprising a processor and a memory, said memory containing instructions executable by said processor whereby said network node is operative to perform the inventive method.

The present invention provides (see for example claim 65) a user equipment comprising a processor and a memory, said memory containing instructions executable by said processor whereby said user equipment is operative to be configured by said inventive network node.

The present invention provides (see for example claim 66) a method performed by a user equipment, the method comprising, receiving a configuration from an inventive network node and operate according to said received configuration.

Computer Program Product

The present invention provides a computer program product comprising instructions which, when the program is executed by a computer, causes the computer to carry out one or more methods in accordance with the present invention.

An extension of the existing CSI-RS is provided to track the channel time-evolution, e.g., for a channel having channel conditions which change fast, for example due to a high movement of the UE in a multi-path channel environment, and having a short channel coherence time. The present invention is advantageous as by tracking the channel time-evolution, even for channels with varying channel conditions, the CSI needs not to be updated less frequently, e.g., with a rate similar for channels with a long channel coherence time, thereby reducing or avoiding a feedback overhead. For example, the large-scale channel parameters such as path loss and shadow fading may not change quickly over time, even in a channel having a short channel coherence time, so that the channel variations are mainly related to small scale channel fading. This means the MIMO channel parameters of the impulse response such as path components and channel delays do not change over a longer time period, and channel variations caused by movement of the UE lead only to phase fluctuations of the MIMO channel path components. This means the spatial beams, the precoder Doppler-frequency DFT-vectors, the delay DFT-vectors as well as the Doppler-delay coefficients of the Doppler-delay-beam three-stage precoder remain identical or substantially identical for a long time period, and need to be less frequently updated. A CSI-RS design may be used allowing track time-evolution of CSI or a new implicit CSI reporting scheme that takes into account the channel time-evolution and provides information about current and future RI, PMI and CQI in a compressed form to reduce the feedback rate.

The components for calculating the precoder matrix of the Doppler-delay-beam three-stage precoder, like the spatial beams, the Doppler-frequency DFT-vectors, the delay DFT-vectors and the Doppler-delay combining coefficients, remain identical or substantially identical for a long time period, and need to be less frequently updated. The reduced update rate of the CSI feedback comes at the cost of an increased UE calculation complexity for determining the one or more codebook vectors and combining coefficients per polarization, per beam, per delay and per Doppler-frequency component of the precoder matrix compared to the state of the art Rel.-15 Type-II CSI reporting scheme [see TS 38.214].

Embodiments of the present invention provide improvements for reducing the calculation complexity at the UE and further reducing the feedback overhead by using a two-step approach for determining the one or more codebook vectors of the precoder matrix. The two step-approach is summarized as follows:

Selection of a subset of delay DFT vectors and/or a subset of Doppler-frequency vectors from the delay and/or Doppler-frequency codebook, respectively.

Use only the selected subset(s) of delay and/or Doppler-frequency vectors instead of all vectors of the codebook(s) to determine the delay DFT vectors and/or Doppler-frequency DFT vectors and the combining coefficients per polarization, per beam, per delay and per Doppler-frequency component of the precoder matrix.

The selection of the subset(s) of delay/Doppler-frequency vectors in the first step may depend on the delay and Doppler-frequency spread of the MIMO channel impulse response. Since the delay and Doppler-frequency components of the MIMO channel impulse response are concentrated in the delay domain and Doppler-frequency domain, respectively, only a subset of delay and Doppler-frequency vectors from the delay and Doppler-frequency codebooks that may be used to construct the precoder matrix. Furthermore, in addition to the reduction of the UE calculation complexity, the proposed two-step approach also reduces the amount of the CSI feedback since less delay and Doppler-frequency components are employed in the precoder matrix construction that need to be signaled in the feedback.

Embodiments of the present invention reduce the UE calculation complexity for calculating the precoder matrix and feedback overhead for indicating the selected components by selecting from the respective codebooks employed at the UE one or more of a subset of $D_u^{(l)}=D$ delay DFT vectors from a codebook employed at the UE, which are common to all beam indices, i.e., $d_{p,u,d}^{(l)}=d_d^{(l)}$, and/or a subset of $F_u^{(l)}=F$ Doppler DFT vectors from a codebook employed at the UE, common to all beam indices and common to all delay indices for the precoder, i.e., $f_{p,u,d,v}^{(l)}=f_v^{(l)}$, and/or $U^{(l)}$ beam DFT vectors, which are identical for the both polarizations.

Figure 4:
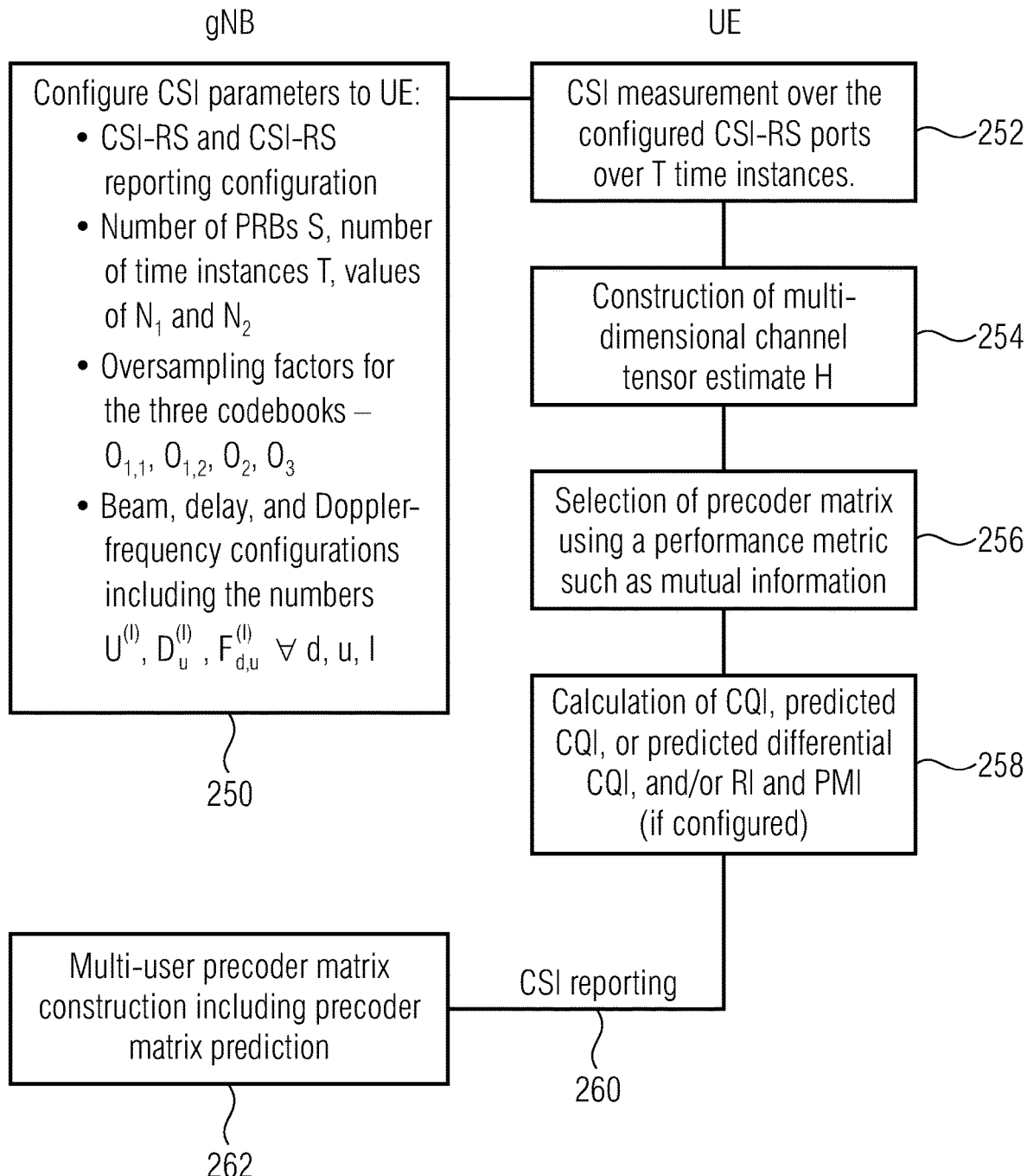
FIG. 4 is a flow diagram illustrating the configuration of CSI parameters, the CSI measurement, the composite precoder matrix calculation and the CSI reporting.

FIG. 4 is a flow diagram illustrating the configuration of CSI parameters, the CSI measurement, the composite precoder matrix calculation and the CSI reporting. The UE may be configured with a CSI-RS resource configuration via a higher layer (such as RRC) containing information about the number of assigned CSI-RS ports used for the transmission to the UE. The number of CSI-RS ports, M, is equal to $PN_1N_2$ (where P=1 for co-polarized array antennas, and P=2 for dual-polarized array antennas at the base station), and where $N_1$ and $N_2$ are the number of antenna ports of the first and second spatial dimensions of the gNB array, respectively. The UE is configured with a CSI reporting configuration via a higher layer and/or a physical layer (via DCI) that also contains information for an evaluation of the CSI feedback parameters, such as CQI, RI and PMI, at the UE. The base station or gNB signals via a higher layer or a physical layer at least five integer values for ($N_1$, $N_2$, P), S, and T, where ($N_1$, $N_2$, P) are used to configure a first codebook, and S and T are used to configure a second codebook and a third codebook, respectively, for the PMI decomposition/calculation at the UE. The CQI, RI and PMI selection is performed at the UE.

At a step 250, the gNB or base station sends a CSI-RS configuration and CSI report configuration to the UE. The CSI-RS configuration may include a CSI-RS resource(s) configuration with respect to sub-clause 7.4.1.5 in TS 38.211 [1] and with sub-clause 6.3.2 in TS.38.331 [4]. Further, an additional higher layer parameter configuration referred to as CSI-RS-BurstDuration is included.

The CSI-RS-BurstDuration is included to provide a CSI-RS design allowing to track the time-evolution of the channel. A UE may be configured with a CSI-RS resource set(s) configuration with the higher layer parameter CSI-RS-BurstDuration, in addition to the configurations from clause 7.4.1.5 in TS 38.211 [2] and clause 6.3.2 in TS.38.331 [4] mentioned above, to track the time-evolution of CSI. The time-domain-repetition of the CSI-RS, in terms of the number of consecutive slots the CSI-RS is repeated in, is provided by the higher layer parameter CSI-RS-BurstDuration. The possible values of CSI-RS-BurstDuration for the NR numerology μ are $2^\mu \cdot X_B$ slots, where $X_B \in \{0, 1, 2, \ldots, \text{maxNumBurstSlots}-1\}$. The NR numerology μ=0, 1, 2, 3, 4 . . . defines, e.g., a subcarrier spacing of $2^\mu \cdot 15$ kHz in accordance with the NR standard.

For example, when the value of $X_B$=0 or the parameter CSI-RS-BurstDuration is not configured, there is no repetition of the CSI-RS over multiple slots. The burst duration scales with the numerology to keep up with the decrease in the slot sizes. Using the same logic used for periodicity of CSI-RS. FIG. 5A illustrates a CSI-RS with a periodicity of 10 slots and no repetition (CSI-RS-BurstDuration not configured or CSI-RS-BurstDuration=0), and FIG. 5B illustrates a CSI-RS with a periodicity of 10 slots and repetition of 4 slots (CSI-RS-BurstDuration=4). FIG. 6 illustrates a CSI-RS-BurstDuration information element. The information element of the new RRC parameter CSI-RS-BurstDuration is as follows: the value next to the text burstSlots indicates the value of $X_B$, which for a given New Radio numerology μ (see [1]) provides the burst duration $2^\mu \cdot X_B$ of the CSI-RS, i.e., the number of consecutive slots of CSI-RS repetition.

The burst-CSI-RS across multiple consecutive slots enables the extraction of time-evolution information of the CSI and for reporting of the precoder matrix, e.g. as a part of the PMI, in a way as described in more detail below. In other words, the UE may calculate the CQI, RI and PMI with a repetition of the CSI-RS resource(s) over multiple consecutive slots, and report them accordingly.

Returning to the flow diagram of FIG. 4, the CSI report configuration provided by the eNB may further include one or more of at least the following parameters:
 a configuration of the CSI report configuration with respect to sub-clause 5.2.1.1 in TS 38.214 [2], and the following higher layer parameters: ReportQuantity listed in TS 38.331 [1] with the following additional parameters:
 cri-RI-PMIDD-CQI
 cri-RI-PMIDy-CQI
 cri-RI-PMIDr-CQI
 cri-RI-LI-PMIDD-CQI
 cri-RI-LI-PMIDy-CQI
 cri-RI-LI-PMIDr-CQI
 cri-RI-PMIDD
 cri-RI-PMIDy
 cri-RI-PMIDr The CRI (CSI-RS resource indicator), RI (rank indicator) and LI (layer indicator) mentioned in the reporting quantities are reported, i.e., the possible values reported and the format for reporting CRI, RI and LI are identical as the ones in TS 38.214 [2]. The PMI quantities mentioned in ReportQuantity are defined as:
 PMIDD—PMI values including the delay and the Doppler-frequency component configurations as described below;
 PMIDy—PMI values including only the delay component configuration as described below, excluding the Doppler-frequency component(s);
 PMIDr—PMI values including only the Doppler-frequency component configuration as described below, excluding the delay component(s).
 a parameter CQI-PredictionTime assigned with the value K for CQI prediction (if configured).

The CQI value, predicted CQI value, etc. (if configured) as mentioned in the reporting quantity may be calculated as explained subsequently over multiple time slots. The values of the CQI reported are identical as mentioned in TS 38.214 [2].

In addition, the following parameters may be signaled by the eNB to the user equipment via physical layer or higher layer (RRC) parameters:
 values of S and T for the configuration of the delay and Doppler-frequency component codebooks $\Omega_2$ and $\Omega_3$, respectively, are represented by the parameters CodebookConfig-S, CodebookConfig-T. The oversampling factors $O_2$ and $O_3$ of the codebooks $\Omega_2$ and $\Omega_3$ are represented by CodebookConfig-O2 and CodebookConfig-O3, respectively.
 parameters $N_1$, $N_2$ and oversampling factors $O_{1,1}$ and $O_{1,2}$ for the configuration of the first codebook $\Omega_1$, as described below. The parameters $N_1$ and $N_2$ are represented by CodebookConfig-N1 and CodebookConfig-N2, respectively. The oversampling factors $O_{1,1}$ and $O_{1,2}$ are represented by CodebookConfig-O1_1 and CodebookConfig-O1_2, respectively.

In response to the report configuration, the UE
 performs, at step 252, measurements on downlink CSI-RS over T consecutive time-instants/slots,
 constructs, at step 254, the time-variant frequency-selective MIMO channel tensor $\mathcal{H}$;
 selects, at step 256, the Doppler-delay-beam composite three-stage precoder matrix for each layer (PMI selection) with respect to a specific performance metric as explained in more detail below;
 calculates, at step 258, a CQI value, a predicted CQI value, or predicted differential CQI values (if configured) for a future time instant or for a set of future time instants using the selected Doppler-delay-beam composite three-stage precoder matrix and at least one of the MIMO channel tensor $\mathcal{H}$ and a prediction of the MIMO channel tensor for future time instants, and, optionally, selects a RI value (if configured) using the selected Doppler-delay-beam composite three-stage precoder matrix and the MIMO channel tensor $\mathcal{H}$, and sends, at step 260, the CSI report to the gNB.

The gNB, at step 262, reconstructs the Doppler-delay-beam composite three-stage precoder matrix (PMI report) to facilitate multi-user precoding matrix calculation and precoder matrix prediction for future time instants.

Other approaches operating on the basis of repeated downlink reference signals may use other precoders or other techniques to determine the CSI feedback based on the repeated downlink reference signals and to report determine the CSI feedback.

CQI/PMI Reporting Using a Composite Doppler-Delay Three-Stage Precoder

Once the UE is configured with a CSI-RS resource and a CSI reporting configuration (see step 250 in FIG. 4), the UE may estimate an un-quantized explicit CSI using measurements on the downlink CSI-RS on PRBs, where the CSI-RS is configured over T consecutive time instants/slots in the frequency domain (see step 252 in FIG. 4).

Figure 7:
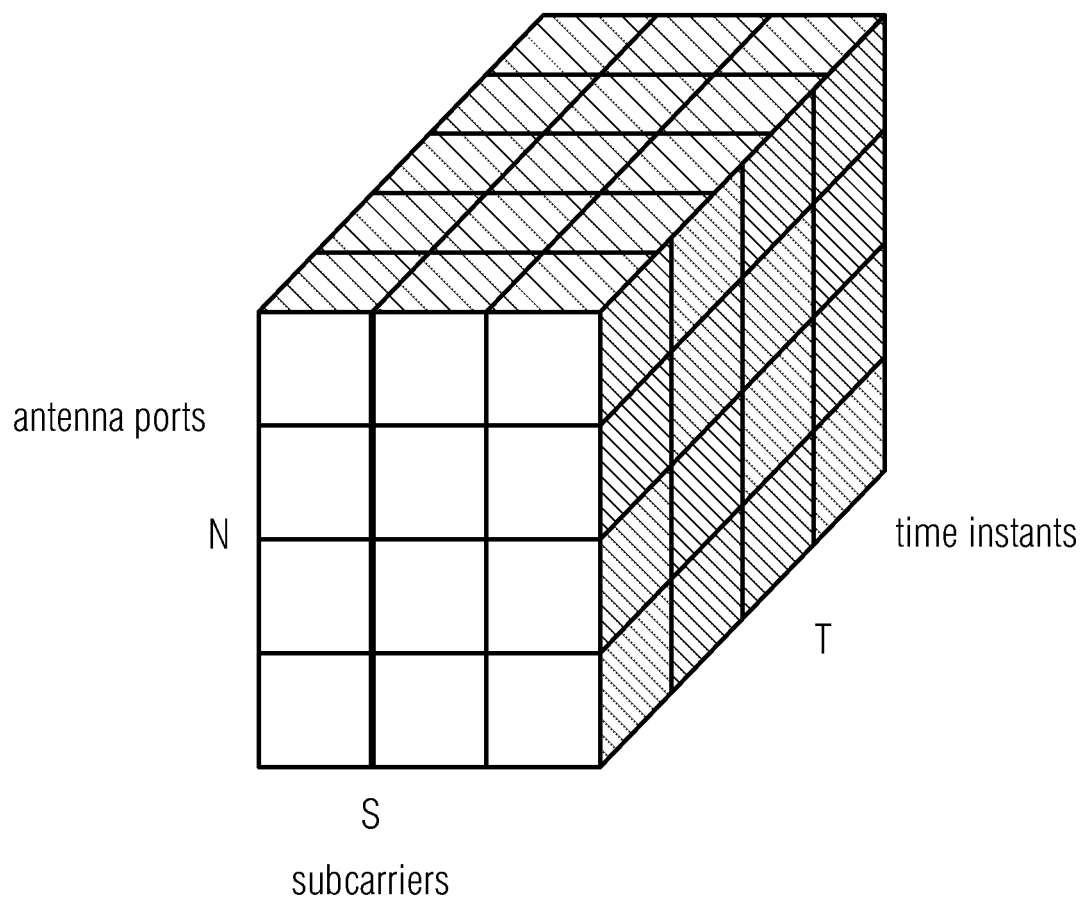
FIG. 7 illustrates a frequency-domain channel tensor (three-dimensional array) $\mathcal{H}$ of dimension N×S×T.

The explicit CSI may be represented by a three-dimensional channel tensor (a three-dimensional array) $\mathcal{H} \in \mathbb{C}^{N \times S \times T}$ of dimension N×S×T with S being the number of configured sub-bands/PRBs, or subcarriers (see FIG. 7), and $N=N_r \cdot N_1 \cdot N_2 \cdot P$, where $N_r$ is the number of UE receive antennas. Here, the first, second and third dimension of the channel tensor represent the space, frequency, and time component of the time-variant frequency-selective MIMO channel, respectively.

The explicit CSI may be represented by a four-dimensional channel tensor $\mathcal{H} \in \mathbb{C}^{N_r \times N_t \times S \times T}$ of dimension $N_r \times N_t \times S \times T$, where $N_t = N_1 \cdot N_2 \cdot P$. Here, the first and second dimension of $\mathcal{H}$ represent the receive-side and transmit-side space components of the time-variant frequency-selective MIMO channel, respectively. The third and fourth dimension of if represent the frequency and time component of the MIMO channel, respectively.

In a next step, the UE calculates a CQI using the explicit CSI in the form of the channel tensor $\mathcal{H}$ and a composite Doppler-delay-beam three-stage precoder constructed using three $\mathcal{H}$ separate codebooks:
- a first codebook $\Omega_1$ for the transmit-side space (beams) components of the Doppler-delay-beam precoder;
- a second codebook $\Omega_2$ for the delay components of the Doppler-delay-beam precoder; and
- a third codebook $\Omega_3$ for the Doppler-frequency components of the Doppler-delay-beam precoder.

Instead of using three separate codebooks, the above-mentioned beam, delay and Doppler-frequency components may be included into a single or common codebook, or two of the above mentioned beam, delay and Doppler-frequency components are included in one codebook, and the remaining component is included in another codebook.

Assuming a rank-L transmission, the composite Doppler-delay-beam three-stage precoder $W^{(l)}$ of dimension $N_t \cdot T \times S$ for the l-th layer (l=1, ..., L) is represented by a (column-wise) Kronecker-product (assuming a dual-polarized transmit antenna array at the gNB) as $$W^{(l)} = P^{(l)} \begin{bmatrix} \sum_{u=0}^{U^{(l)}-1} \sum_{d=0}^{D_u^{(l)}-1} \sum_{v=0}^{F_{d,u}^{(l)}-1} \gamma_{1,u,d,v}^{(l)} f_{1,u,d,v}^{(l)} \otimes d_{1,u,d}^{(l)T} \otimes b_u^{(l)} \\ \sum_{u=0}^{U^{(l)}-1} \sum_{d=0}^{D_u^{(l)}-1} \sum_{v=0}^{F_{d,u}^{(l)}-1} \gamma_{2,u,d,v}^{(l)} f_{2,u,d,v}^{(l)} \otimes d_{2,u,d}^{(l)T} \otimes b_u^{(l)} \end{bmatrix} \quad (1)$$

where $U^{(l)}$ is the number of beams per polarization for the l-th layer, $D_u^{(l)}$ is the number of delays for the l-th layer and u-th beam, $F_{d,u}^{(l)}$ is the number of Doppler-frequency components for the l-th layer, u-th beam and d-th delay, and $f_{p,u,d,v}^{(l)}$ is the v-th Doppler-frequency vector of size T×1, selected from a codebook matrix $\Omega_3$, associated with the l-th layer, d-th delay, u-th spatial beam, and the p-th (p=1, 2) polarization of the Doppler-delay-beam precoder;

$d_{p,u,d}^{(l)}$ is the d-th delay vector of size S×1, selected from a codebook matrix $\Omega_2$, associated with the l-th layer, u-th spatial beam and the p-th polarization of the Doppler-delay-beam precoder;

$b_u^{(l)}$ is the u-th spatial beam (polarization-independent) associated with the l-th layer selected from a codebook matrix $\Omega_1$;

$\gamma_{p,u,d,v}^{(l)}$ is the Doppler-delay coefficient associated with the l-th layer, u-th spatial beam, d-th delay, v-th Doppler-frequency and the p-th polarization of the Doppler-delay-beam precoder, and $P^{(l)}$ is a scalar normalization factor to ensure that the average total transmission power over all precoder layers is 1.

Figure 8:
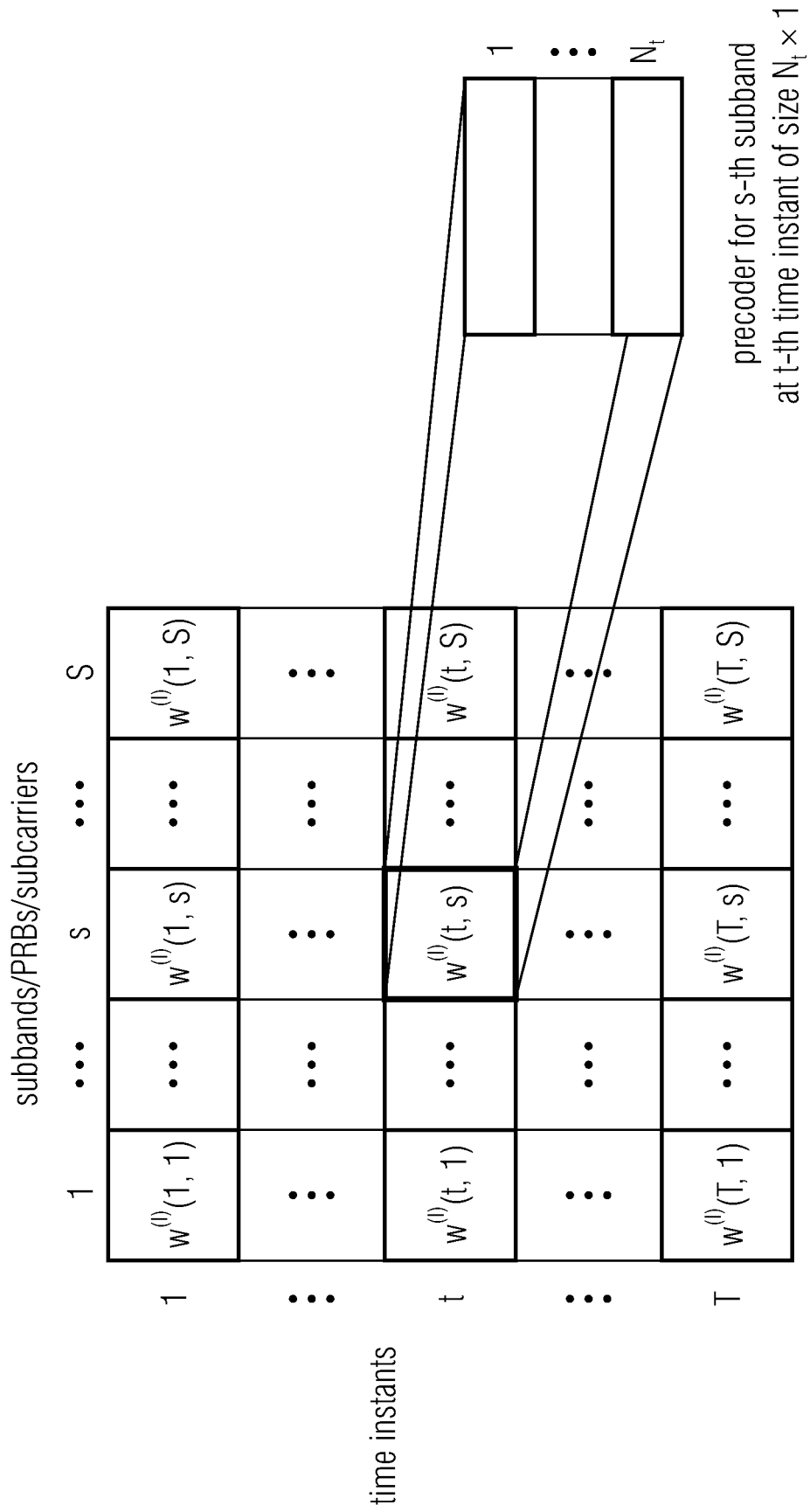
FIG. 8 illustrates a composite Doppler-delay-beam precoder matrix of size $N_t \cdot T \times S$.

A structure of the Doppler-delay-beam composite precoder matrix is shown in FIG. 8, which illustrates the composite Doppler-delay-beam precoder matrix of size $N_t \cdot T \times S$.

The Doppler-delay-beam precoder may be expressed as a dual-stage precoder:

$$W^{(l)} = W^{(1,l)} w^{(2,l)} \in \mathbb{C}^{N_t \cdot T \cdot S \times 1},$$

where $$W^{(1,l)} = \begin{bmatrix} X_1 & 0 \\ 0 & X_2 \end{bmatrix}$$

with $X_1 = [f_{1,0,0,0}^{(l)} \otimes d_{1,0,0}^{(l)} \otimes b_0^{(l)} \ \ldots \ f_{1,u,d,v}^{(l)} \otimes d_{1,u,d}^{(l)} \otimes b_u^{(l)} \ \ldots \ f_{1,U^{(l)}-1,D_u^{(l)}-1,F_{d,u}^{(l)}-1}^{(l)} \otimes d_{1,U^{(l)}-1,D_u^{(l)}-1}^{(l)} \otimes b_{U^{(l)}-1}^{(l)}],$ $X_2 = [f_{2,0,0,0}^{(l)} \otimes d_{2,0,0}^{(l)} \otimes b_0^{(l)} \ \ldots \ f_{2,u,d,v}^{(l)} \otimes d_{2,u,d}^{(l)} \otimes b_u^{(l)} \ \ldots \ f_{2,U^{(l)}-1,D_u^{(l)}-1,F_{d,u}^{(l)}-1}^{(l)} \otimes d_{2,U^{(l)}-1,D_u^{(l)}-1}^{(l)} \otimes b_{U^{(l)}-1}^{(l)}],$ and $w^{(2,l)}$ contains the complex Doppler-delay-beam combining coefficients, $w^{(2,l)} = [\gamma_{1,0,0,0}^{(l)} \ \ldots \ \gamma_{1,u,d,v}^{(l)} \ \ldots \ \gamma_{1,U^{(l)}-1,D_u^{(l)}-1,F_{d,u}^{(l)}-1}^{(l)} \gamma_{2,0,0,0}^{(l)} \ \ldots \ \gamma_{2,u,d,v}^{(l)} \ \ldots \ \gamma_{2,U^{(l)}-1,D_u^{(l)}-1}^{(l)}]^T$ The values for the number of beams, delays, and Doppler-frequency components ($U^{(l)}$, $D_u^{(l)}$, $F_{d,u}^{(l)}$) may be configured via a higher layer (e.g., RRC, or MAC) signaling or as a part of the DCI (physical layer signaling) in the downlink grant from the gNB to the UE. The UE may report the advantageous values of ($U^{(l)}$, $D_u^{(l)}$, $F_{d,u}^{(l)}$) as a part of the CSI report. The values of ($U^{(l)}$, $D_u^{(l)}$, $F_{d,u}^{(l)}$) may be known a-priori by the UE.

Beam Configuration:

The number of beams $U^{(l)}$ may be configured to be non-identical over the layers. The number of beams $U^{(l)}$ may be configured to be identical for all layers. In this case, $U^{(l)} = U, \forall l$. The beam configuration may be a-priori known by the UE.

Delay Configuration:

The delay components may be configured in different ways, as will now be described.

In accordance with a first example, the $D_u^{(l)}$ delay values, e.g., the indices of delay DFT-vectors, may differ for different beams, layers and polarizations.

In accordance with a second example, the $D_u^{(l)}$ delay values, e.g., the indices of delay DFT-vectors, may differ for different beams and layers, but are identical for all polarizations.

In accordance with a third example, the $D_u^{(l)}$ delay values, e.g., the indices of delay DFT-vectors, are identical for all beams, layers and polarizations.

In accordance with a fourth example, the $D_u^{(l)}$ delay values, e.g., the indices of delay DFT-vectors, are identical for all beams and layers, but may differ over the polarizations.

In accordance with a fifth example, the $D_u^{(l)}$ delay values, e.g., the indices of delay DFT-vectors, are identical for all beams and polarization indices, but may vary over the layers.

In accordance with a sixth example, the $D_u^{(l)}$ delay values, e.g., the indices of delay DFT-vectors, are identical for all beams, but may vary over the layers and polarizations.

In accordance with a seventh example, the number of delays $D_u^{(l)}$ depends on the beam and layer index.

In accordance with an eighth example, the number of delays $D_u^{(l)}$ depends on the beam index, and remains identical for all layer indices, $D_u^{(l)}=D_u, \forall l, u$.

In accordance with a ninth example, the number of delays $D_u^{(l)}$ is identical for all beam indices, but may vary per layer, $D_u^{(l)}=D^{(l)}, \forall l, u$.

In accordance with a tenth example, the number delays $D_u^{(l)}$ is identical for all beam indices and layer indices, $D_u^{(l)}=D \forall l, u$.

The delay components configuration as explained above may be configured via a higher layer (e.g., RRC, or MAC) signaling or may be configured as a part of DCI (physical layer signaling) in the downlink grant from the gNB to the UE. The delay configuration may be a-priori known by the UE.

Doppler-Frequency Configuration:

The Doppler-frequency components may be configured in different ways, as will now be described.

In accordance with a first example, the number of Doppler-frequency components $F_{d,u}^{(l)}$ depends on the beam index, delay index and layer index.

In accordance with a second example, the number of Doppler-frequency components $F_{d,u}^{(l)}$ is identical for all beam, delays and layer indices, such that $F_{d,u}^{(l)}=F$, $\forall u, d, l$.

In accordance with a third example, the number of Doppler frequency-components $F_{d,u}^{(l)}$ is identical for all beam indices and all delay indices, but may vary over the layer indices $F_{d,u}^{(l)}=F^{(l)}$, $\forall u, d, l$.

In accordance with a fourth example, the number of Doppler frequency-vectors $F_{d,u}^{(l)}$ is identical for all beam indices, but it varies over delay and layer indices, $F_{d,u}^{(l)}=F_{d,u}^{(l)} \forall u, d, l$.

In accordance with a fifth example, the number of Doppler frequency-components $F_{d,u}^{(l)}$ is identical for all beam indices and layer indices, but it varies over delay indices, $F_{d,u}^{(l)}=F_d$, $\forall u, d, l$.

In accordance with a sixth example, the number of Doppler frequency-components $F_{d,u}^{(l)}$ may be different for the U beams, and identical for all delay and layer indices, $F_{d,u}^{(l)}=F_u$, $\forall u, d, l$.

In accordance with a seventh example, the number of Doppler-frequency-components $F_{d,u}^{(l)}$ is varying over beam and delay indices and identical for all layer indices, $F_{d,u}^{(l)}=F_{d,u}$, $\forall u, d, l$.

In accordance with an eighth example, the number of Doppler frequency-components $F_{d,u}^{(l)}$ is varies over beam and layer indices, and is identical for all delay indices, $F_{d,u}^{(l)}=F_u^{(l)}$, $\forall u, d, l$.

In accordance with a ninth example, the $F_{d,u}^{(l)}$ Doppler-frequency values (indices of Doppler-frequency DFT-vectors) may vary over the beams, delays, layers and polarizations.

In accordance with a tenth example, the $F_{d,u}^{(l)}$ Doppler-frequency values (indices of Doppler-frequency DFT-vectors) may vary over the beams, delays, and layers, but are identical for all polarizations.

In accordance with an eleventh example, the $F_{d,u}^{(l)}$ Doppler-frequency values are identical for all beams and delays, but may vary over the layers and polarizations.

In accordance with a twelfth example, the $F_{d,u}^{(l)}$ Doppler-frequency values are identical for all beams, delays and polarizations, but may vary over the layers.

The Doppler-frequency components configuration as explained above may be configured via a higher layer (e.g., RRC, or MAC) signaling or may be configured as a part of DCI (physical layer signaling) in the downlink grant from the gNB to the UE. The Doppler-frequency configuration may be a-priori known by the UE.

DFT-Codebook Matrix Structure for $\Omega_1$, $\Omega_2$, and $\Omega_3$:

Examples for implementing the above-mentioned codebooks are now described.

The vectors (spatial beams) $b_u^{(l)}$ may be selected from an oversampled DFT-codebook matrix $\Omega_1$ of size $N_1 N_2 \times O_{1,1} N_1 O_{1,2} N_2$. The DFT-codebook matrix is parameterized by the two oversampling factors $O_{1,1} \in \{1, 2, 3, \ldots\}$ and $O_{1,2} \in \{1, 2, 3, \ldots\}$. The DFT-codebook matrix contains a set of vectors, where each vector is represented by a Kronecker product of a length-$N_1$ DFT-vector $$v_l = \left[1, e^{j\frac{2\pi l}{O_{1,1} N_1}}, \ldots, e^{j\frac{2\pi l(N_1-1)}{O_{1,1} N_1}}\right]^T, l = 0, \ldots, O_{1,1} N_1 - 1$$

corresponding to a vertical beam and a length-$N_2$ DFT-vector $$u_m = \left[1, e^{j\frac{2\pi m}{O_{1,2} N_2}}, \ldots, e^{j\frac{2\pi m(N_2-1)}{O_{1,2} N_2}}\right]^T, m = 0, \ldots, O_{1,2} N_2 - 1$$

corresponding to a horizontal beam.

The delay vectors $d_{u,d}^{(l)}$ may be selected from an oversampled DFT-codebook matrix $\Omega_2 = [c_0, c_1, \ldots, c_{SO_2-1}]$ of size $S \times SO_2$. The DFT-codebook matrix $\Omega_2$ contains $SO_2$ vectors, where each vector is represented by a length-$S$ DFT-vector $$c_l = \left[1, e^{j\frac{2\pi l}{O_2 S}}, \ldots, e^{j\frac{2\pi l(S-1)}{O_2 S}}\right]^T, l = 0, \ldots, O_2 S - 1.$$

Each entry in the codebook matrix is associated with a specific delay. The DFT-codebook matrix is parameterized by the oversampling factor $O_2=1, 2, \ldots$ .

The Doppler-frequency vectors $f_{p,u,d,v}^{(l)}$ may be selected from an oversampled DFT-codebook matrix $\Omega_3=[a_0, a_1, \ldots, a_{TO_3-1}]$ of size $T \times TO_3$. The DFT-codebook matrix $\Omega_3$ contains $TO_3$ vectors, where each vector is represented by a length-T DFT-vector $$a_l = \left[1, e^{j\frac{2\pi l}{O_3 S}}, \ldots, e^{j\frac{2\pi l(S-1)}{O_3 S}}\right]^T, l = 0, \ldots, O_3 S - 1.$$

Each entry in the codebook matrix is associated with a specific Doppler-frequency. The DFT-codebook matrix is parameterized by the oversampling factor $O_3=1, 2, \ldots$ .

The oversampled factors $O_{1,1}, O_{1,2}, O_2, O_3$ of the DFT-codebook matrices may be configured via a higher layer (e.g., RRC, or MAC) signaling or may be configured as a part of the DCI (physical layer signaling) in the downlink grant from the gNB to the UE. Alternatively, the oversampled factors $O_{1,1}, O_{1,2}, O_2, O_3$ of the DFT-codebook matrices may be known by the UE.

UE-Side Selection of W:

The UE selects an advantageous Doppler-delay precoder matrix W based on a performance metric (see step 256 in FIG. 4).

The UE may select the precoder matrix W that optimizes the mutual-information $I(W; \mathcal{H})$, which is a function of the Doppler-delay precoder matrix W and the multi-dimensional channel tensor $\mathcal{H}$ for each configured SB, PRB, or subcarrier.

The U spatial beams, Doppler frequencies and delays may be selected step-wise. For example, for a rank-1 transmission, in a first step, the UE selects the U spatial beams that optimize the mutual information:

$$\hat{b}_1^{(1)}, \ldots, \hat{b}_U^{(1)} = \mathrm{argmax}\ I(\mathcal{H}; b_1^{(1)}, \ldots, b_U^{(1)}) (\text{for rank 1}).$$

In a second step, the UE calculates the beam-formed channel tensor $\tilde{\mathcal{H}}$ of dimension $2UN_r \times S \times T$ with the U spatial beams $\hat{b}_1^{(1)}, \ldots, \hat{b}_U^{(1)}$.

In a third step, the UE selects three-tuples of Doppler-frequency DFT-vectors, delay DFT-vectors and Doppler-delay-beam combining coefficients, where the Doppler-frequency and delay DFT-vectors are selected from the codebooks $\Omega_3$ and $\Omega_2$, respectively, such that the mutual information $I(\tilde{\mathcal{H}}; W|\hat{b}_1^{(1)}, \ldots, \hat{b}_U^{(1)})$ is optimized.

UE-Side Selection of RI:

The UE may select the rank indicator, RI, for reporting (see step 258 in FIG. 4). When RI reporting is configured at the UE, the UE reports a rank indicator (total number of layers) for the transmission. The rank indicator is selected with respect to the Doppler-delay-beam precoder matrix $W^{(l)}(l=1, \ldots, L)$ (see equation (1) above), and denotes the average number of layers supported by the Doppler-delay-beam precoded time-variant frequency-selective MIMO channel.

UE-Side Selection of CQI:

The UE may select the channel quality indicator, CQI, for reporting (see step 258 in FIG. 4). When CQI reporting is configured at the UE, the UE reports an advantageous CQI based on a specific performance metric such as signal-to-interference and noise ratio (SINR), average bit error rate, average throughput, etc.

For example, the UE may select the CQI that optimizes the average block error rate block_error_rate $(\mathcal{H} | W^{(l)}(l=1, \ldots, L))$ at the UE for the selected composite Doppler-delay-beam precoder matrix $W^{(l)}$ $(l=1, \ldots, L)$ (see equation (1) above) and a given mufti-dimensional channel tensor $\mathcal{H}$ for the for the T time instants. The CQI value represents an "average" CQI supported by the Doppler-delay-beam precoded time-variant frequency-selective MIMO channel.

Moreover, a CQI (multiple CQI reporting) for each configured SB may be reported using the selected composite Doppler-delay-beam precoder matrix $W^{(l)}$ $(l=1, \ldots, L)$ (see equation (1) above) and a given multi-dimensional channel tensor $\mathcal{H}$ for the T time instances.

PMI Reporting:

The UE may select the precoder matrix indicator, PMI, for reporting (see step 258 in FIG. 4). When PMI reporting is configured at the UE, the UE reports at least a two-component PMI.

Figure 9:
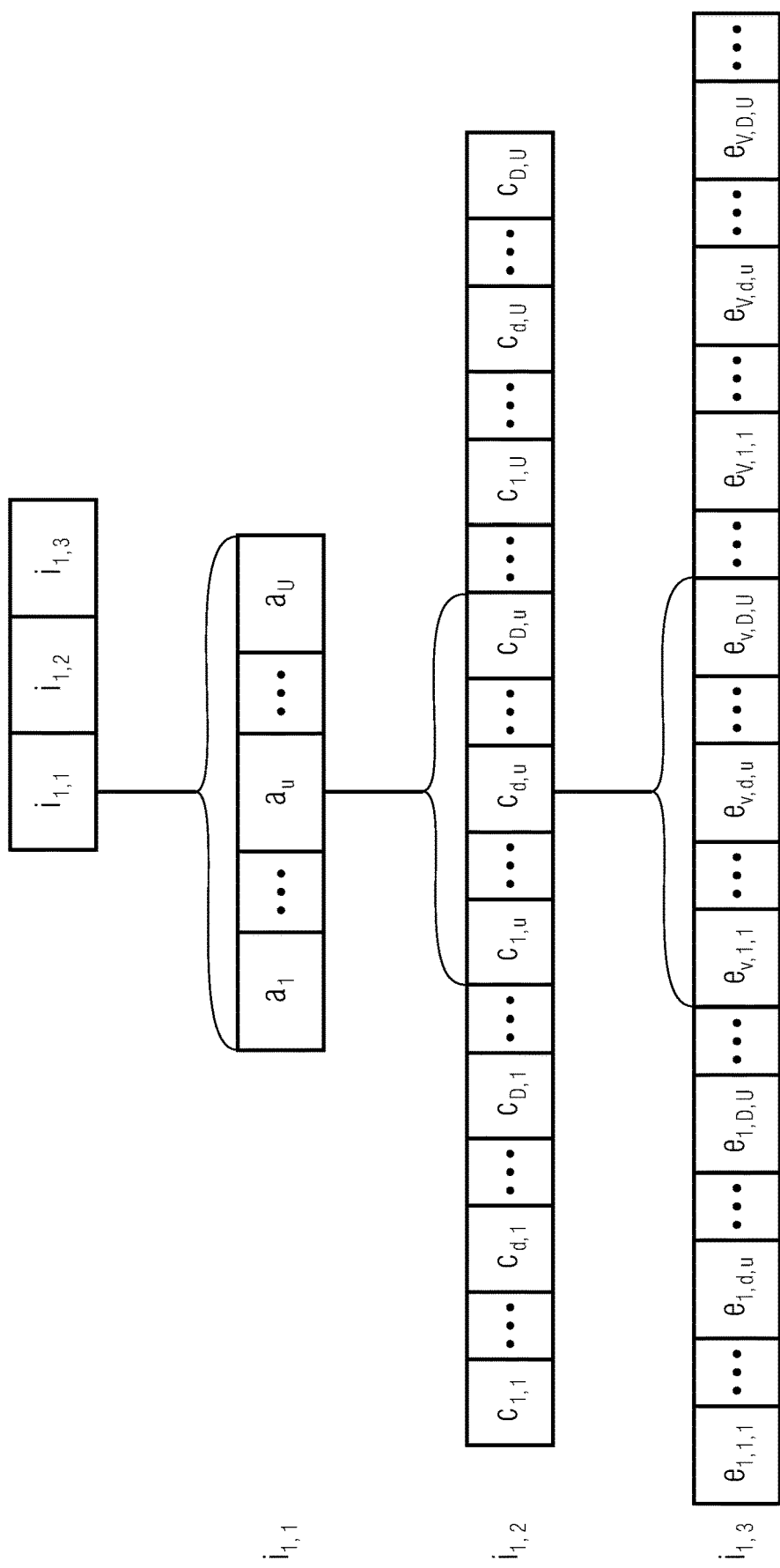
FIG. 9 illustrates feedback indices associated with a beam, delay and Doppler-frequency components for a layer-1 transmission assuming equal number of delays per beam and equal number of Doppler-frequency components per delay and beam.

The first PMI component may correspond to the selected vectors $b_u^{(l)}$, $d_{p,u,d}^{(l)}$ and $f_{p,u,d,v}^{(l)}$, and may be represented in the form of three-tuple' sets, where each three-tuple (u, d, v) is associated with a selected spatial beam vector $b_u^{(l)}$, a selected delay vector $d_{p,u,d}^{(l)}$, and a selected Doppler-frequency vector $f_{p,u,d,v}^{(l)}$. For example, the three-tuple' sets may be represented by $i_1=[i_{1,1}, i_{1,2}, i_{1,3}]$ for a rank-1 transmission. Here, $i_{1,1}$ contains $\Sigma_l U^{(l)}$ indices of selected DFT-vectors for the spatial beams, $i_{1,2}$ contains $2 \Sigma_{u,l} D_u^{(l)}$ indices of selected delay-vectors, and $i_{1,3}$ contains $2 \Sigma_{u,d,l} F_{d,u}^{(l)}$ indices of selected Doppler-frequency-vectors. FIG. 9 illustrates feedback indices associated with a beam, delay and Doppler-frequency components for a layer-1 transmission assuming equal number of delays per beam $D_u^{(l)}=D$, $\forall u$, and equal number of Doppler-frequency components per delay and beam $F_{d,u}^{(l)}=V$, $\forall d, u$.

FIG. 9 illustrates feedback indices associated with a beam, delay and Doppler-frequency components for a layer-1 transmission assuming equal number of delays per beam $D_u^{(l)}=D$, $\forall u$, and equal number of Doppler-frequency components per delay and beam Fa u=V, $\forall d, u$. FIG. 9 shows an example for $i_1$ for a layer-1 transmission. The subset $i_{1,1}$ of $i_1$ represents the beam indices selected from the codebook $\Omega_1$ and are denoted by $a_u$, $\forall u$. The subset $i_{1,2}$ of $i_1$ represents the delay indices selected from the codebook $\Omega_2$ and are denoted by $c_{d,u}$, $\forall d, u$. The subset $i_3$ of $i_1$ represents the selected Doppler-frequency indices from the codebook $\Omega_3$ and are denoted by $e_{v,d,u}$, $\forall v, d, u$.

To report the $2 \Sigma_{u,d,l} F_{d,u}^{(l)}$ Doppler-delay-beam combining coefficients $\gamma_{p,u,d,v}^{(l)}$ from the UE to the gNB, the UE may quantize the coefficients using a codebook approach. The quantized combining coefficients are represented by $i_2$, the second PMI. The two PMIs are reported to the gNB.

The large-scale channel parameters such as path loss and shadow fading do not change quickly over time, and the channel variations are mainly related to small scale channel fading. This means the MIMO channel parameters of the impulse response such as path components and channel delays do not change over a longer time period, and channel variations caused by movement of the UE lead only to phase fluctuations of the MIMO channel path components. This means the spatial beams, the precoder Doppler-frequency DFT-vectors, the delay DFT-vectors as well as the Doppler-delay coefficients of the Doppler-delay-beam three-stage precoder $W^{(l)}$ remain identical for a long time period, and need to be less frequently updated.

Figure 10:
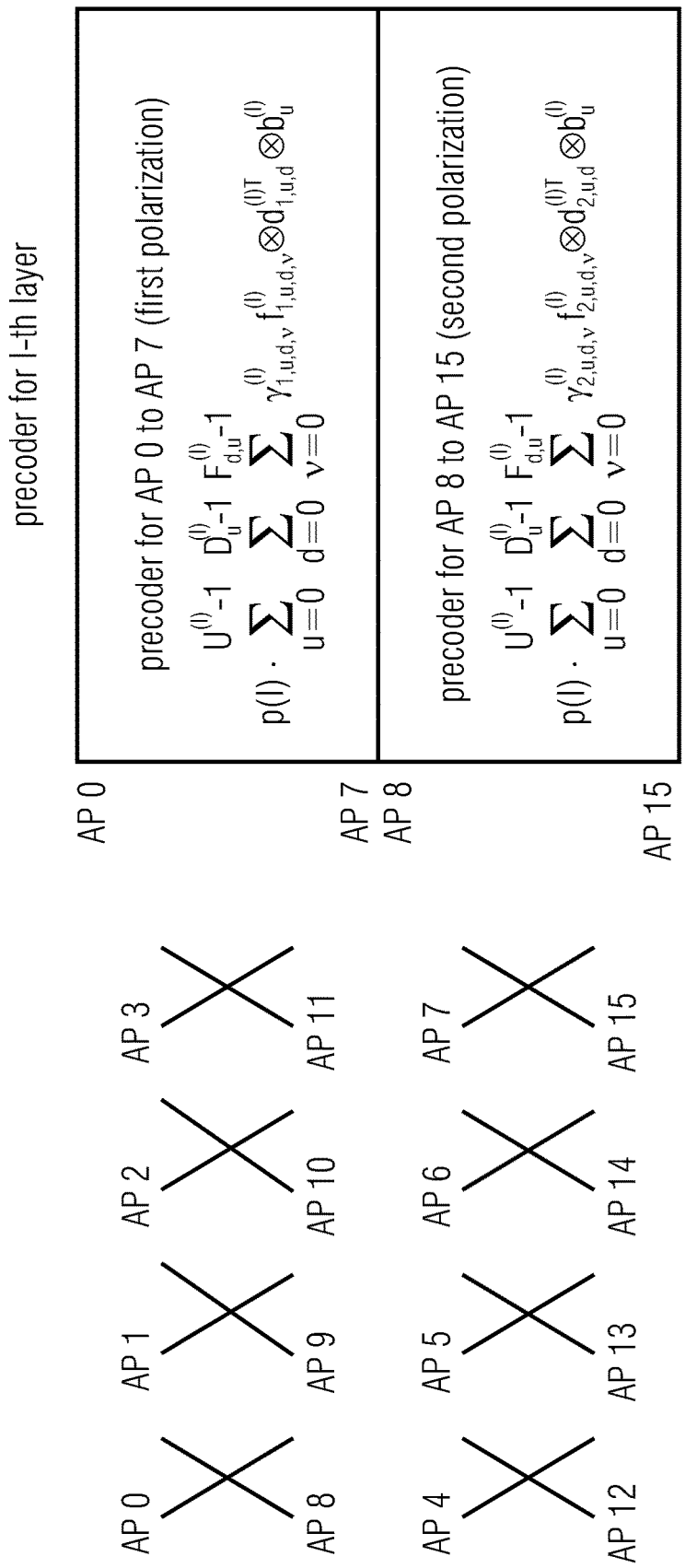
FIG. 10 illustrates a codebook based construction of the l-th layer precoder at the gNB and the association of the l-th layer precoder with the antenna ports (AP) for an example configuration $N_1=4$, $N_2=2$, $P=2$.

Precoder Construction at the gNB:

The gNB may use the two-component PMI feedback from the UE to construct the precoder matrix according to the codebook-based construction shown in FIG. 10, which illustrates a codebook based construction of the l-th layer precoder at the gNB and the association of the l-th layer precoder with the antenna ports (AP) for an example configuration $N_1=4$, $N_2=2$, $P=2$. The precoder matrix information is used to calculate a multi-user precoding matrix which is applied to the transmission signals to adapt the transmission parameters to the current multiuser channel conditions. The above Doppler-delay composite Kronecker-based precoder matrix definition also facilitates the prediction of precoder matrices for future time instances. In this way, the number of CSI reports may be drastically reduced and feedback overhead is saved.

To facilitate precoder matrix prediction for QT future time instants, the Doppler-frequency DFT-vectors $f_{p,u,d,v}^{(l)}$ may be cyclically extended to length-QT vectors $t_{p,u,d,v}^{(l)}$. The cyclic extension is defined by $$t_{p,u,d,v}^{(l)} = \left[1, e^{j\frac{2\pi k}{O_3}}, \ldots, e^{j\frac{2\pi k(Q-1)}{O_3}}\right]^T \otimes f_{p,u,d,v}^{(l)}, \forall u, d, v, p, l,$$

where $$f_{p,u,d,v}^{(l)} = \left[1, e^{j\frac{2\pi k}{O_3 T}}, \ldots, e^{j\frac{2\pi k(T-1)}{O_3 T}}\right]^T \in \Omega_3.$$

The predicted precoder matrix for the l-th layer and q-th (q=1, ..., QT) time instant is given by $$\hat{W}^{(l)}(q) = P^{(l)} \begin{bmatrix} \sum_{u=0}^{U^{(l)}-1} \sum_{d=0}^{D_u^{(l)}-1} \sum_{v=0}^{F_{d,u}^{(l)}-1} \gamma_{1,u,d,v}^{(l)} t_{1,u,d,v}^{(l)}(q) \otimes d_{1,u,d}^{(l)T} \otimes b_u^{(l)} \\ \sum_{u=0}^{U^{(l)}-1} \sum_{d=0}^{D_u^{(l)}-1} \sum_{v=0}^{F_{d,u}^{(l)}-1} \gamma_{2,u,d,v}^{(l)} t_{2,u,d,v}^{(l)}(q) \otimes d_{2,u,d}^{(l)T} \otimes b_u^{(l)} \end{bmatrix}$$

where $t_{p,u,d,v}^{(l)}(q)$ is the q-th entry of $t_{p,u,d,v}^{(l)}$.

The predicted precoding matrices may be used in predictive multi-user scheduling algorithms that attempt to optimize, for example, the throughput for all users by using the knowledge of current and future precoder matrices of the users.

Codebook for Doppler-Delay Combining Coefficients:

The UE may be configured to quantize the complex Doppler-delay coefficients $\gamma_{p,u,d,v}^{(l)}$ with a codebook approach. Each coefficient is represented by $$\gamma_{p,u,d,v}^{(l)} = \hat{\gamma}_{p,u,d,v}^{(l)} \phi_{p,u,d,v}^{(l)},$$

where $\hat{\gamma}_{p,u,d,v}^{(l)}$ is a polarization-, beam-, delay- and Doppler-frequency-dependent amplitude coefficient which is quantized with N bits; and $\phi_{p,u,d,v}^{(l)}$ represents a phase which is represented by a BPSK, or QPSK, or 8PSK, and any higher-order constellation.

Each coefficient may be represented by its real and imaginary part as $$\gamma_{p,u,d,v}^{(l)} = \text{Re}\{\hat{\gamma}_{p,u,d,v}^{(l)}\} + j\text{Imag}\{\hat{\gamma}_{p,u,d,v}^{(l)}\},$$

where $\text{Re}\{\hat{\gamma}_{p,u,d,v}^{(l)}\}$ and $\text{Imag}\{\hat{\gamma}_{p,u,d,v}^{(l)}\}$ are quantized each with N bits;

Extension to CQI Value Prediction:

The UE may be configured to predict a CQI value for time-instant/slot "n+K", where n denotes the current time-instant/slot, and K denotes the relative time difference with respect to the current time-instant/slot n.

In one example, the UE uses in a first step a high resolution parameter estimation algorithm, such as RIMAX (see reference [5]), to estimate parameters of a channel model directly from the multi-dimensional channel tensor $\mathcal{H}$. For example, the time-variant MIMO channel model impulse response may be defined by a number of channel taps, where each channel tap is parameterized with a channel gain, Doppler-frequency shift and a delay. The time-variant frequency-selective MIMO channel model frequency-domain response between the i-th gNB antenna and the j-th UE antenna may be expressed by $$h_{i,j}(t, w) = \sum_{m=0}^{M-1} h_{i,j}(m) e^{j2\pi f_m t} e^{-j\frac{2\pi w \tau_m}{W}},$$

where

M is the number of channel delays, $h_{i,j}(m)$ is the m-th path gain with associated Doppler-frequency shift $f_m$ and channel delay $\tau_m$, t represent the time instant, w denotes the subcarrier index, and W denotes the total number of subcarriers.

In the present example, a non-polarimetric channel model is assumed, where the channel delays are identical for all links (i,j) of the MIMO channel.

It is noted that the coefficients of H(t, w) may also be calculated directly in a non-parameterized form from the MIMO channel tensor $\mathcal{H}$ by using a linear block-filtering approach such as least squares or minimum-mean-squared-error (MMSE) filtering (see references [6] and [7]). In this case, the channel predictor is formed by a weighted sum of the MIMO channel tensor $\mathcal{H}$.

In a second step, the parameterized channel model and the selected Doppler-delay-beam composite precoder $W^{(l)}$ (l=1, ..., L) (see equation (1) above) are used to calculate a parameterized precoded time-variant MIMO channel model frequency-domain response as $$H_{prec}(t,w) = H(t,w)[W^{(1)}(t,w), W^{(2)}(t,w), \ldots, W^{(L)}(t,w)],$$

where the (i,j) entry of $[H(t, w)]_{i,j} = h_{i,j}(t, w)$, and $W^{(l)}(t, w)$ is the t-th block and w-th column of $W^{(l)}$ (see FIG. 8).

In a third step, the UE uses the parameterized precoded MIMO channel model response to calculate a CQI value for a future time instant n+K, i.e., the CQI(n+K) is expressed as a function of $H_{prec}(n+K, w)$.

The UE may use the above parameterized precoded MIMO channel response also to predict K future CQI values (multiple CQI reporting) for the "n+k" (k=0, ..., K) future time instants. The K predicted CQI values may be used to calculate differential predicted CQI values by reducing the K predicted CQI values by the "average" CQI value. The predicted single CQI value, or predicted K CQI values, or predicted K differential CQI values is/are reported to the gNB.

As mentioned above, other examples operating on the basis of repeated downlink reference signals may use other precoders or other techniques to determine the CSI feedback based on the repeated downlink reference signals and to report determine the CSI feedback. Thus, further examples provide a communication device for providing a channel state information, CSI, feedback in a wireless communication system, wherein the communication device receives a CSI-RS resource configuration including a higher layer (e.g., RRC) parameter, e.g., referred to as CSI-RS-BurstDuration, indicating a time-domain-repetition of the downlink reference signals, e.g., in terms of a number of consecutive slots the downlink reference signals are repeated in. The communication device determines the CSI feedback based on the repeated downlink reference signals and reports the determined CSI feedback.

Extension to Port-Selection Codebook:

The UE may be configured with a CSI-RS reporting configuration via a higher layer for reporting a CQI, RI and PMI (if configured) for beam-formed CSI-RS. In this case, the vectors in the first codebook matrix are represented by $N_1N_2$-length column vectors, where the m-th vector (m=1, . . . , $N_1N_2$) contains a single 1 at the m-th position and zeros elsewhere.

Precoder Application at gNB:

The UE may assume that, for CQI, and/or RI, and/or PMI calculation, the gNB applies the Doppler-delay-beam precoder calculated with respect to equation (1) above, to the PDSCH signals on antenna ports {1000, 1008+v−1} for v=L layers as $$\begin{bmatrix} y^{(t,3000)}(i) \\ \vdots \\ y^{(t,3000+P-1)}(i) \end{bmatrix} = W(t,i) \begin{bmatrix} x^{(t,0)}(i) \\ \vdots \\ x^{(t,v-1)}(i) \end{bmatrix},$$

where $[x^{(t,0)}(i), \ldots, x^{(t,v-1)}(i)]^T$ is a symbol vector of PDSCH symbols from the layer mapping defined in Subclause 7.3.1.4 of TS 38.211 [1], P∈{1, 2, 4, 8, 12, 16, 24, 32}, $x^{(t,u)}(i)$ is the i-th symbol of layer u at time instant t, $y^{(t,u)}(i)$ is the precoded symbol transmitted on antenna port u at time instant t, and $W(t,i)=[W^{(1)}(t,i), \ldots, W^{(L)}(t,i)]$ is the predicted precoder matrix calculated according to equation (1) with $W^{(l)}(t, i)$ being the t-th block and i-th column of $W^{(l)}$.

The corresponding PDSCH signals $[y^{(t,3000)}(i) \ldots y^{(t,3000+P-1)}(i)]$ transmitted on antenna ports [3000, 3000+P−1] have a ratio of, energy per resource element, EPRE, to CSI-RS EPRE equal to the ratio given in Subclause 4.1 of TS 38.214 [2].

It is noted that for the current PDSCH transmission scheme as described in [2] the precoder matrix is kept constant over time until it is updated by a reported PMI. In contrast, the approach described above takes into account the channel variations by updating the precoder matrix continuously over time without instantaneous PMI reporting.

Embodiments of the present invention to reduce the UE calculation complexity for calculating the precoder matrix and to reduce feedback overhead are now described in more detail. It is noted that several embodiments are described in the following, basically, independent of each other, however, the subsequently described embodiments may be implemented individually or in combination. In other words, some or all of the subsequently described embodiments may be combined—unless mutually exclusive.

Common Subset Selection and Reporting of Delay DFT Vectors and/or Doppler DFT Vectors In accordance with embodiments, in order to reduce the UE calculation complexity for calculating the precoder matrix and feedback overhead for indicating the selected delay DFT vectors, the UE selects from the second codebook a subset of $D_u^{(l)}=D$ delay DFT vectors, which are common to all beam indices, i.e., $d_{p,u,d}^{(l)}=d_d^{(l)}$, and use the selected D DFT delay vectors to calculate the precoder matrix W. The UE may be configured by the gNB or another network entity with the parameter D by higher layer (e.g., MAC or RRC parameter) or physical layer (L1 parameter).

In accordance with embodiments, the parameter D depends on the configured codebook size (S), such that D=func(S). For example, the parameter D may be given by D=pS, where the parameter p≤1 controls the feedback overhead. The parameter p may be configured via higher layer (RRC parameter) or physical layer (L1 parameter) by the gNB or another network entity. Examples for p are p∈{⅛, ¼, ½, ¾}.

In accordance with embodiments, the UE reports an information/indication of the selected D delay DFT vectors, common to all beam indices, to the gNB as a part of the CSI report. The selected D delay DFT vectors may be indicated using $$\left\lceil \log_2 \binom{S}{D} \right\rceil \text{bits}.$$

In accordance with embodiments, in order to reduce the UE calculation complexity for selecting the D delay DFT vectors from the second codebook, the delay vectors in the second codebook may be grouped into $O_2$ subgroups, where each subgroup (1≤$q_2$≤$O_2$) contains S orthogonal DFT vectors. The UE selects the D DFT vectors for the l-th layer from a single subgroup. The UE may be configured to report the selected subgroup index ($q_2$) to the gNB via higher layer (e.g., MAC or RRC parameter) or physical layer (e.g., L1 parameter).

In accordance with embodiments, in order to reduce the UE calculation complexity for calculating the precoder matrix and feedback overhead for indicating the selected Doppler DFT vectors, the UE selects from the third codebook a subset of $F_u^{(l)}=F$ Doppler DFT vectors, common to all beam indices and common to all delay indices for the precoder, i.e., $f_{p,u,d,v}^{(l)}=f_v^{(l)}$, and use the selected F DFT Doppler vectors to calculate the precoder matrix W. The UE may be configured by the gNB or another network entity with the parameter F via higher layer (e.g., MAC or RRC parameter) or physical layer (L1 parameter).

In accordance with embodiments, the parameter F depends on the configured codebook size T, such that F=func(T). For example, the parameter F may be given by F=pT, where the parameter p≤1 controls the feedback overhead. The parameter p may be configured via higher layer (RRC parameter) or physical layer (L1 parameter) by the gNB or another network entity. Examples for p are p∈{⅛, ¼, ½, ¾}.

In accordance with embodiments, the UE reports the information/indication of the selected F Doppler DFT vectors, common to all beam indices and common to all delay indices, to the gNB as a part of the CSI report. The selected F Doppler DFT vectors may be indicated using $$\left\lceil \log 2\binom{T}{F} \right\rceil \text{ bits.}$$

In accordance with embodiments, in order to reduce the UE calculation complexity for selecting the F Doppler DFT vectors from the third codebook, the Doppler vectors in the third codebook may be grouped into $O_3$ subgroups, where each subgroup ($1 \leq q_3 \leq O_3$) contains T orthogonal DFT vectors. The UE selects the F DFT vectors for the l-th layer from a single subgroup. The UE may be configured to report the selected subgroup index ($q_3$) to the gNB via higher layer (e.g., MAC or RRC parameter) or physical layer (e.g., L1 parameter).

In accordance with embodiments, the UE reports the information of the selected $U^{(l)}$ beam DFT vectors (which are identical for the both polarizations as a part of the CSI report. The selected $U^{(l)}$ beam DFT vectors may be indicated using $$\left\lceil \log 2\binom{N_1 N_2}{U^{(l)}} \right\rceil \text{ bits.}$$

The UE may be configured by the gNB or another network entity with the parameter $U^{(l)}$ via higher layer (e.g., MAC or RRC parameter) or physical layer (L1 parameter).

In accordance with embodiments, depending on the delay spread of the radio channel, the UE may only select $\tilde{U}^{(l)} \leq U^{(l)}$ beam DFT vectors, and reports the selected number $\tilde{U}^{(l)}$ of DFT beam vectors to the gNB via higher layer (e.g., MAC or RRC parameter) or physical layer (e.g., L1 parameter).

In accordance with embodiments, in order to reduce the UE calculation complexity for selecting the $U^{(l)}$ DFT beam vectors from the first codebook, the beam vectors in the first codebook may be grouped into $O_{1,1} \times O_{1,2}$ subgroups, where each subgroup ($1 \leq q_{1,1} \leq O_{1,1}$, $1 \leq q_{1,2} \leq O_{1,2}$) contains $N_1 N_2$ orthogonal DFT vectors. The UE selects the U(W DFT beam vectors for the l-th layer from a single subgroup and report the selected subgroup indices ($q_{1,1}$, $q_{1,2}$) to the gNB via higher layer (e.g., MAC or RRC parameter) or physical layer (e.g., L1 parameter).

In accordance with embodiments, the UE selects from the second codebook a subset of $D_u^{(l)}=D$ delay DFT vectors, common to all beam indices, and to select from the third codebook a subset of $F_u^{(l)}=F$ Doppler DFT vectors, common to all beam indices and common to all delay indices of the precoder, and use the D delay DFT vectors and the F Doppler DFT vectors to calculate the precoder matrix W.

In accordance with embodiments, the UE reports information of the selected $D'_{p,u} \leq D$ delay DFT vectors per beam index (u) and per polarization index (p), out of the selected set of D common DFT delay vectors to the gNB. For example, the UE may be configured with $U^{(l)}=2$ beam vectors per polarization and D=3 delay DFT vectors, common to the four beam indices for both polarizations, and the UE selects for the first beam index u=0 of the first polarization p=1 the delay vectors $d_0^{(l)}$ and $d_1^{(l)}$, but not the delay vector $d_2^{(l)}$, such that the associated combining coefficients $\gamma_{1,0,2,v}^{(l)}=0$, $\forall v$, for the second beam index u=1 of the first polarization the delay vectors $d_0^{(l)}$ and $d_2^{(l)}$, but not the delay vector $d_1^{(l)}$, such that the associated combining coefficients $\Delta_{1,1,1,v}^{(l)}=0$, $\forall v$, and for the two beam indices u=0 and u=1 of the second polarization the delay vectors $d_1^{(l)}$, $d_2^{(l)}$ and $d_3^{(l)}$.

The information of the selected delay vectors per beam and per polarization is reported to the gNB as a part of the CSI report.

In accordance with embodiments, the UE reports information of the selected Doppler $F'_{p,u,d} \leq F$ DFT vectors per beam index (u), per delay index (d) and polarization index (p), out of the selected set of F common Doppler DFT vectors to the gNB. For example, the UE may be configured with $U^{(l)}=2$ beam vectors per polarization, D=4 delay DFT vectors, common to all four beam indices, F=2 Doppler DFT vectors, common to the four beam indices and to the three delay DFT indices, and the UE selects for the first beam index u=0 of the first polarization and first delay index d=0 the Doppler vectors $f_0^{(l)}$ and $f_1^{(l)}$, for the first beam index u=0 of the first polarization and second delay index d=1 no Doppler vectors, such that the associated combining coefficients $\gamma_{1,0,1,0}^{(l)}=0$, $\gamma_{1,0,1,1}^{(l)}=0$, for the first beam index u=0 of the first polarization and third delay index d=2 the Doppler vector $f_0^{(l)}$, but not the Doppler vector $f_1^{(l)}$, such that the associated combining coefficient $\gamma_{1,0,2,1}^{(l)}=0$, for the first beam index u=0 of the first polarization and fourth delay index d=3 the Doppler vector $f_1^{(l)}$, but not the Doppler vector $f_0^{(l)}$, such that the associated combining coefficient $\gamma_{1,0,3,0}^{(l)}=0$, for the second beam index u=1 of the first polarization and first delay index d=0 no Doppler vectors, such that the associated combining coefficients $\gamma_{1,1,0,0}^{(l)}=0$ and $\gamma_{1,1,0,1}^{(l)}=0$, for the second beam index u=1 of the first polarization and second delay index d=1 the Doppler vectors $f_0^{(l)}$ and $f_1^{(l)}$, for the second beam index u=1 of the first polarization and third delay index d=2 the Doppler vector $f_0^{(l)}$, but not the Doppler vector $f_1^{(l)}$, such that the associated combining coefficient $\gamma_{1,1,2,1}^{(l)}=0$, for the second beam index u=1 of the first polarization and fourth delay index d=3 no Doppler vectors such that the associated combining coefficients $\gamma_{1,1,3,0}^{(l)}=0$, and $\gamma_{1,1,3,1}^{(l)}=0$, for the first beam index u=0 of the second polarization and delay indices d=0, 1, 2 no Doppler vectors, such that the associated combining coefficients $\gamma_{2,0,0,0}^{(l)}=\gamma_{2,0,0,1}^{(l)}=\gamma_{2,0,1,0}^{(l)}=\gamma_{2,0,1,1}^{(l)}=\gamma_{2,0,2,0}^{(l)}=\gamma_{2,0,2,1}^{(l)}=0$ for the first beam index u=0 of the second polarization and delay index d=3 the Doppler vectors $f_0^{(l)}$ and $f_1^{(l)}$, and for the second beam index u=1 of the second polarization no Doppler vectors such that all associated combining coefficients are zero.

Figures 11A, 11B:
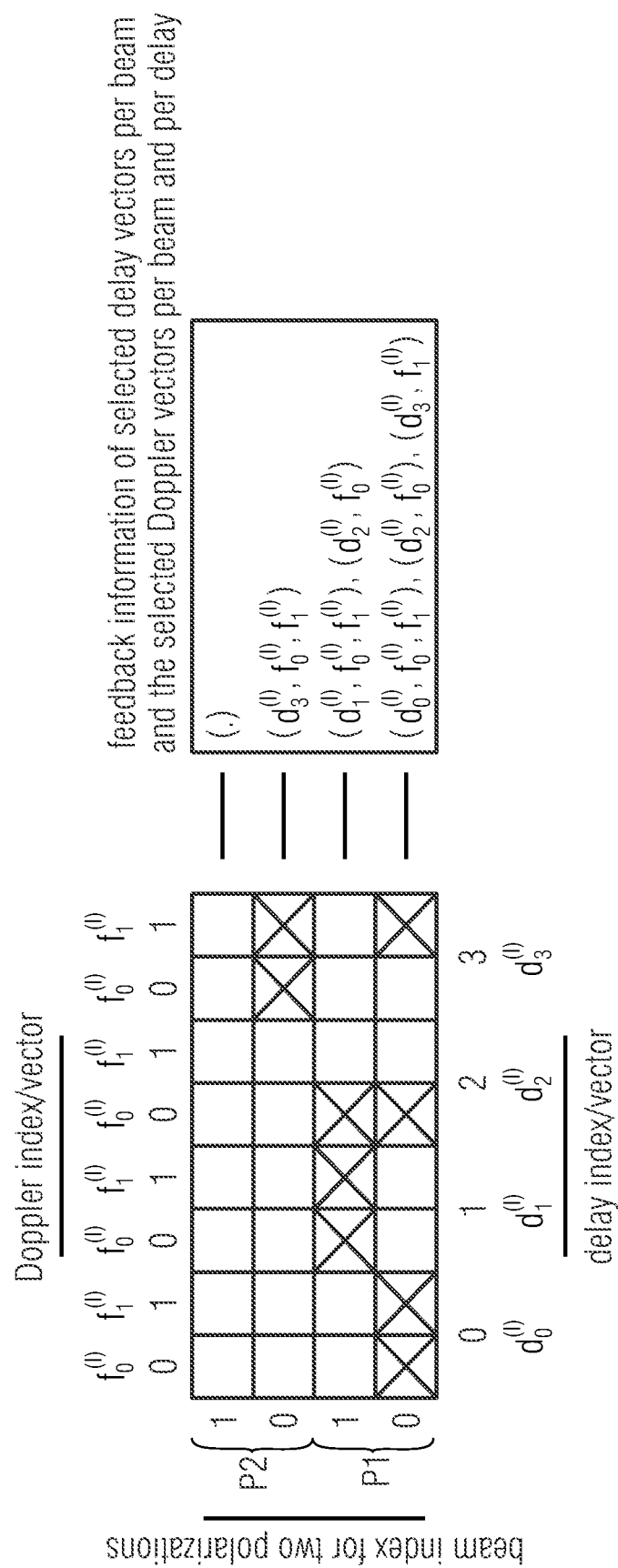
FIGS. 11A and 11B illustrates an example of the selection of delay vectors per beam and Doppler vectors per delay and per beam (see FIG. 11A) and of the corresponding feedback information (see FIG. 11B)

The information of the selected delay vectors per beam and/or the selected Doppler vectors per beam, per delay and polarization is reported to the gNB as a part of the CSI report. FIGS. 11A and 11B illustrates an example of the selection of delay vectors per beam and Doppler vectors per delay and per beam and polarization (see FIG. 11A) and of the corresponding feedback information (see FIG. 11B) for the configuration $U^{(l)}=2$ per polarization, D=4 delay vectors (common to all beam indices) per beam and F=2 Doppler vectors (common to all beam and delay indices) per beam and per delay.

FIG. 11A illustrates a matrix having 4 rows and 8 columns. The two bottom rows are associated with the two beams u=0, 1 of the first polarization $p_1$, and the two top rows are associated with the two beams u=0, 1 of the second polarization $p_2$.

In FIG. 11A the D=4 delay vectors $d_0^{(l)}, d_1^{(l)}, d_2^{(l)}$ and $d_3^{(l)}$ are shown which are common to all beam/polarization indices, i.e., each delay vector is the same or is identical for each beam u and each polarization p. The first delay vector $d_0^{(l)}$ is associated with the $1^{st}$ and $2^{nd}$ columns so as to indicate that it is the same or identical for the two beams u=0, 1 and for the two polarizations $p_1, p_2$. Likewise, the second delay vector $d_1^{(l)}$ is associated with the $3^{rd}$ and $4^{th}$ columns so as to indicate that it is the same or identical for the two beams u=0, 1 and for the two polarizations $p_1, p_2$. The third delay vector $d_2^{(l)}$ is associated with the $5^{th}$ and $6^{th}$ columns so as to indicate that it is the same or identical for the two beams u=0, 1 and for the two polarizations $p_1, p_2$. The fourth delay vector $d_3^{(l)}$ is associated with the $7^{th}$ and $8^{th}$ columns so as to indicate that it is the same or identical for the two beams u=0, 1 and for the two polarizations $p_1, p_2$.

In FIG. 11A the F=2 Doppler vectors $f_0^{(l)}$ and $f_1^{(l)}$ are shown which are common to all beam and delay indices, i.e., each Doppler vector is the same or is identical for each beam u and each polarization p as well as for each delay vector $d_0^{(l)}, d_1^{(l)}, d_2^{(l)}$ and $d_3^{(l)}$. The first Doppler vector $f_0^{(l)}$ is associated with the $1^{st}, 3^{rd}, 5^{th}$ and $7^{th}$ columns which are also associated with the delay vectors $d_0^{(l)}, d_1^{(l)}, d_2^{(l)}$ and $d_3^{(l)}$, respectively, thereby indicating that it is the same or identical for the selected delay vectors, the two beams u=0, 1 and for the two polarizations $p_1, p_2$. The second Doppler vector $f_1^{(l)}$ is associated with the $2^{nd}, 4^{th}, 6^{th}$ and $8^{th}$ columns which are also associated with the delay vectors $d_0^{(l)}, d_1^{(l)}, d_2^{(l)}$ and $d_3^{(l)}$, respectively, thereby indicating that it is the same or identical for the selected delay vectors, the two beams u=0, 1 and for the two polarizations $p_1, p_2$.

FIGS. 11A and 11B illustrates an embodiment in accordance with which $D'_{p,u} \leq D$ delay DFT vectors and $F'_{p,u} \leq F$ Doppler DFT vectors out of the selected set of D delay DFT vectors and out of the selected set of F Doppler DFT vectors, respectively, are reported, as is described above. In FIG. 11A the combinations reported are indicated by "x", and FIG. 11B illustrated the resulting feedback.

Indication of Selected Delay/Doppler DFT Vectors and Non-Zero Combining Coefficients Via Bitmap In accordance with embodiments, the information of the selected delay DFT vectors per beam and/or selected Doppler DFT vectors per beam and per delay is represented by a bitmap, where each bit in the bitmap is associated with a spatial beam vector, a delay DFT vector, and/or a Doppler DFT vector and a combining coefficient. A "1" in the bitmap may indicate that the associated spatial beam, delay and/or Doppler DFT vectors are selected and the associated combining coefficient is non-zero, and a "0" in the bitmap may indicate that the associated spatial beam, delay and/or Doppler DFT vectors are not selected and the associated combining coefficient is zero.

Figures 12A, 12B:
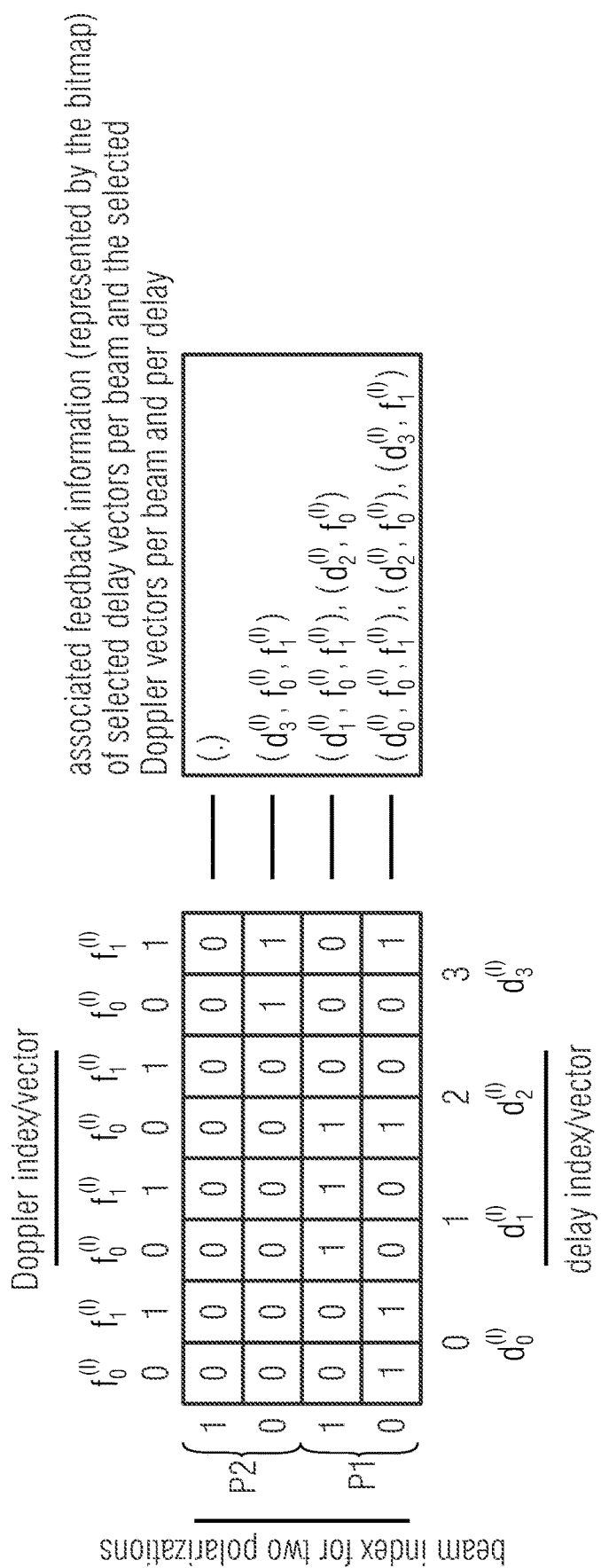
FIGS. 12A and 12B illustrates an example of a bitmap for the selection of delay vectors per beam and Doppler vectors per delay and per beam (see FIG. 12A) and corresponding feedback information (see FIG. 12B)
Figure 14:
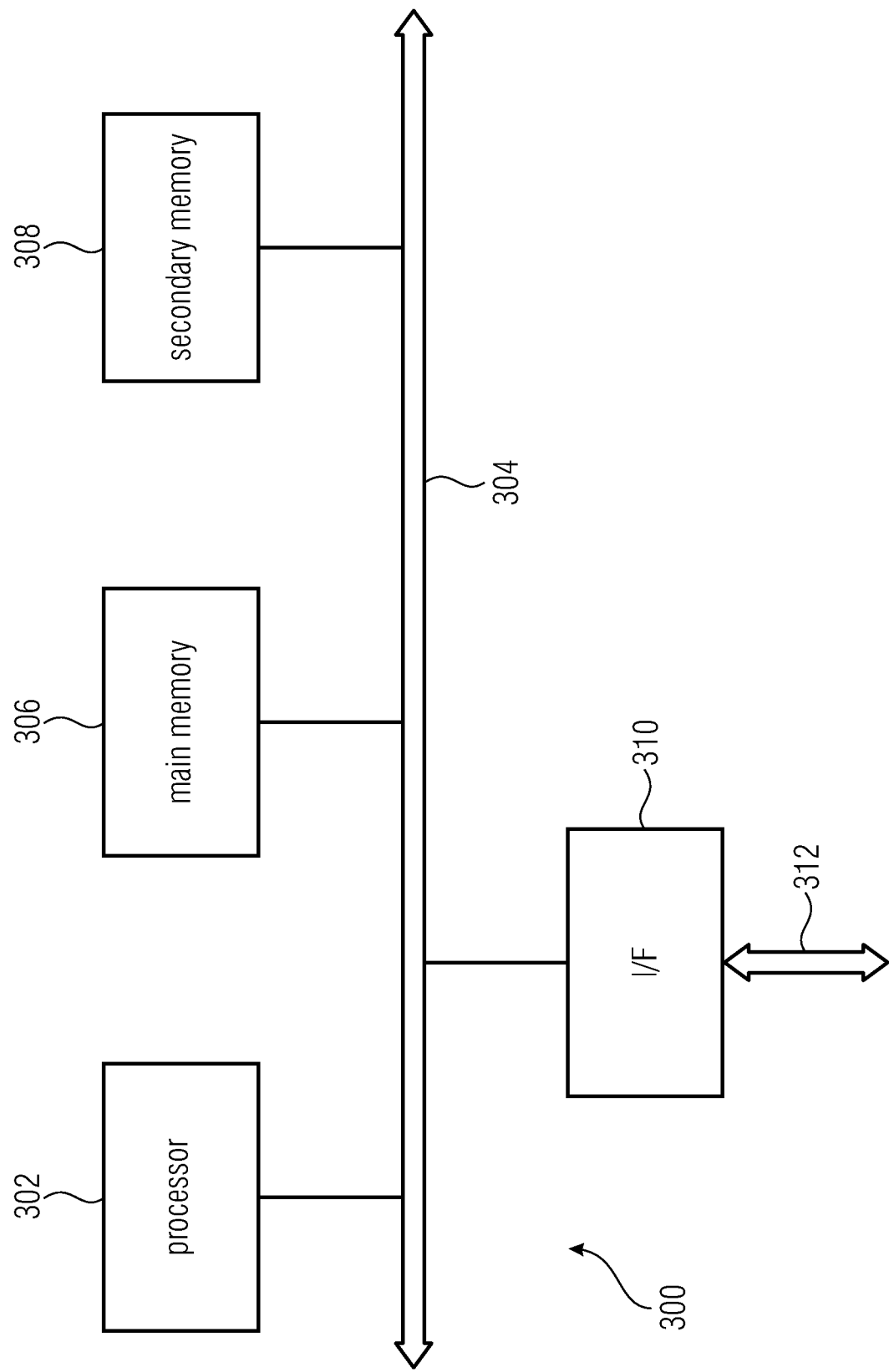
FIG. 14 illustrates an example of a computer system on which units or modules as well as the steps of the methods described in accordance with the inventive approach may execute.

FIGS. 12A and 12B illustrates an example of a bitmap for the selection of delay vectors per beam and Doppler vectors per delay and per beam and corresponding feedback information for the configuration $U^{(l)}=2$ per polarization, D=4 delay vectors (common to all beam indices) per beam and F=2 Doppler vectors (common to all beam and delay indices) per beam and per delay. FIGS. 12A and 12B illustrates in the same as FIGS. 11A and 11B the delay and Doppler vectors. Other than in FIGS. 11A and 11B, in FIGS. 12A and 12B only the bitmap of FIG. 12A is the feedback, i.e., the bitmap is transmitted to the gNB. The gNB, using on the bitmap and the knowledge about the delay and Doppler vectors derives the feedback (see FIG. 12B) without the need to receive the respective vectors. In accordance with embodiments, the UE reports the bitmap as a part of the CSI report to the gNB via higher layer (e.g., MAC or RRC) or physical layer (L1).

In accordance with embodiments, in order to reduce the size of the bitmap with respect to the delay dimension and hence to reduce the feedback overhead for CSI reporting, the UE selects $D' \leq D$ delay DFT vectors, where the value of D' is chosen by the UE. The $D' \leq D$ delay DFT vectors are common to all beam indices. The UE uses the selected D' DFT delay vectors to calculate the precoder matrix W. The UE reports the parameter D' to the gNB by higher layer (e.g., MAC or RRC parameter) or physical layer (L1 parameter).

In accordance with embodiments, in order to reduce the size of the bitmap with respect to the Doppler dimension and hence to reduce the feedback overhead for CSI reporting, the UE selects $F' \leq F$ Doppler DFT vectors, where the value of F' is chosen by the UE. The $F' \leq F$ Doppler DFT vectors are common to all beam and delay indices. The UE uses the selected F' Doppler DFT vectors to calculate the precoder matrix W. The UE reports the parameter F' to the gNB by higher layer (e.g., MAC or RRC parameter) or physical layer (L1 parameter).

In accordance with embodiments, in order to reduce the feedback overhead and UE calculation complexity, the selected delay DFT vectors per beam and polarization from the common subset of D delay DFT vectors and/or the selected Doppler DFT vectors per beam and per delay and polarization from the common subset of F Doppler DFT vectors may be identical for both polarizations. In this way, the bitmap of size $2U^{(l)}D \times F$ can be decomposed into two identical sub-bitmaps, each of size $U^{(l)}D \times F$.

In accordance with embodiments, in order to control the feedback overhead for reporting the bitmap and the UE calculation complexity,
- the selected delay DFT vectors may be identical with respect to both polarizations, or partially identical for a subset of beams, or fully identical with respect to all beams per polarization, or fully identical with respect to all beams and both polarizations, and/or
- the selected Doppler DFT vectors may be partially identical for a subset of delays and a subset of beams, or fully identical with respect to all delays per beam and polarization, or fully identical with respect to all delays per beam and both polarizations, or fully identical with respect to all delays and all beams per polarization, or fully identical with respect to all delays and all beams and both polarizations, or fully identical with respect to all beams per delay and per polarization, or fully identical with respect to all beams per delay and both polarizations.

Table 1 presents the size of the bitmap for some of the combinations of the Doppler and delay DFT vectors discussed above.

TABLE 1

Size of bitmap for different configurations of Doppler
and delay vectors of the precoder matrix (pol. = polarization)

| | Doppler vectors of precoder matrix | Delay vectors of precoder matrix | Size of bitmap in bits |
|---|---|---|---|
| | — | — | 2UDF |
| | both pol. | both pol. | UDF |
| | all delays per beam and per pol. | — | 2UD + 2UF |
| | all delays per beam and per pol. | both pol. | UD + 2UF |
| | all delays per beam and per pol. | all beams per pol. | 2D + 2UF |
| | all delays per beam and per pol. | all beams and both pol. | D + 2UF |
| identical with respect to | all delays per beam and both pol. | — | 2UD + UF |
| | all delays per beam and both pol. | both pol. | UD + UF |
| | all delays per beam and both pol. | all beams per pol. | 2D + UF |
| | all delays per beam and both pol. | all beams and both pol. | D + UF |
| | all delays and beams per pol. | — | 2UD + 2F |
| | all delays and beams per pol. | both pol. | UD + 2F |
| | all delays and beams per pol. | all beams per pol. | 2D + 2F |
| | all delays and beams per pol. | all beams and both pol. | D + 2F |
| | all delays, beams and pol. | — | 2UD + F |
| | all delays, beams and pol. | both pol. | UD + F |
| | all delays, beams and pol. | all beams per pol. | 2D + F |
| | all delays, beams and pol. | all beams and both pol. | D + F |
| | all beams per delay and per pol. | — | 2UD + 2DF |
| | all beams per delay and per pol. | both pol. | 2D + 2DF |
| | all beams per delay and per pol. | all beams per pol. | 2D + 2DF |
| | all beams per delay and per pol. | all beams and both pol. | D + 2DF |
| | all beams per delay and both pol. | — | 2UD + DF |
| | all beams per delay and both pol. | both pol. | 2D + DF |
| | all beams per delay and both pol. | all beams per pol. | 2D + DF |
| | all beams per delay and both pol. | all beams and both pol. | D + DF |

FIGS. 13A and 13B illustrates an example of two identical sub-bitmaps for each polarization for the configuration $U^{(l)}=2$ per polarization, D=4 delay vectors (common to all beam indices) per beam/polarization and F=2 Doppler vectors (common to all beam and delay indices) per beam, per delay and per polarization. Other than in FIGS. 12A and 121B, in FIGS. 13A and 13B only the two bottom or two top rows of the bitmap of FIG. 13A is the feedback, i.e., the reduced bitmap is transmitted to the gNB. The gNB, uses the bitmap to get information about the delay and Doppler vectors (see FIG. 13B) without the need to receive the respective vectors. The UE may be configured to report only one of the two identical sub-bitmaps of size $U^{(l)}D \times F$ as a part of the CSI report to the gNB.

In accordance with embodiments, in order to save feedback overhead for reporting the combining coefficients, the UE reports only the non-zero combining coefficients $\Delta_{p,u,d,v}^{(l)}$ indicated by the "1" 's in the bitmap to the gNB.

In accordance with embodiments, the UE selects not more than $K_0$ non-zero combining coefficients $\gamma_{p,u,d,v}^{(l)}$ to calculate the precoder matrix W. The parameter $K_0$ may be configured via higher layer (RRC parameter) or physical layer (L1 parameter) by the gNB or another network entity.

In accordance with embodiments, the parameter $K_0$ depends on the number of configured delay DFT vectors D, the number of configured Doppler DFT vectors F, and the number of configured DFT beams $U^{(l)}$, such that $K_0$=func(D, F, $U^{(l)}$). For example, the parameter $K_0$ may be given by $K_0=\beta 2DFU^{(l)}$ or $K_0=\beta DFU^{(l)}$, where the parameter $\beta \leq 1$ controls the feedback overhead. The parameter p may be configured via higher layer (RRC parameter) or physical layer (L1 parameter) by the gNB or another network entity. Examples for $\beta$ are $\beta \in \{1/8, 1/4, 1/2, 3/4\}$.

In accordance with embodiments, the UE selects not more than $K_0$ non-zero combining coefficients $\gamma_{p,u,d,v}^{(l)}$ per layer or for a subset of layers, e.g., layer 1 and layer 2, to calculate the precoder matrix W.

In accordance with embodiments, the UE selects not more than $K_0$ non-zero combining coefficients $\gamma_{p,u,d,v}^{(l)}$ for all layers to calculate the precoder matrix W.

In accordance with embodiments, the UE reports the selected $K_1$ non-zero combining coefficients $\gamma_{p,u,d,v}^{(l)}$, where $K_1 \leq K_0$, and indicates the selected non-zero combining coefficients in the bitmap by setting the associated bits to "1".

In accordance with embodiments, the CSI report may consists of two parts, where the first part has a fixed payload size and contains at least the number $K_1$ of selected non-zero combining coefficients, and the second part contains information about the bitmap for indicating the selected delay vectors and/or selected Doppler vectors and non-zero combining coefficients, an indication of the common D delay vectors and/or F Doppler vectors, an indication of $U^{(l)}$ or $2U^{(l)}$ selected beam indices, and the $K_1$ non-zero combining coefficients.

Indication of Selected Delay/Doppler DFT Vectors and Non-Zero Combining Coefficients Via Combinatorial Indexing In accordance with embodiments, the information of the selected delay DFT vectors per beam/polarization and/or selected Doppler DFT vectors per beam, per delay and polarization is represented by a bit sequence of size $$\left\lceil \log_2 \binom{2UDF}{K_1} \right\rceil.$$

The bit sequence represents a combinatorial index $$\binom{2UDF}{K_1},$$

and indicates the indices of the selected $K_1$ non-zero combining coefficients out of 2UDF combining coefficients.

In accordance with embodiments, in order to reduce the feedback overhead and UE calculation complexity, the selected delay DFT vectors per beam and polarization from the common subset of D delay DFT vectors and/or the selected Doppler DFT vectors per beam and per delay and polarization from the common subset of F Doppler DFT vectors may be identical for both polarizations. In this way, the size of the bit sequence reduces to $$\left\lceil \log_2\binom{UDF}{K_1} \right\rceil.$$

The bit sequence represents then the combinatorial index $$\binom{UDF}{K_1},$$

and indicates the indices of the selected $K_1$ non-zero combining coefficients out of the UDF combining coefficients.

In accordance with embodiments, in order to control the feedback overhead for reporting the bit sequence and the UE calculation complexity,

- the selected delay DFT vectors may be identical with respect to both polarizations, or partially identical for a subset of beams, or fully identical with respect to all beams per polarization, or fully identical with respect to all beams and both polarizations, and/or
- the selected Doppler DFT vectors may be partially identical for a subset of delays and a subset of beams, or fully identical with respect to all delays per beam and polarization, or fully identical with respect to all delays per beam and both polarizations, or fully identical with respect to all delays and all beams per polarization, or fully identical with respect to all delays and all beams and both polarizations, or fully identical with respect to all beams per delay and per polarization, or fully identical with respect to all beams per delay and both polarizations.

In accordance with embodiments, the UE reports the CSI report using the physical uplink shared channel (PUSCH) or physical uplink control channel (PUCCH) to the gNB.

In accordance with embodiments, the UE normalizes all combining coefficients with respect to the strongest combining coefficient (the one having the largest amplitude or power) such that the strongest combining coefficient after the normalization is given by the value 1.

In accordance with embodiments, to reduce the feedback overhead of the CSI report the strongest (normalized) combining coefficient is not reported. The UE may report a strongest coefficient indicator using $\lceil \log_2 K_1 \rceil$ bits indicating the strongest coefficient out of the $K_1$ reported combining coefficients.

Extension to Higher Layer Transmission

In accordance with embodiments, in order to reduce the UE calculation complexity and the feedback overhead of the CSI report, the selected D delay DFT vectors, common to all beam/polarization indices, may be identical for a subset of layers or all layers, e.g., the first layer and the second layer (layer-common delay basis vector selection). The UE may be configured to indicate the selected D delay DFT vectors common for the two layers in the CSI report.

In accordance with embodiments, in order to reduce the UE calculation complexity and the feedback overhead of the CSI report, the selected F Doppler DFT vectors, common to all beam/delay/polarization indices, may be identical for a subset of layers or all layers, e.g., the first layer and the second layer (layer-common Doppler basis vector selection). The UE may be configured to indicate the selected F Doppler DFT vectors common for the two layers in the CSI report.

In accordance with embodiments, the selected D delay DFT vectors, common to all beam/polarization indices, and the selected F Doppler DFT vectors, common to all beam/delay/polarization indices may be identical for a subset of layers, e.g., the first layer and the second layer, and in addition, the bitmap for the two layers may be identical. In this way, the indices for the selected combining coefficients are identical for two layers (i.e., layer-common coefficient subset selection and layer-common delay and Doppler vector basis selection). The UE may be configured to indicate the selected F Doppler DFT vectors and D delay DFT vectors common and the bitmap identical for the two layers in the CSI report.

In accordance with embodiments, the selected D delay DFT vectors, common to all beam/polarization indices, and the selected F Doppler DFT vectors, common to all beam/delay/polarization indices may be identical for a subset of layers, e.g., the first layer and the second layer, but the bitmap of the two layers may be different. In this way, the indices for the selected combining coefficients may not be identical for the two layers (i.e., layer-independent coefficient subset selection and layer-common delay and Doppler vector basis selection). The UE may be configured to indicate the selected F Doppler DFT vectors and D delay DFT vectors common for the two layers in the CSI report.

In accordance with embodiments, the selected D delay DFT vectors, common to all beam/polarization indices, and/or the selected F Doppler DFT vectors, common to all delay/beam/polarization indices may be different for a subset of layers, e.g., the first layer and the second layer, and the bitmap of the two layers may be different (i.e., layer-independent coefficient subset selection and layer-independent delay and Doppler vector basis selection).

In accordance with embodiments, the UE selects $U^{(l,l')}$ DFT beams for the l-th and the l' layer, where $U^{(l,l')}=U^{(l)}+U^{(l')}$, and the values of $U^{(l)}$ and $U^{(l')}$ are freely selected by the UE. The selected values $U^{(l)}$ and $U^{(l')}$ may be reported via higher layer (RRC parameter) or physical layer (L1 parameter) to the gNB.

In accordance with embodiments, the UE selects $U^{(l)}$ DFT beams for the l-th layer and $U^{(l')}$ DFT beams for the l'-th layer, where l'≥l. In order to reduce the feedback overhead of the CSI report for the higher layers, the number of DFT beams over the layers is decreasing $U^{(l')} \leq U^{(l)}$.

In accordance with embodiments, the UE selects $D^{(l)}$ delay DFT vectors common to all beam indices of the l-th layer and the UE selects $D^{(l')}$ delay DFT vectors for the l'-th layer, where l'≥l. In order to reduce the feedback overhead of the CSI report for the higher layers, the number of delay DFT vectors over the layers is decreasing $D^{(l')} \leq D^{(l)}$.

In accordance with embodiments, the UE selects $F^{(l)}$ Doppler DFT vectors common to all beam indices of the l-th layer and the UE selects $F^{(l')}$ Doppler DFT vectors for the l'-th layer, where l'≥l. In order to reduce the feedback overhead of the CSI report for the higher layers, the number of Doppler DFT vectors over the layers is decreasing $F^{(l')} \leq F^{(l)}$.

Oversampling Factors for the Codebooks:

In accordance with embodiments, the UE receives from the gNB or another network entity a higher layer (RRC or MAC-CE) or physical layer (L1) parameter oversampling factor $O_2$ for the configuration of the delay codebook.

In accordance with embodiments, the UE receives from the gNB or another network entity a 30 higher layer (RRC or MAC-CE) or physical layer (L1) parameter oversampling factor $O_3$ for the configuration of the Doppler codebook.

In accordance with embodiments, the UE uses an a priori known value for the oversampling factor $O_2$ for the configuration of the delay codebook.

In accordance with embodiments, the UE uses an a priori known value for the oversampling factor $O_3$ for the configuration of the Doppler codebook.

In accordance with embodiments, the UE selects the oversampling factor $O_2$ for the configuration of the delay codebook, and to report the selected oversampling factor $O_2$ via higher layer (RRC parameter or MAC-CE) or physical layer (L1 parameter) to the gNB.

In accordance with embodiments, the UE selects the oversampling factor $O_3$ for the configuration of the Doppler codebook, and to report the selected oversampling factor $O_3$ via higher layer (RRC parameter or MAC-CE) or physical layer (L1 parameter) to the gNB.

Configuration of Codebook Parameter (S, T)

In accordance with embodiments, the UE receives from the gNB or another network entity the higher layer (such as Radio Resource Control (RRC) layer or medium access control-control element (MAC-CE)) or physical layer (Layer 1 or L1) codebook parameter S used for the configuration of the delay codebook.

In accordance with embodiments, the UE receives from the gNB or another network entity the higher layer (such as Radio Resource Control (RRC) layer or medium access control-control element (MAC-CE)) or physical layer (Layer 1 or L1) codebook parameter T used for the configuration of the Doppler codebook.

In accordance with embodiments, the parameter S may depend on the configured number of subbands $N_{SB}$ for CQI reporting, such that the parameter is given by the function $S=f(N_{SB})$. For example, the parameter S may be given by $S=RN_{SB}$, where the parameter R controls the UE calculation complexity. The parameter R may be configured via higher layer (RRC parameter) or physical layer (L1 parameter) by the gNB or another network entity. Examples for R are $R \in \{1, 2\}$.

In accordance with embodiments, to increase the delay resolution of the radio channel taps, the UE is configured to report to the gNB the higher layer (such as Radio Resource Control (RRC) layer or medium access control-control element (MAC-CE)) or physical layer (Layer 1 or L1) codebook parameter S that may be used to achieve a specific resolution of the channel delay components.

In accordance with embodiments, to increase the Doppler-frequency resolution of the radio channel, the UE is configured to report to the gNB the higher layer (such as Radio Resource Control (RRC) layer or medium access control-control element (MAC-CE)) or physical layer (Layer 1 or L1) codebook parameter T that may be used to achieve a specific resolution of the channel Doppler components.

Quantization of Combining Coefficients

In accordance with embodiments, the UE quantizes the non-zero combining coefficients using a codebook approach, where each coefficient is represented by $$\gamma_{p,u,d,v}^{(l)} = \hat{\gamma}_{p,u,d,v}^{(l)} \phi_{p,u,d,v}^{(l)},$$

where $\hat{\gamma}_{p,u,d,v}^{(l)}$ is a polarization-, beam-, delay- and Doppler-frequency-dependent amplitude coefficient which is quantized with N bits; and $\phi_{p,u,d,v}^{(l)}$ represents a phase which is represented by a BPSK, or QPSK, or 8PSK, or any other higher-order PSK constellation.

Furthermore, in order to reduce the feedback overhead for reporting the quantized combining coefficients, the UE groups the coefficients into Q sub-groups and quantize the amplitude and phase of each coefficient of the q-th subgroup with $A^{(q)}$ and $p^{(q)}$ bits, respectively. In one example, Q=2, and the number of bits used for amplitude and phase quantization is different in each sub-group, $A^{(1)} \neq A^{(2)}$, $P^{(1)} \neq P^{(2)}$. In another example, Q=2, and the number of bits used for amplitude quantization is identical in each sub-group and the number of bits used for phase quantization is different in each sub-group, $A^{(1)} = A^{(2)}$, $P^{(1)} \neq P^{(2)}$. In another example, Q=2, and the number of bits used for amplitude quantization is different in each sub-group and the number of bits used for phase quantization is identical in each sub-group $A^{(1)} \neq A^{(2)}$, $P^{(1)} = P^{(2)}$. In another example, Q=2, and the number of bits used for amplitude and phase quantization is identical in each sub-group, $A^{(1)} = A^{(2)}$, $P^{(1)} = P^{(2)}$. Examples for $A^{(q)}$ and $P^{(q)}$ are given by $A^{(q)} \in \{2, 3, 4\}$ and $p^{(q)} \in \{2, 3, 4\}$.

In accordance with embodiments, the communication device receives the following values from the transmitter using Radio Resource Control (RRC) layer or physical layer (L1) parameters:

value of S for the configuration of the delay component codebook ($\Omega_2$), and/or value of T for the configuration of the Doppler-frequency component codebook ($\Omega_3$), and parameters $N_1$, $N_2$.

In accordance with embodiments, in case the CSI feedback uses the PMI, the processor reports at least a two-component PMI, where the first PMI corresponds to the selected vectors $b_u^{(l)}$, $d_{p,u,d}^{(l)}$ and $f_{p,u,d,v}^{(l)}$, and where the second PMI corresponds to a subset or all Doppler-delay-beam combining coefficients $\gamma_{p,u,d,v}^{(l)}$ from the communication device to the transmitter.

Reduced Signaling by UE

In accordance with embodiments, when the UE selects D'=1 delay DFT vectors, the UE may not report to the gNB an information/indication of the selected delay DFT vector, common to all beam indices.

In accordance with embodiments, when the UE selects F'=1 Doppler DFT vectors, the UE may not report to the gNB an information/indication of the selected F' Doppler DFT vector, common to all beam and delay indices.

In accordance with embodiments, when the number of non-zero coefficients $K_1=2$, only two bits of the bitmap or the bit sequence contain "1"s and the remaining bits are "0"s. In such a case, to improve link/signal quality and hence the robustness of the transmission, the UE may be configured to select only a single beam vector out of the $U^{(l)}$ configured beam vectors and to determine for the selected single beam for both polarizations the two combining coefficients of the precoder matrix. Moreover, the UE may indicate a transmission rank of one (RI=1) in the CSI report.

In accordance with embodiments, when the number of non-zero coefficients $K_1=2$, the UE is configured not to report the bitmap or bit sequence for indicating the selected non-zero coefficients, delay DFT vectors and/or Doppler DFT vectors.

In accordance with embodiments, when the number of non-zero coefficients $K_1=2$, the UE is configured not to report an information/indication of the selected D or D' delay DFT vectors, common to all beam indices and/or not to report an information/indication of the selected F or F' Doppler DFT vectors, common to all beam and delay indices.

In accordance with embodiments, when the number of non-zero coefficients $K_1=2$, the UE reports a beam indicator indicating the selected beam out of the $U^{(l)}$ configured beam vectors.

In accordance with embodiments, when all non-zero coefficients associated with the DFT beam vectors for one polarization are zero, the corresponding bitmap or bit sequence associated with those beams is not reported.

General Precoder

The embodiments of the present invention have been described above with reference to a Doppler-delay-beam three-stage precoder. However, the present invention is not limited to such embodiments and may also be implemented in combination with other precoders.

In accordance with such embodiments, the UE or communication device, which provides a channel state information, CSI, feedback in the wireless communication system, includes, in a similar way as described above, a transceiver configured to receive, from a transmitter a radio signal via a time-variant, frequency-selective MIMO channel, the radio signal including downlink reference signals according to a reference signal configuration comprising a number of antenna ports, and downlink signals comprising the reference signal configuration.

Further, the communication device or UE may include a processor which
- estimates an explicit CSI in the frequency domain using measurements on the downlink reference signals on the radio channel, the downlink reference signals provided over a certain observation time,
- selects a delay precoder matrix (W) for a composite precoder, the composite precoder being based on one or more codebooks, the one or more codebooks including
  - one or more transmit-side spatial beam components of the composite precoder, and
  - one or more delay components of the composite precoder,
- calculates either one or more of a channel quality indicator, CQI, and/or a precoder matrix indicator, PMI, and/or a rank indicator, RI, using the explicit CSI and the composite precoder with the selected delay precoder matrix (W), and
- reports to the transmitter the CSI feedback including either one or more of the CQI, and/or the PMI and/or the RI, wherein the PMI and RI are used to indicate the composite precoder matrix for the configured antenna ports.

The communication device includes one or more parameters D, the parameter indicating a number of delay components, like delay DFT vectors ($D_u^{(l)}$), to be used by the UE when calculating the delay precoder matrix (W). The UE selects from the one or more codebooks a subset of D delay components and uses the selected subset of delay components for each polarization (p) and each spatial beam (u) when calculating the delay precoder matrix (W).

For example, the precoder may be a space-delay precoder.

It is noted that the approaches described above with reference to the Doppler-delay-beam three-stage precoder equally apply for this embodiment, e.g., the approaches described above for selecting and signaling the selected delay components and the spatial beams may be also employed for any other precoder just mentioned, like the space-delay precoder Also, the approaches described above for configuring the UE may be also employed for any other precoder just mentioned, like the space-delay precoder.

General

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, the UE may comprise one or more of a mobile or stationary terminal, an IoT device, a ground based vehicle, an aerial vehicle, a drone, a building, or any other item or device provided with network connectivity enabling the item/device to communicate using the wireless communication system, like a sensor or actuator.

In accordance with embodiments, the base station may comprise one or more of a macro cell base station, or a small cell base station, or a spaceborne vehicle, like a satellite or a space, or an airborne vehicle, like a unmanned aircraft system (UAS), e.g., a tethered UAS, a lighter than air UAS (LTA), a heavier than air UAS (HTA) and a high altitude UAS platforms (HAPs), or any transmission/reception point (TRP) enabling an item or a device provided with network connectivity to communicate using the wireless communication system.

The embodiments of the present invention have been described above with reference to a communication system employing a rank 1 or layer 1 communication. However, the present invention is not limited to such embodiments and may also be implemented in a communication system employing a higher rank or layer communication. In such embodiments, the feedback includes the delays per layer and the complex precoder coefficients per layer.

The embodiments of the present invention have been described above with reference to a communication system in which the transmitter is a base station serving a user equipment, and the communication device or receiver is the user equipment served by the base station. However, the present invention is not limited to such embodiments and may also be implemented in a communication system in which the transmitter is a user equipment station, and the communication device or receiver is the base station serving the user equipment. In accordance with other embodiments, the communication device and the transmitter may both be UEs communicating via directly, e.g., via a sidelink interface.

The inventive approach as described above may be employed also in the following embodiments:

A 1$^{st}$ embodiment provides a communication device for providing a channel state information, CSI, feedback in a wireless communication system, the communication device comprising:

a transceiver configured to receive, from a transmitter a radio signal via a time-variant, frequency-selective MIMO channel, the radio signal including downlink reference signals according to a reference signal configuration comprising a number of antenna ports, and downlink signals comprising the reference signal configuration; and a processor configured to
- estimate an explicit CSI in the frequency domain using measurements on the downlink reference signals on the radio channel, the downlink reference signals provided over a certain observation time,
- select, based on a performance metric, a Doppler-delay precoder matrix (W) for a composite Doppler-delay-beam three-stage precoder, the Doppler-delay-beam three-stage precoder being based on one or more codebooks, the one or more codebooks including
  - one or more transmit-side spatial beam components of the composite Doppler-delay-beam three-stage precoder,
  - one or more delay components of the composite Doppler-delay-beam three-stage precoder, and one or more Doppler-frequency components of the composite Doppler-delay-beam three-stage precoder, calculate either one or more of a channel quality indicator, CQI, and/or a precoder matrix indicator, PMI, and/or a rank indicator, RI, using the explicit CSI and the composite Doppler-delay-beam three-stage precoder with the selected Doppler-delay-beam precoder matrix (W), and report to the transmitter the CSI feedback including either one or more of the CQI, and/or the PMI and/or the RI, wherein the PMI and RI are used to indicate the Doppler-delay-beam three-stage composite precoder matrix for the configured antenna ports.

A $2^{nd}$ embodiment provides the communication device of the $1^{st}$ embodiment, wherein the Doppler-delay-beam three-stage precoder is based on three separate codebooks, and wherein the three separate codebooks include a first codebook ($\Omega_1$) for the one or more transmit-side spatial beam components of the composite Doppler-delay-beam three-stage precoder, a second codebook ($\Omega_2$) for the one or more delay components of the composite Doppler-delay-beam three-stage precoder, and a third codebook ($\Omega_3$) for the one or more Doppler-frequency components of the composite Doppler-delay-beam three-stage precoder.

A $3^{rd}$ embodiment provides the communication device of the $1^{st}$ embodiment or the $2^{nd}$ embodiment, wherein the Doppler-delay precoder (W) is represented by $$W^{(l)} = P^{(l)} \begin{bmatrix} \sum_{u=0}^{U^{(l)}-1} \sum_{d=0}^{D_u^{(l)}-1} \sum_{v=0}^{F_{d,u}^{(l)}-1} \gamma_{1,u,d,v}^{(l)} f_{1,u,d,v}^{(l)} \otimes d_{1,u,d}^{(l)T} \otimes b_u^{(l)} \\ \sum_{u=0}^{U^{(l)}-1} \sum_{d=0}^{D_u^{(l)}-1} \sum_{v=0}^{F_{d,u}^{(l)}-1} \gamma_{2,u,d,v}^{(l)} f_{2,u,d,v}^{(l)} \otimes d_{2,u,d}^{(l)T} \otimes b_u^{(l)} \end{bmatrix}$$

where $U^{(l)}$ is the number of beams per polarization for the l-th layer, $D_u^{(l)}$ is the number of delays for the l-th layer and u-th beam, $F_{d,u}^{(l)}$ is the number of Doppler-frequency components for the l-th layer, u-th beam and d-th delay, $f_{p,u,d,v}^{(l)}$ is the v-th Doppler-frequency vector of size T×1 associated with the l-th layer, d-th delay, u-th spatial beam, and the p-th (p=1, 2) polarization of the precoder;

$d_{p,u,d}^{(l)}$ is the d-th delay vector of size S×1 associated with the l-th layer, u-th spatial beam and the p-th polarization of the precoder;

$b_u^{(l)}$ is the u-th spatial beam associated with the l-th layer;

$\gamma_{p,u,d,v}^{(l)}$ is the Doppler-delay coefficient associated with the l-th layer, u-th spatial beam, d-th delay, v-th Doppler-frequency and the p-th polarization of the precoder, and $P^{(l)}$ is a scalar normalization factor to ensure that the average total transmission power over all precoder layers is 1.

A $4^{th}$ embodiment provides the communication device of the $1^{st}$ embodiment or the $2^{nd}$ embodiment, wherein the Doppler-delay-beam precoder is represented by a dual-stage precoder:

$$W^{(l)} = W^{(1,l)} w^{(2,l)} \in \mathbb{C}^{N_t \cdot T \cdot S \times 1},$$

where $$W^{(1,l)} = \begin{bmatrix} X_1 & 0 \\ 0 & X_2 \end{bmatrix}$$

with $$X_1 = \begin{bmatrix} f_{1,0,0,0}^{(l)} \otimes d_{1,0,0}^{(l)} \otimes b_0^{(l)} & \cdots & f_{1,u,d,v}^{(l)} \otimes d_{1,u,d}^{(l)} \otimes b_u^{(l)} & \cdots & f_{1,U^{(l)}-1,D_u^{(l)}-1,F_{d,u}^{(l)}-1}^{(l)} \otimes d_{1,U^{(l)}-1,D_u^{(l)}-1}^{(l)} \otimes b_{U^{(l)}-1}^{(l)} \end{bmatrix},$$

$$X_2 = \begin{bmatrix} f_{2,0,0,0}^{(l)} \otimes d_{2,0,0}^{(l)} \otimes b_0^{(l)} & \cdots & f_{2,u,d,v}^{(l)} \otimes d_{2,u,d}^{(l)} \otimes b_u^{(l)} & \cdots & f_{2,U^{(l)}-1,D_u^{(l)}-1,F_{d,u}^{(l)}-1}^{(l)} \otimes d_{2,U^{(l)}-1,D_u^{(l)}-1}^{(l)} \otimes b_{U^{(l)}-1}^{(l)} \end{bmatrix},$$

and $w^{(2,l)}$ contains the complex Doppler-delay-beam combining coefficients, $$w^{(2,l)} = [\gamma_{1,0,0,0}^{(l)} \quad \cdot \quad \cdot \quad \cdot \quad \gamma_{1,u,d,v}^{(l)} \quad \cdot \quad \cdot \quad \cdot \quad \gamma_{1,U^{(l)}-1,D_u^{(l)}-1,F_{d,u}^{(l)}-1}^{(l)} \gamma_{2,0,0,0}^{(l)} \cdots \gamma_{2,u,d,v}^{(l)} \cdots \gamma_{2,U^{(l)}-1,D_u^{(l)}-1,F_{d,u}^{(l)}-1}^{(l)}]^T,$$

where $f_{p,u,d,v}^{(l)}$ is the v-th Doppler-frequency vector of size T×1 associated with the l-th layer, d-th delay, u-th spatial beam, and the p-th (p=1, 2) polarization of the precoder;

$d_{p,u,d}^{(l)}$ is the d-th delay vector of size S×1 associated with the l-th layer, u-th spatial beam and the p-th polarization of the precoder;

$b_u^{(l)}$ is the u-th spatial beam associated with the l-th layer;

$\gamma_{p,u,d,v}^{(l)}$ is the Doppler-delay coefficient associated with the l-th layer, u-th spatial beam, d-th delay, v-th Doppler-frequency and the p-th polarization of the precoder, and $P^{(l)}$ is a scalar normalization factor to ensure that the average total transmission power over all precoder layers is 1.

A $5^{th}$ embodiment provides the communication device of any one of the preceding embodiments, wherein the first codebook ($\Omega_1$) comprises a first oversampled DFT-codebook matrix of size $N_1 N_2 \times O_{1,1} N_1 O_{1,2} N_2$ from which the vectors $b_u^{(l)}$ are selected, where $N_1$ and $N_2$ refer to the first and second numbers of antenna ports, respectively, and $O_{1,1}$ and $O_{1,2}$ refer to the oversampling factors with $O_{1,1} \in \{1, 2, 3, \ldots\}$ and $O_{1,2} \in \{1, 2, 3, \ldots\}$, wherein the second codebook ($\Omega_2$) comprises a second oversampled DFT-codebook matrix of size $S \times SO_2$ from which the delay vectors $d_{u,d}^{(l)}$ are selected, where S refers to the number of configured sub-bands/PRBs, or subcarriers, and $O_2$ refers to the oversampling factor $O_2$=1, 2, . . . , and wherein the third codebook ($\Omega_2$) comprises a third oversampled DFT-codebook matrix of size $T \times TO_3$ from which the Doppler-frequency vectors $f_{p,u,d,v}^{(l)}$ are selected, where T refers to the number of time instances during the observation time, and $O_3$ refers to the oversampling factor with $O_3=1,2,\ldots$.

A $6^{th}$ embodiment provides the communication device of any one of the preceding embodiments, wherein the communication device is configured to report to the transmitter the CSI feedback according to a CSI reporting configuration received from the transmitter, the CSI reporting configuration including, for example, the parameter ReportQuantity, which includes at least one the following values:
cri-RI-PMIDD-CQI,
cri-RI-PMIDy-CQI,
cri-RI-PMIDr-CQI,
cri-RI-LI-PMIDD-CQI,
cri-RI-LI-PMIDy-CQI,
cri-RI-LI-PMIDr-CQI,
cri-RI-PMIDD,
cri-RI-PMIDy,
cri-RI-PMIDr,
wherein the PMI quantities are defined as:
PMIDD—PMI values including the delay and the Doppler-frequency component configurations,
PMIDy—PMI values including only the delay component configuration, excluding the Doppler-frequency component(s), and
PMIDr—PMI values including only the Doppler-frequency component configuration, excluding the delay component(s).

A $7^{th}$ embodiment provides the communication device of any one of the preceding embodiments, wherein the communication device is configured to receive the following values from the transmitter using Radio Resource Control (RRC) layer or physical layer (L1) parameters:
values of S and T for the configuration of the delay and Doppler-frequency component codebooks ($\Omega_2$, $\Omega_3$), and
parameters $N_1$, $N_2$ and oversampling factors $O_{1,1}$ and $O_{1,2}$ for the configuration of the first codebook ($\Omega_1$).

An $8^{th}$ embodiment provides the communication device of any one of the preceding embodiments, wherein the spatial beam components are configured as follows:
the number of beams $U^{(l)}$ is non-identical over the layers, or
the number of beams $U^{(l)}$ is identical for all layers such that $U^{(l)}=U$, $\forall l$.

A $9^{th}$ embodiment provides the communication device of any one of the preceding embodiments, wherein the delay components are configured as follows:
the $D_u^{(l)}$ delay values, e.g., the indices of delay DFT vectors, may vary for each beam, layer and polarization indices.
the $D_u^{(l)}$ delay values, e.g., the indices of delay DFT vectors, vary for each beam and layer indices and may remain identical over the polarization indices.
the $D_u^{(l)}$ delay values, e.g., the indices of delay DFT vectors, are identical for all beam, layer and polarizations indices.
the $D_u^{(l)}$ delay values, e.g., the indices of delay DFT vectors, are identical for all beam and layer indices and may over polarization indices.
the $D_u^{(l)}$ delay values, e.g., the indices of delay DFT vectors, are identical for all beam and polarization indices, and vary over the layer indices.
the $D_u^{(l)}$ delay values, e.g., the indices of delay DFT vectors, are identical for all beam indices, and vary over the layer and polarization indices.
the number of delays $D_u^{(l)}$ depends on the beam and layer index, or
the number of delays $D_u^{(l)}$ depends on the beam index, and remains identical for all layer indices, $D_u^{(l)}=D_u$, $\forall l$, u, or
the number of delays $D_u^{(l)}$ is identical for all beam indices, but varies per layer, $D_u^{(l)}=D^{(l)}$, $\forall l$, u, or
the number delays $D_u^{(l)}$ is identical for all beam indices and layer indices, $D_u^{(l)}=D$ $\forall l$, u.

A $10^{th}$ embodiment provides the communication device of any one of the preceding embodiments, wherein the Doppler-frequency components are configured as follows:
the $F_{d,u}^{(l)}$ Doppler-frequency values, e.g., the indices of Doppler-frequency DFT-vectors, vary over beam, delay, layer and polarization indices.
the $F_{d,u}^{(l)}$ Doppler-frequency values, e.g., the indices of Doppler-frequency DFT-vectors, vary over beam, delay, layer indices but remain identical over polarization indices.
the $F_{d,u}^{(l)}$ Doppler-frequency values, e.g., the indices of Doppler-frequency DFT-vectors, are identical for all beam and delay indices, and may vary over layer and polarization indices.
the $F_{d,u}^{(l)}$ Doppler-frequency values, e.g., the indices of Doppler-frequency DFT-vectors, are identical for all beam, delay and polarization indices, and may vary over layer indices.
the number of Doppler-frequency components $F_{d,u}^{(l)}$ depends on the beam index, delay index and layer index, or
the number of Doppler-frequency components $F_{d,u}^{(l)}$ is identical for all beam, delays and layer indices, such that $F_{d,u}^{(l)}=F$, $\forall u, d, l$, or
the number of Doppler frequency-components $F_{d,u}^{(l)}$ is identical for all beam indices and all delay indices, but varies over the layer indices $F_{d,u}^{(l)}=F^{(l)}$, $\forall u, d, l$, or
the number of Doppler frequency-vectors $F_{d,u}^{(l)}$ is identical for all beam indices, but varies over delay and layer indices, $F_{d,u}^{(l)}=F_{d,u}^{(l)}$, $\forall u, d, l$, or
the number of Doppler frequency-components $F_{d,u}^{(l)}$ is identical for all beam indices and layer indices, but varies over delay indices, $F_{d,u}^{(l)}=F_d$, $\forall u, d, l$, or
the number of Doppler frequency-components $F_{d,u}^{(l)}$ is different for the U beams, and identical for all delay and layer indices, $F_{d,u}^{(l)}=F_u$, $\forall u, d, l$, or
the number of Doppler-frequency-components $F_{d,u}^{(l)}$ varies over beam and delay indices and is identical for all layer indices, $F_{d,u}^{(l)}=F_{d,u}$, $\forall u, d, l$, or
the number of Doppler frequency-components $F_{d,u}^{(l)}$ varies over beam and layer indices, and is identical for all delay indices, $F_{d,u}^{(l)}=F_u^{(l)}$, $\forall u, d, l$, or An $11^{th}$ embodiment provides the communication device of any one of the preceding embodiments, wherein
the explicit CSI is represented by a three-dimensional channel tensor $\mathcal{H} \in \mathbb{C}^{N \times S \times T}$ of the dimension N×S×T with S being the number of configured sub-bands/PRBs, or subcarriers, T being the number of time instances during the observation time, and $N=N_r \cdot N_1 \cdot N_2 \cdot P$, and the first, second and third dimensions of the channel tensor representing the space, frequency, and time components of the time-variant frequency-selective MIMO channel, respectively, or
the explicit CSI is represented by a four-dimensional channel tensor $\mathcal{H} \in \mathbb{C}^{N_r \times N_t \times S \times T}$ of dimension $N_r \times N_t \times$ S×T, where $N_t = N_1 \cdot N_2 \cdot P$, the first and second dimensions of $\mathcal{H}$ representing the receive-side and transmit-side space components of the time-variant frequency-selective MIMO channel, respectively, and the third and fourth dimensions of $\mathcal{H}$ representing the frequency and time component of the channel, respectively.

A 12th embodiment provides the communication device of any one of the preceding embodiments, wherein the processor is configured to select a Doppler-delay precoder matrix (W) based on a performance metric for e.g., the mutual-information I(W; $\mathcal{H}$), which is a function of the Doppler-delay precoder matrix W and a multi-dimensional channel tensor $\mathcal{H}$.

A 13th embodiment provides the communication device of the 12th embodiment, wherein the processor is configured to select a wideband CQI that optimizes the average block error rate block_error_rate($\mathcal{H}$ |$W^{(l)}$(l=1, ..., L)) at the communication device for the selected composite Doppler-delay-beam precoder matrix $W^{(l)}$(l=1, ..., L) and a multi-dimensional channel tensor $\mathcal{H}$ for the T time instants.

A 14th embodiment provides the communication device of any one of the 1st to 11th embodiments, wherein the processor is configured to
- use, in a first step, a high resolution parameter estimation algorithm to estimate parameters of a channel model directly from a multi-dimensional channel tensor $\mathcal{H}$, or to calculate the coefficients of H(t, w) directly in a non-parameterized form from the MIMO channel tensor $\mathcal{H}$,
- use, in a second step, the parameterized channel model and the selected Doppler-delay-beam composite precoder $W^{(l)}$ (l=1, ..., L) to calculate a parameterized precoded time-variant MIMO channel model frequency-domain response as $$H_{prec}(t,w)=H(t,w)[W^{(1)}(t,w), W^{(2)}(t,w), \ldots, W^{(L)}(t,w)],$$

where the (i,j) entry of $[H(t, w)]_{i,j}=h_{i,j}(t, w)$, and $W^{(l)}(t, w)$ is the t-th block and w-th column of $W^{(l)}$,
- use, in a third step, the parameterized precoded MIMO channel model response to calculate one or more CQI values for one or more future time instants.

A 15th embodiment provides the communication device of any one of the preceding embodiments, wherein the processor is configured to
- predict a CQI value for a time-instant/slot n+K, where n denotes the current time-instant/slot, and K denotes the relative time difference with respect to the current time-instant/slot n, and
- use the K predicted CQI values to calculate differential predicted CQI values by reducing the K predicted CQI values by the average CQI value.

A 16th embodiment provides the communication device of the 15th embodiment, wherein the communication device is configured to receive a CSI reporting configuration comprising a parameter CQI-PredictionTime assigned with the value K which is used by the communication device for CQI prediction.

A 17th embodiment provides the communication device of any one of the preceding embodiments, wherein, in case the CSI feedback uses the PMI, the processor is configured to report at least a two-component PMI,
where the first PMI corresponds to the selected vectors $b_u^{(l)}$, $d_{p,u,d}^{(l)}$ and $f_{p,u,d,v}^{(l)}$, and
where the second PMI corresponds to 2 $\Sigma_{u,d,l}$ $F_{d,u}^{(l)}$ Doppler-delay-beam combining coefficients $\gamma_{p,u,d,v}^{(l)}$ from the communication device to the transmitter.

An 18th embodiment provides the communication device of the 17th embodiment, wherein the processor is configured to
- represent the first-component PMI in the form of three-tuple sets, where each three-tuple (u, d, v) is associated with a selected spatial beam vector $b_u^{(l)}$, a selected delay vector $d_{p,u,d}^{(l)}$, and a selected Doppler-frequency vector $f_{p,u,d,v}^{(l)}$, the three-tuple sets being represented by $i_1=[i_{1,1}, i_{1,2}, i_{1,3}]$, where it represents the first PMI component, and where $i_{1,1}$ contains $\Sigma_l U^{(l)}$ indices of the selected DFT-vectors for the spatial beams, $i_{1,2}$ contains $2 \Sigma_{u,l} D_u^{(l)}$ indices of the selected delay-vectors, and $i_{1,3}$ contains $2 \Sigma_{u,d,l} F_{d,u}^{(l)}$ indices of the selected Doppler-frequency-vectors,
- quantize the Doppler-delay-beam combining coefficients using a codebook approach, where the quantized Doppler-delay-beam combining coefficients are represented by $i_2$, the second PMI component, and
- report the two PMI components to the transmitter.

A 19th embodiment provides the communication device of the 18th embodiment, wherein, for quantizing the complex Doppler-delay coefficients $\gamma_{p,u,d,v}^{(l)}$ with a codebook approach, each coefficient is represented by $$\gamma_{p,u,d,v}^{(l)}=\hat{\gamma}_{p,u,d,v}^{(l)}\phi_{p,u,d,v}^{(l)},$$

where
$\hat{\gamma}_{p,u,d,v}^{(l)}$ is a polarization-, beam-, delay- and Doppler-frequency-dependent amplitude coefficient which is quantized with N bits; and
$\phi_{p,u,d,v}^{(l)}$ represents a phase which is represented by a BPSK, or QPSK, or 8PSK, or any other higher-order PSK constellation, or
wherein each coefficient is represented by its real and imaginary part as $$\gamma_{p,u,d,v}^{(l)}=\text{Re}\{\hat{\gamma}_{p,u,d,v}^{(l)}\}+j\cdot\text{Imag}\{\hat{\gamma}_{p,u,d,v}^{(l)}\},$$

where $\text{Re}\{\hat{\gamma}_{p,u,d,v}^{(l)}\}$ and $\text{Imag}\{\hat{\gamma}_{p,u,d,v}^{(l)}\}$ are quantized each with N bits.

A 20th embodiment provides the communication device of any one of the preceding embodiments, wherein the CSI feedback further includes a rank indicator, RI, and
wherein the processor is configured to report the RI for the transmission, wherein the RI is selected with respect to the Doppler-delay-beam precoder matrix $W^{(l)}$ (l=1, ..., L) and denotes an average number of layers supported by the Doppler-delay-beam precoded time-variant frequency-selective MIMO channel.

A 21st embodiment provides the communication device of any one of the preceding embodiments, wherein the communication device is configured with a CSI-RS reporting configuration via a higher layer for reporting either the CQI and/or RI and/or PMI for a beam-formed CSI-RS, the vectors in the first codebook matrix represented by $N_1 N_2$-length column vectors, where the m-th vector (m=1, ..., $N_1 N_2$) contains a single 1 at the m-th position and zeros elsewhere.

A 22nd embodiment provides the communication device of any one of the preceding embodiments, wherein the communication device is configured to receive a CSI-RS resource configuration including a higher layer (e.g., RRC) parameter, e.g., referred to as CSI-RS-BurstDuration, indicating a time-domain-repetition of the downlink reference signals, e.g., in terms of a number of consecutive slots the downlink reference signals are repeated in.

A 23rd embodiment provides the communication device of any one of the preceding embodiments, wherein the communication device assumes that for CQI, and/or RI, and/or PMI calculation, the transmitter applies the Doppler-delay-beam precoder to PDSCH signals on antenna ports {1000, 1008+v−1} for v=L layers as $$\begin{bmatrix} y^{(t,3000)}(i) \\ \vdots \\ y^{(t,3000+P-1)}(i) \end{bmatrix} = W(t,i) \begin{bmatrix} x^{(t,0)}(i) \\ \vdots \\ x^{(t,v-1)}(i) \end{bmatrix},$$

where $[x^{(t,0)}(i), \ldots, x^{(t,v-1)}(i)]^T$ is a symbol vector of PDSCH symbols, $P \in \{1,2,4,8,12,16,24,32\}$, $x^{(t,u)}(i)$ is the i-th symbol of layer u at time instant t, $y^{(t,u)}(i)$ is the precoded symbol transmitted on antenna port u at time instant t, and $W(t, i) = [W^{(1)}(t, i), \ldots, W^{(L)}(t, i)]$ is the predicted precoder matrix, with $W^{(l)}(t, i)$ being the t-th block and i-th column of $W^{(l)}$.

A 24<sup>th</sup> embodiment provides the communication device for providing a channel state information, CSI, feedback in a wireless communication system, wherein the communication device is configured to receive a reference signal resource configuration, e.g., a CSI-RS resource configuration, including a parameter, like a higher layer (e.g., RRC) parameter, e.g., referred to as CSI-RS-BurstDuration, the parameter indicating a time-domain-repetition of the downlink reference signals, e.g., in terms of a number of consecutive slots the downlink reference signals are repeated in, and wherein the communication device is configured to determine the CSI feedback based on the repeated downlink reference signals and to report the determined CSI feedback.

A 25<sup>th</sup> embodiment provides a transmitter in a wireless communication system including a communication device, the transmitter comprising:

an antenna array having a plurality of antennas for a wireless communication with one or more communication devices of any one of the preceding embodiments for providing a channel state information, CSI, feedback to the transmitter; and a precoder connected to the antenna array, the precoder to apply a set of beamforming weights to one or more antennas of the antenna array to form, by the antenna array, one or more transmit beams or one or more receive beams, a transceiver configured to transmit, to the communication device, downlink reference signals (CSI-RS) according to a CSI-RS configuration comprising a number of CSI-RS antenna ports and a parameter, e.g., referred to as CSI-RS BurstDuration, indicating a time-domain-repetition of the downlink reference signals, e.g., in terms of a number of consecutive slots the downlink reference signals are repeated in, and downlink signals comprising the CSI-RS configuration; and receive uplink signals comprising a plurality of CSI reports from the communication device; and a processor configured to:

extract at least the two component precoder matrix identifier and the rank indicator from the plurality of CSI reports; and construct a Doppler-delay-beam precoder matrix applied on the antenna ports using a first component and a second component of the PMI, and determine the beamforming weights responsive to the constructed precoder matrix.

A 26<sup>th</sup> embodiment provides the transmitter of the 25<sup>th</sup> embodiment, wherein, to facilitate precoder matrix prediction for QT future time instants, the processor is configured to cyclically extend the Doppler-frequency DFT-vectors $f_{p,u,d,v}^{(l)}$ to a length-QT vectors $t_{p,u,d,v}^{(l)}$, the cyclic extension defined by $$t_{p,u,d,v}^{(l)} = \left[1, e^{j\frac{2\pi k}{O_3}}, \ldots, e^{j\frac{2\pi k(Q-1)}{O_3}}\right]^T \otimes f_{p,u,d,v}^{(l)}, \forall u, d, v, p, l,$$

where $$f_{p,u,d,v}^{(l)} = \left[1, e^{j\frac{2\pi k}{O_3 T}}, \ldots, e^{j\frac{2\pi k(T-1)}{O_3 T}}\right]^T \in \Omega_3,$$

and the predicted precoder matrix for the l-th layer and q-th (q=1, ..., QT) time instant is given by $$\hat{W}^{(l)}(q) = P^{(l)} \begin{bmatrix} \sum_{u=0}^{U^{(l)}-1} \sum_{d=0}^{D_u^{(l)}-1} \sum_{v=0}^{F_{d,u}^{(l)}-1} \gamma_{1,u,d,v}^{(l)} f_{1,u,d,v}^{(l)}(q) \otimes d_{1,u,d}^{(l)T} \otimes b_u^{(l)} \\ \sum_{u=0}^{U^{(l)}-1} \sum_{d=0}^{D_u^{(l)}-1} \sum_{v=0}^{F_{d,u}^{(l)}-1} \gamma_{2,u,d,v}^{(l)} f_{2,u,d,v}^{(l)}(q) \otimes d_{2,u,d}^{(l)T} \otimes b_u^{(l)} \end{bmatrix}$$

where $t_{p,u,d,v}^{(l)}(q)$ is the q-th entry of $t_{p,u,d,v}^{(l)}$.

A 27<sup>th</sup> embodiment provides a wireless communication network, comprising:

at least one communication device of any one of the 1<sup>st</sup> to 24<sup>th</sup> embodiments, and at least one BS of the 25<sup>th</sup> embodiment or the 26<sup>th</sup> embodiment.

A 28<sup>th</sup> embodiment provides a method for providing a channel state information, CSI, feedback in a wireless communication system, the method comprising:

receiving, from a transmitter, a radio signal via a time-variant, frequency-selective MIMO channel, the radio signal including downlink reference signals according to a reference signal configuration comprising a number of antenna ports, and downlink signals comprising the reference signal configuration;

estimating, at the communication device, an explicit CSI in the frequency domain using measurements on the downlink reference signals on the radio channel, the downlink reference signals provided over a certain observation time, based on a performance metric, selecting, at the communication device, a Doppler-delay precoder matrix (W) for a composite Doppler-delay-beam three-stage precoder, the Doppler-delay-beam three-stage precoder being based on one or more codebooks, the one or more codebooks including one or more transmit-side spatial beam components of the composite Doppler-delay-beam three-stage precoder, one or more delay components of the composite Doppler-delay-beam three-stage precoder, and one or more Doppler-frequency components of the composite Doppler-delay-beam three-stage precoder, calculating, at the communication device, one or more of a channel quality indicator, CQI, a precoder matrix indicator, PMI, and a rank indicator, RI, using the explicit CSI and the composite Doppler-delay-beam three-stage precoder with the selected Doppler-delay-beam precoder matrix (W), and reporting from the communication device to the transmitter the CSI feedback including one or more of the CQI, the PMI and the RI, wherein the PMI and RI are used to indicate the Doppler-delay-beam three-stage composite precoder matrix for the configured antenna ports.

A $29^{th}$ embodiment provides a method for transmitting in a wireless communication system including a communication device and a transmitter, the method comprising:

transmitting, to a communication device, downlink reference signals (CSI-RS) according to a CSI-RS configuration comprising a number of CSI-RS antenna ports and a parameter, e.g., referred to as CSI-RS BurstDuration, indicating a time-domain-repetition of the downlink reference signals, e.g., in terms of a number of consecutive slots the downlink reference signals are repeated in, and downlink signals comprising the CSI-RS configuration;

receiving, at the transmitter, uplink signals comprising a plurality of CSI reports from the communication device;

extracting, at the transmitter, at least the two component precoder matrix identifier and the rank indicator from the plurality of CSI reports;

constructing, at the transmitter, a Doppler-delay-beam precoder matrix applied on the antenna ports using a first component and a second component of the PMI, and determining, responsive to the constructed precoder matrix, beamforming weights for a precoder connected to the antenna array of the transmitter.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIGS. 13A and 13B illustrates an example of a computer system 350. The units or modules as well as the steps of the methods performed by these units may execute on one or more computer systems 350. The computer system 350 includes one or more processors 352, like a special purpose or a general purpose digital signal processor. The processor 352 is connected to a communication infrastructure 354, like a bus or a network. The computer system 350 includes a main memory 356, e.g., a random access memory (RAM), and a secondary memory 358, e.g., a hard disk drive and/or a removable storage drive. The secondary memory 358 may allow computer programs or other instructions to be loaded into the computer system 350. The computer system 350 may further include a communications interface 360 to allow software and data to be transferred between computer system 350 and external devices. The communication may be in the from electronic, electromagnetic, optical, or other signals capable of being handled by a communications interface. The communication may use a wire or a cable, fiber optics, a phone line, a cellular phone link, an RF link and other communications channels 362.

The terms "computer program medium" and "computer readable medium" are used to generally refer to tangible storage media such as removable storage units or a hard disk installed in a hard disk drive. These computer program products are means for providing software to the computer system 350. The computer programs, also referred to as computer control logic, are stored in main memory 356 and/or secondary memory 358. Computer programs may also be received via the communications interface 360. The computer program, when executed, enables the computer system 350 to implement the present invention. In particular, the computer program, when executed, enables processor 352 to implement the processes of the present invention, such as any of the methods described herein. Accordingly, such a computer program may represent a controller of the computer system 350. Where the disclosure is implemented using software, the software may be stored in a computer program product and loaded into computer system 350 using a removable storage drive, an interface, like communications interface 360.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] 3GPP TS 38.211 V15.1.0, "3rd Generation Partnership Project; Technical Specification Group Radio Access Network; NR; Physical channels and modulation (Release 15), March 2018.
[2] 3GPP TS 38.214 V15.1.0, "3rd Generation Partnership Project; Technical Specification Group Radio Access Network; NR; Physical layer procedures for data (Release 15), March 2018.
[3] K. Manolakis, S. Jaeckel, V. Jugnickel, and V. Braun, "Channel Prediction by Doppler-Delay Analysis and Benefits for Base Station Cooperation," in 77th IEEE Vehicular Technology Conference, June 2013.
[4] 3GPP TS 38.331 V15.1.0, "3rd Generation Partnership Project; Technical Specification Group Radio Access Network; NR; Radio Resource Control (RRC); Protocol specification (Release 15), March 2018.
[5] R. S. Thomä, M. Landmann, and A. Richter, "RIMAX-A maximum likelihood framework for parameter estimation in multidimensional channel sounding." Proceedings of the International Symposium on Antennas and Propagation (ISAP '04). 2004.
[6] I. Barhumi, G. Leus, and M. Moonen, "Optimal training design for MIMO OFDM systems in mobile wireless channels," IEEE Trans. Signal Process, vol. 51, no. 6, pp. 1615-1624, June 2003.
[7] P. Hoeher, S. Kaiser, and P. Robertson, "Two-dimensional pilot-symbol-aided channel estimation by Wiener filtering," in Proc. IEEE ICASSP-97, Munich, Germany, April 1997, pp. 1845-1848.

The invention claimed is:

1. A communication device for providing a channel state information, (CSI), feedback in a wireless communication system, the communication device comprising:
    a transceiver configured to receive, from a transmitter a radio signal via a Multiple Input Multiple Output (MIMO) channel, the radio signal comprising downlink reference signals according to a reference signal configuration comprising a number of antenna ports, and downlink signals comprising the reference signal configuration; and
    a processor configured to
        estimate the CSI using measurements on the downlink reference signals on the radio channel, the downlink reference signals provided over a certain observation time,
        select a Doppler-delay precoder matrix for a composite Doppler-delay-beam three-stage precoder, the Doppler-delay-beam three-stage precoder being based on one or more codebooks, the one or more codebooks comprising
            one or more transmit-side spatial beam components of the composite Doppler-delay-beam three-stage precoder,
            one or more delay components of the composite Doppler-delay-beam three-stage precoder, and
            one or more Doppler-frequency components of the composite Doppler-delay-beam three-stage precoder,
        calculate either one or more of a channel quality indicator (CQI) and/or a precoder matrix indicator (PMI), and/or a rank indicator (RI) using the CSI and the composite Doppler-delay-beam three-stage precoder with the selected Doppler-delay-beam precoder matrix, and
        report to the transmitter the CSI feedback comprising either one or more of the CQI, and/or the PMI and/or the RI, wherein the PMI and RI are used to indicate the Doppler-delay-beam three-stage composite precoder matrix for the configured antenna ports,
    wherein the communication device is configured by a base station or another network entity with one or more parameters, the parameter indicating a number of delay components and/or a number of Doppler-frequency components to be used by the communication device when calculating the Doppler-delay precoder matrix, and
    wherein the communication device is configured to select from the one or more codebooks a subset of D delay components and/or a subset of F Doppler-frequency components and to use the selected subset of delay components for each polarization and/or the selected subset of Doppler-frequency components for each polarization, each spatial beam and each delay, when calculating the Doppler-delay precoder matrix.

2. The communication device of claim 1, wherein the one or more parameters comprise the parameter D,
    the delay components comprise delay Discrete Fourier Transform (DFT) or Discrete Cosine Transform (DCT) vectors, and
    the communication device is configured to select from the one or more codebooks a subset of $D_u^{(l)}=D$ delay vectors, which are common to all beam indices of the precoder, so that $d_{p,u,d}^{(l)}=d_d^{(l)}$, and to use only the selected subset of D delay vectors when calculating the precoder matrix, wherein, d indicates the delay vector of the precoder, and l, p, u and d indicate the layer index, the polarization index, the spatial beam index, and the delay index of the delay vector, respectively.

3. The communication device of claim 1, wherein the communication device is configured to report an information or an indication of the selected $D'_{p,u} \leq D$ delay vectors per beam index and/or per polarization index, out of the selected subset of D common delay vectors.

4. The communication device of claim 1, wherein
    the one or more parameters comprise the parameter F,
    the Doppler-frequency components comprise Doppler Discrete Fourier Transform (DFT) or Discrete Cosine Transform (DCT) vectors, and
    the communication device is configured to select from the one or more codebooks a subset of $F_u^{(l)}=F$ Doppler-frequency vectors, common to all beam indices and common to all delay indices for the precoder, so that $f_{p,u,d,v}^{(l)}=f_v^{(l)}$, and to use the selected F Doppler-frequency vectors when calculating the precoder matrix, wherein f indicates the Doppler-frequency vector, and l indicates the layer index, p indicates the polarization index, u indicates the spatial beam index, d indicates the delay index and v indicates the Doppler-frequency index of the vector.

5. The communication device of claim 1, wherein the communication device is configured to report an information or indication of the selected $F'_{p,u,d} \leq F$ Doppler-frequency vectors per beam index, and/or delay index and/or polarization index, out of the selected subset of F common Doppler-frequency vectors.

6. The communication device of claim 1,
wherein the communication device comprises a further parameter, the further parameter indicating a number of spatial beam components to be used by the communication device when calculating the Doppler-delay precoder matrix, and
wherein the communication device is configured to select from the one or more codebooks U spatial beam components and to use them when calculating the Doppler-delay precoder matrix, the selected spatial beam components used for each polarization.

7. The communication device of claim 6, wherein the communication device is configured to report information or the value of the selected $\tilde{U}^{(l)} \leq U^{(l)}$ beam Discrete Fourier Transform (DFT) vectors.

8. The communication device of claim 1, wherein the information of the selected delay components and/or the information of the selected Doppler-frequency components is represented by a bitmap, where each bit in the bitmap is associated with a spatial beam component, a delay component, and/or a Doppler-frequency component and a combining coefficient.

9. The communication device of claim 8, wherein the communication device is configured to quantize the non-zero combining coefficients using a codebook approach, where each coefficient is represented by $$\gamma_{p,u,d,v}^{(l)} = \hat{\gamma}_{p,u,d,v}^{(l)} \phi_{p,u,d,v}^{(l)},$$

where
$\hat{\gamma}_{p,u,d,v}^{(l)}$ is a polarization-, beam-, delay- and Doppler-frequency-dependent amplitude coefficient which is quantized with N bits; and
$\phi_{p,u,d,v}^{(l)}$ represents a phase which is represented by a Binary Phase-Shift Keying (BPSK) Quadrature Phase-Shift Keying (QPSK, 8 Phase-Shift Keying (8PSK), or any other higher-order Phase-Shift Keying (PSK) constellation.

10. The communication device of claim 1, wherein the communication device is configured to report only the non-zero combining coefficients $\gamma_{p,u,d,v}^{(l)}$.

11. The communication device of claim 10, wherein the communication device is configured to select not more than $K_0$ non-zero combining coefficients $\gamma_{p,u,d,v}^{(l)}$ to calculate the precoder matrix, the parameter $K_0$ depending on the number of configured delay Discrete Fourier Transform (DFT) vectors D, the number of configured Doppler DFT vectors F, and the number of configured DFT beams $U^{(l)}$.

12. The communication device of claim 11, wherein the communication device is configured to report $K_1$ non-zero combining coefficients $\gamma_{p,u,d,v}^{(l)}$, where $K_1 \leq K_0$, and to indicate the selected non-zero combining coefficients in the bitmap.

13. The communication device of claim 12, wherein the communication device is configured to provide a CSI report comprising two parts, wherein the first part comprises a fixed payload size and comprises at least the number $K_1$ of selected non-zero combining coefficients, and the second part comprises information about the bitmap for indicating the selected delay vectors and selected Doppler-frequency vectors and non-zero combining coefficients, an indication of the common D delay vectors and/or F Doppler vectors, an indication of $U^{(l)}$ or $2U^{(l)}$ selected beam indices, and the $K_1$ non-zero combining coefficients.

14. The communication device of claim 1, wherein the communication device is configured to receive from the wireless communication system, by higher layer signaling or by physical layer signaling a codebook parameter S used for the configuration of the delay codebook and/or a codebook parameter T used for the configuration of the Doppler codebook.

15. The communication device of claim 1, wherein the Doppler-delay-beam three-stage precoder is based on three separate codebooks, and wherein the three separate codebooks comprise
a first codebook for the one or more transmit-side spatial beam components of the composite Doppler-delay-beam three-stage precoder,
a second codebook for the one or more delay components of the composite Doppler-delay-beam three-stage precoder, and
a third codebook for the one or more Doppler-frequency components of the composite Doppler-delay-beam three-stage precoder.

16. A transmitter in a wireless communication system comprising a communication device, the transmitter comprising:
an antenna array comprising a plurality of antennas for a wireless communication with one or more communication devices for providing a channel state information (CSI) feedback to the transmitter; and
a precoder connected to the antenna array, the precoder to apply a set of beamforming weights to one or more antennas of the antenna array to form, by the antenna array, one or more transmit beams or one or more receive beams,
a transceiver configured to
transmit, to the communication device, downlink reference signals according to a Channel State Information Reference Signal (CSI-RS) configuration comprising a number of CSI-RS antenna ports and indicating a time-domain-repetition of the downlink reference signals, and downlink signals comprising the CSI-RS configuration; and
receive uplink signals comprising one or more CSI reports from the communication device; and
a processor configured to:
extract at least a precoder matrix identifier (PMI) and a rank indicator (RI) from the one or more CSI reports; and
construct a precoder matrix applied on the antenna ports using a first component and a second component of the PMI, and determine the beamforming weights responsive to the constructed precoder matrix.

17. A method for providing a channel state information, CSI, feedback in a wireless communication system, the method comprising:
receiving, from a transmitter, a radio signal via a Multiple Input Multiple Output (MIMO) channel, the radio signal comprising downlink reference signals according to a reference signal configuration comprising a number of antenna ports, and downlink signals comprising the reference signal configuration;
estimating, at a communication device, the CSI using measurements on the downlink reference signals on the radio channel, the downlink reference signals provided over a certain observation time,
selecting, at the communication device, a Doppler-delay precoder matrix for a composite Doppler-delay-beam three-stage precoder, the Doppler-delay-beam three-stage precoder being based on one or more codebooks, the one or more codebooks comprising
one or more transmit-side spatial beam components of the composite Doppler-delay-beam three-stage precoder,
one or more delay components of the composite Doppler-delay-beam three-stage precoder, and
one or more Doppler-frequency components of the composite Doppler-delay-beam three-stage precoder,
calculating, at the communication device, one or more of a channel quality indicator (CQI), a precoder matrix indicator (PMI) and a rank indicator (RI) using the explicit CSI and the composite Doppler-delay-beam three-stage precoder with the selected Doppler-delay-beam precoder matrix, and
reporting from the communication device to the transmitter the CSI feedback comprising one or more of the CQI, the PMI and the RI, wherein the PMI and RI are used to indicate the Doppler-delay-beam three-stage composite precoder matrix for the configured antenna ports,
wherein the communication device is configured by a base station or another network entity with one or more parameters, the parameter indicating a number of delay components and/or a number of Doppler-frequency components to be used by the communication device when calculating the Doppler-delay precoder matrix, and
wherein the method further comprises:
selecting from the one or more codebooks a subset of D delay components and/or a subset of F Doppler-frequency components, and
using the selected subset of delay components for each polarization and each spatial beam and/or the selected subset of Doppler-frequency components for each polarization, each spatial beam and each delay, when calculating the Doppler-delay precoder matrix.

18. A method performed by a transmitter, or by a base station or by a network node for transmitting and receiving in a wireless communication system, the method comprising:
transmitting, to a communication device, downlink reference signals according to a Channel State Information Reference Signal (CSI-RS) configuration comprising a number of CSI-RS antenna ports and indicating a time-domain-repetition of the downlink reference signals and downlink signals comprising the CSI-RS configuration;
receiving, at the transmitter, uplink signals comprising one or more CSI reports from the communication device, each CSI report indicating D delay components and/or F Doppler-frequency components selected by the communication device from one or more codebooks and used by the communication device when calculating the precoder matrix;
extracting, at the transmitter, at least a precoder matrix identifier (PMI) and a rank indicator (RI) from the one or more CSI reports;

constructing, at the transmitter, a precoder matrix applied on the antenna ports using a first component and a second component of the PMI, and
determining, responsive to the constructed precoder matrix, beamforming weights for a precoder connected to an antenna array of the transmitter.

19. A non-transitory digital storage medium having a computer program stored thereon to perform when said computer program is run by a computer, a method for providing a channel state information (CSI) feedback in a wireless communication system, the method comprising:
receiving, from a transmitter, a radio signal via a Multiple Input Multiple Output (MIMO) channel, the radio signal comprising downlink reference signals according to a reference signal configuration comprising a number of antenna ports, and downlink signals comprising the reference signal configuration;
estimating, at the communication device, the CSI using measurements on the downlink reference signals on the radio channel, the downlink reference signals provided over a certain observation time,
selecting, at the communication device, a Doppler-delay precoder matrix for a composite Doppler-delay-beam three-stage precoder, the Doppler-delay-beam three-stage precoder being based on one or more codebooks, the one or more codebooks comprising
one or more transmit-side spatial beam components of the composite Doppler-delay-beam three-stage precoder,
one or more delay components of the composite Doppler-delay-beam three-stage precoder, and
one or more Doppler-frequency components of the composite Doppler-delay-beam three-stage precoder,
calculating, at the communication device, one or more of a channel quality indicator (CQI) a precoder matrix indicator (PMI), and a rank indicator (RI) using the CSI and the composite Doppler-delay-beam three-stage precoder with the selected Doppler-delay-beam precoder matrix, and
reporting from the communication device to the transmitter the CSI feedback comprising one or more of the CQI, the PMI and the RI, wherein the PMI and RI are used to indicate the Doppler-delay-beam three-stage composite precoder matrix for the configured antenna ports,
wherein the communication device is configured by a base station or another network entity with one or more parameters, the parameter indicating a number of delay components and/or a number of Doppler-frequency components to be used by the communication device when calculating the Doppler-delay precoder matrix, and
wherein the method further comprises:
selecting from the one or more codebooks a subset of D delay components and/or a subset of F Doppler-frequency components, and
using the selected subset of delay components for each polarization and each spatial beam and/or the selected subset of Doppler-frequency components for each polarization, each spatial beam and each delay, when calculating the Doppler-delay precoder matrix.

20. A non-transitory digital storage medium having a computer program stored thereon to perform when said computer program is run by a computer, a method performed by a transmitter, or by a base station or by a network node for transmitting and receiving in a wireless communication system, the method comprising:

transmitting, to a communication device, downlink reference signals according to a Channel State Information Reference Signal (CSI-RS) configuration comprising a number of CSI-RS antenna ports and indicating a time-domain-repetition of the downlink reference signals and downlink signals comprising the CSI-RS configuration;

receiving, at the transmitter, uplink signals comprising one or more CSI reports from the communication device, each CSI report indicating D delay components and/or F Doppler-frequency components selected by the communication device from one or more codebooks and used by the communication device when calculating the precoder matrix;

extracting, at the transmitter, at least a precoder matrix identifier (PMI) and rank indicator (RI) from the one or more CSI reports;

constructing, at the transmitter, a precoder matrix applied on the antenna ports using a first component and a second component of the PMI, and determining, responsive to the constructed precoder matrix, beamforming weights for a precoder connected to an antenna array of the transmitter.

21. A network node comprising a processor and a memory, said memory comprising instructions executable by said processor to perform, when said instructions are executed by said processor, the method of claim 18.

\* \* \* \* \*

UNITED STATES PATENT AND TRADEMARK OFFICE
CERTIFICATE OF CORRECTION

PATENT NO. : 11,595,089 B2
APPLICATION NO. : 17/447013
DATED : February 28, 2023
INVENTOR(S) : Venkatesh Ramireddy, Marcus Großmann and Markus Landmann It is certified that error appears in the above-identified patent and that said Letters Patent is hereby corrected as shown below:

On the Title Page

The inventor name currently reads as:
(72) Inventors: Venkatesh Ramierddy
                   Marcus Grobmann
It should read as:
(72) Inventors: Venkatesh Ramireddy
                   Marcus Großmann
                   Markus Landmann In the Claims Claim 17, Column 65, Line 20 currently reads as:
explicit CSI and the composite Doppler-delay-beam
It should read as:
CSI and the composite Doppler-delay-beam Signed and Sealed this
Twentieth Day of August, 2024

Katherine Kelly Vidal
*Director of the United States Patent and Trademark Office*